US010885490B2

(12) United States Patent
Mains, Jr. et al.

(10) Patent No.: US 10,885,490 B2
(45) Date of Patent: Jan. 5, 2021

(54) PROVIDING TRUCK DRIVERS DIRECTIONS TO A LOADING DOCK OR AN OFF-SITE LOCATION BASED ON DOCK AVAILABILITY

(71) Applicant: Cross Road Centers, LLC, Kenner, LA (US)

(72) Inventors: Ronald H. Mains, Jr., Kenner, LA (US); Luke Hooper, New Orleans, LA (US); Chathan S. Mangat, New Orleans, LA (US)

(*) Notice: Subject to any disclaimer, the term of this patent is extended or adjusted under 35 U.S.C. 154(b) by 134 days.

(21) Appl. No.: 16/119,650

(22) Filed: Aug. 31, 2018

(65) Prior Publication Data
US 2019/0066033 A1 Feb. 28, 2019

Related U.S. Application Data

(60) Provisional application No. 62/553,027, filed on Aug. 31, 2017.

(51) Int. Cl.
*G06Q 10/08* (2012.01)
*G06Q 10/06* (2012.01)
(52) U.S. Cl.
CPC ..... *G06Q 10/083* (2013.01); *G06Q 10/06311* (2013.01)
(58) Field of Classification Search
CPC ............... G06Q 10/08; G06Q 2240/00; G06Q 10/06315; G06Q 10/063; G06Q 50/28; G06Q 10/0833
See application file for complete search history.

(56) References Cited

U.S. PATENT DOCUMENTS 4,093,084 A * 6/1978 Ringer ................. B65G 17/345
104/88.02
5,666,493 A 9/1997 Wojcik et al.
(Continued)

OTHER PUBLICATIONS

Oracle Yard Management Process Guide Release 12.2 Oracle, Sep. 2015 (Year: 2015).*
(Continued)

*Primary Examiner* — Scott L Jarrett
(74) *Attorney, Agent, or Firm* — Jason P. Mueller

(57) ABSTRACT

Disclosed systems, methods, and computer program products address issues of parking and vehicular traffic at a facility, such as a warehouse or a merchandise distribution hub, and provide improved supply chain logistics for transportation and distribution of goods. Disclosed systems include a processor circuit that is configured to generating schedules for a plurality of shipments, to receive location tracking information regarding positions of vehicles, to perform shipping operations, and to dynamically update schedules based on received input. Received input may include information regarding warehouse labor and equipment availability, location tracking information, and/or information regarding weather and traffic conditions. Systems may be configured to send alerts to vehicle drivers provided updated scheduling information and instructions regarding shipments and to send alerts to warehouse workers provided updated scheduling information and instructions regarding shipments. The system may further receive information from drivers and dock workers and may use such information to optimize schedules.

6 Claims, 38 Drawing Sheets

(56) References Cited

U.S. PATENT DOCUMENTS

| | | | |
|---|---|---|---|
| 5,726,984 A | | 3/1998 | Kubler et al. |
| 6,148,291 A * | | 11/2000 | Radican .................. G06Q 10/08 |
| | | | 705/22 |
| 6,421,606 B1 * | | 7/2002 | Asai .................... G01C 21/3423 |
| | | | 701/410 |
| 6,577,921 B1 * | | 6/2003 | Carson .................. G06Q 10/08 |
| | | | 700/214 |
| 6,611,755 B1 * | | 8/2003 | Coffee .................... B28C 5/422 |
| | | | 340/438 |
| 6,687,609 B2 * | | 2/2004 | Hsiao ...................... G01C 21/26 |
| | | | 340/993 |
| 6,795,823 B1 * | | 9/2004 | Aklepi ................... G06Q 10/08 |
| | | | 707/781 |
| 7,049,979 B2 * | | 5/2006 | Dunning .................. G08G 1/14 |
| | | | 340/932.2 |
| 7,246,009 B2 * | | 7/2007 | Hamblen ............... G07C 5/085 |
| | | | 340/988 |
| 7,265,668 B1 * | | 9/2007 | Brosius .................. G06Q 10/08 |
| | | | 340/539.22 |
| 7,319,414 B2 | | 1/2008 | Horstemeyer |
| 7,376,600 B1 | | 5/2008 | Wadawadigi et al. |
| 7,603,285 B2 | | 10/2009 | Jacobs et al. |
| 7,827,051 B2 | | 11/2010 | Sanchez et al. |
| 7,973,641 B1 * | | 7/2011 | Huang .................... B60R 25/00 |
| | | | 340/10.1 |
| 8,065,205 B2 | | 11/2011 | Naghshineh et al. |
| 8,285,611 B2 | | 10/2012 | Fuller et al. |
| 8,311,905 B1 * | | 11/2012 | Campbell .............. G06Q 10/08 |
| | | | 705/28 |
| 8,954,189 B2 | | 2/2015 | Zimmerman et al. |
| 8,959,036 B2 * | | 2/2015 | Huat ....................... G05B 15/02 |
| | | | 705/333 |
| 8,996,287 B2 * | | 3/2015 | Davidson ............. G06Q 10/083 |
| | | | 701/119 |
| 9,208,626 B2 * | | 12/2015 | Davidson ........... G06Q 10/0631 |
| 9,367,827 B1 | | 6/2016 | Lively et al. |
| 9,743,239 B1 * | | 8/2017 | Mishra .................. H04W 4/023 |
| 9,955,298 B1 | | 4/2018 | Haney |
| 10,147,059 B2 | | 12/2018 | Sullivan et al. |
| 10,157,337 B1 * | | 12/2018 | Kantor .................... G08B 13/14 |
| 10,169,993 B1 * | | 1/2019 | Dance .................. G08G 1/0141 |
| 10,217,078 B1 | | 2/2019 | Klein |
| 10,494,205 B1 * | | 12/2019 | Hoofard ........... G06Q 10/06316 |
| 10,528,900 B2 * | | 1/2020 | Jones .................. G06Q 10/0631 |
| 2003/0135304 A1 * | | 7/2003 | Sroub .................... G06Q 10/08 |
| | | | 701/1 |
| 2003/0163227 A1 * | | 8/2003 | Yanai .................... G01C 21/3679 |
| | | | 701/1 |
| 2004/0193466 A1 * | | 9/2004 | Kull ....................... G06Q 10/08 |
| | | | 705/28 |
| 2005/0154626 A1 | | 7/2005 | Jones |
| 2005/0171692 A1 * | | 8/2005 | Hamblen ................ G07C 5/085 |
| | | | 701/468 |
| 2006/0251498 A1 * | | 11/2006 | Buzzoni ............... B65G 63/004 |
| | | | 414/139.9 |
| 2008/0163231 A1 | | 7/2008 | Breen et al. |
| 2008/0228514 A1 * | | 9/2008 | Robinson ............... G06Q 10/08 |
| | | | 705/1.1 |
| 2010/0287025 A1 | | 11/2010 | Fletcher et al. |
| 2011/0046775 A1 * | | 2/2011 | Bailey ...................... B07C 3/00 |
| | | | 700/224 |
| 2012/0310520 A1 * | | 12/2012 | Kanno ................. G01C 21/3423 |
| | | | 701/400 |
| 2014/0095240 A1 | | 4/2014 | White et al. |
| 2014/0229399 A1 | | 8/2014 | Ranganathan et al. |
| 2014/0309920 A1 * | | 10/2014 | Ricci ...................... G01C 21/26 |
| | | | 701/400 |
| 2015/0006430 A1 * | | 1/2015 | Ben-Alexander .... G06Q 10/109 |
| | | | 705/337 |
| 2015/0019277 A1 | | 1/2015 | Kostival et al. |
| 2015/0046229 A1 * | | 2/2015 | Gollu ................... G06Q 10/083 |
| | | | 705/7.39 |
| 2015/0051941 A1 | | 2/2015 | Bell |
| 2015/0066561 A1 | | 3/2015 | Wills et al. |
| 2015/0081582 A1 | | 3/2015 | Mains, Jr. |
| 2015/0278759 A1 | | 10/2015 | Harris et al. |
| 2015/0347984 A1 * | | 12/2015 | Sheykh-Zade ..... G06Q 10/1095 |
| | | | 705/7.19 |
| 2016/0012385 A9 * | | 1/2016 | Mains, Jr. ............ G06Q 10/083 |
| | | | 705/330 |
| 2016/0104111 A1 | | 4/2016 | Jones et al. |
| 2016/0210591 A1 | | 7/2016 | Lafrance |
| 2017/0124378 A1 * | | 5/2017 | High ......................... G08G 1/14 |
| 2017/0132541 A1 * | | 5/2017 | Myers .............. G06Q 10/06311 |
| 2017/0185956 A1 | | 6/2017 | Gollu |
| 2017/0316379 A1 * | | 11/2017 | Lepek ................ G06Q 10/0834 |
| 2017/0316690 A1 * | | 11/2017 | Charles .................. G08G 1/144 |
| 2017/0372262 A1 | | 12/2017 | Haney |
| 2018/0018620 A1 | | 1/2018 | Göllö |
| 2018/0158340 A1 | | 6/2018 | de Moura |
| 2018/0293527 A1 * | | 10/2018 | Amirjalayer ...... G06Q 10/06311 |
| 2018/0341904 A1 * | | 11/2018 | Aleman ................ G06Q 50/28 |
| 2018/0374040 A1 | | 12/2018 | Hunt |
| 2019/0026690 A1 | | 1/2019 | Wappler et al. |
| 2019/0034873 A1 | | 1/2019 | Boitel et al. |
| 2019/0062055 A1 | | 2/2019 | Hance et al. |
| 2019/0064835 A1 * | | 2/2019 | Hoofard .................... B60D 1/62 |
| 2019/0066033 A1 | | 2/2019 | Mains, Jr. et al. |
| 2019/0066035 A1 | | 2/2019 | Hance et al. |
| 2019/0066041 A1 * | | 2/2019 | Hance .................. G06Q 10/087 |
| 2019/0087777 A1 | | 3/2019 | Turner et al. |
| 2019/0130351 A1 | | 5/2019 | Arena |
| 2019/0132714 A1 | | 5/2019 | Arena |
| 2019/0287066 A1 | | 9/2019 | Kellaway, Jr. et al. |
| 2019/0378087 A1 | | 12/2019 | Easter et al. |

OTHER PUBLICATIONS

Braun, Gregory, Understanding dock schedule C3 Solutions, Mar. 2015 (Year: 2015).*
Mongelluzzo, Bill, LA-LB ports repurposing land to aid truckers JOC.com, Aug. 22, 2017 (Year: 2017).*
Dock Schedule Software Vendors, Distribution Center Management Alexander Communications Group, Inc., 2009 (Year: 2009).*
Descartes.com—Descartes Dock Appointment Scheduling Software Descartes.com, May 2016, Retrieved from Archive.org Apr. 7, 2020 (Year: 2016).*
Bran, Gregory, Everything you need to know about buying a Dock Appointment Schedule System C3 Solutions, May 2017 (Year: 2017).*
Oracle Yard Management—Extending the Oracle Value Chain Execution Solution Oracle, 2016 (Year: 2016).*
Dubin, Cindy H., Delivery Scheduling Relieves Loading Dock Bottlenecks InboundLogistics.com, Jun. 2013 (Year: 2013).*
"Savings accrue from on-line from truck screening" https://www.itsinternational.com/sections/cost-benefit-analysis/features/savings-accrue-from-on-line-from-truck-screening/, last accessed on Jan. 7, 2020.

* cited by examiner

□ ○ ○

| SCHEDULE | TRACKING | ALERTS | DOCUMENTS | | Q | ACCOUNT |

CONFIRM APPOINTMENT REQUEST FOR 01-07-2018 AT 10:30 AM

ORIGIN ← 604

FEDEX
12 Street Xxxx
City, XX 12345
123-123-1234

SHIPMENT ← 608

| CARRIER ID | LOAD TYPE ← 610 | SHIPMENT ID ← 612 |
| 407619 | FTL | 49521639 |

| DRIVER NAME | DRIVER PHONE NUMBER |
| Not Submitted ← 614 | Not Submitted ← 614 |

| TRUCK NUMBER | TRAILER NUMBER |
| Not Submitted ← 616 | Not Submitted ← 616 |

⚠ APPT. CANCELLATION ← 602
THE DRIVER'S PHONE
NUMBER MUST BE
PROVIDED BY 01-03-2018
OR THIS APPOINTMENT
WILL BE CANCELED

DESTINATION ← 604

CRC GLOBAL SOLUTIONS
1234 Street Yyyy
City 2, YY 54321
321-321-4321

CONFIRM
APPOINTMENT
REQUEST?

| EDIT | CONFIRM |
| ← 620 | ← 618 |

SCHEDULE  TRACKING  ALERTS  DOCUMENTS

ACCOUNT

APPOINTMENT REQUEST RECEIVED FOR 01-07-2018 AT 10:30 AM ← 700

| ORIGIN | SHIPMENT | | |
|---|---|---|---|
| FEDEX<br>12 Street Xxxx<br>City, XX 12345<br>123-123-1234 | CARRIER ID<br>407619 | LOAD TYPE<br>FTL | SHIPMENT ID<br>49521639 |
| | DRIVER NAME<br>Not Submitted ⌒614 | | DRIVER PHONE NUMBER<br>Not Submitted ⌒614 |
| DESTINATION<br>CRC GLOBAL SOLUTIONS<br>1234 Street Yyyy<br>City 2, YY 54321<br>321-321-4321 | TRUCK NUMBER<br>Not Submitted ⌒616 | | TRAILER NUMBER<br>Not Submitted ⌒616 |

⚠ APPT. CANCELLATION
THE DRIVER'S PHONE NUMBER MUST BE PROVIDED BY 01-03-2018 OR THIS APPOINTMENT WILL BE CANCELED

THIS IS NOT AN APPOINTMENT CONFIRMATION. You will receive a notification when your appointment is confirmed

[DONE] ⌒704    [ADD NEW] ⌒702

FIG. 7

SCHEDULE   TRACKING   ALERTS   DOCUMENTS                    ACCOUNT

CONFIRM APPOINTMENT REQUEST FOR 01-07-2018 AT 10:30 AM
STEP 3 OF 3

CONFIRM APPOINTMENT REQUEST?

[ EDIT | CONFIRM ] — 802
  804

ORIGIN                           SHIPMENT

FEDEX                            CARRIER ID      LOAD TYPE    SHIPMENT ID
12 Street Xxxx                   407619          FTL          49521639
City, XX 12345
123-123-1234
                                 DRIVER NAME           DRIVER PHONE NUMBER
                                 Dennis Lynch          764-444-9819
                                            — 614              — 614

TRUCK NUMBER          TRAILER NUMBER
                                 234585                873664
                                        — 616                 — 616

DESTINATION

CRC GLOBAL SOLUTIONS
1234 Street Yyyy
City 2, YY 54321
321-321-4321

FIG. 8

SCHEDULE  TRACKING  ALERTS  DOCUMENTS  ACCOUNT

APPOINTMENT REQUEST RECEIVED FOR 01-07-2018 AT 10:30 AM ←900

ORIGIN  SHIPMENT

FEDEX  CARRIER ID  LOAD TYPE  SHIPMENT ID
12 Street Xxxx  407619  FTL  49521639
City, XX 12345
123-123-1234  DRIVER NAME  DRIVER PHONE NUMBER
  Dennis Lynch  764-444-9819
  ⌐614  ⌐614

TRUCK NUMBER  TRAILER NUMBER
  234585  873664
  ⌐616  ⌐616

DESTINATION

CRC GLOBAL SOLUTIONS
1234 Street Yyyy
City 2, YY 54321
321-321-4321

THIS IS NOT AN APPOINTMENT CONFIRMATION.
You will receive a notification when your appointment is confirmed

DONE   ADD NEW
704⌐    ⌐702

FIG. 9

DAILY SCHEDULE — 2800

◁ 📅 01-02-2018 ▷

| STATUS ∨ | TIME ∨ | DOCK ∨ | CARRIER ∨ | SHIPPING # ∨ | INBOUND/OUTBOUND ∨ | BOL ∨ | |
|---|---|---|---|---|---|---|---|
| Early | 7:00 AM | W 85 | FedEx | 999428628 | OUTBOUND | ✗ | ✎ EDIT |
| On Time | 8:45 AM | S 90 | Monsanto | 848454398 | INBOUND | ✓ | ✎ EDIT |
| On Time | 9:15 AM | E 66 | UPS | 992899333 | OUTBOUND | ✓ | ✎ EDIT |
| ⚠ Delayed | 9:45 AM | N 31 | Monsanto | 154466478 | OUTBOUND | ✓ | ✎ EDIT |
| On Time | 10:00 AM | SE 33 | UPS | 134728425 | INBOUND | ✓ | ✎ EDIT |
| Redirected | 10:30 AM | NW 34 | UPS | 796343707 | OUTBOUND | ✓ | ✎ EDIT |
| On Time | 11:15 AM | N 84 | Monsanto | 255226208 | INBOUND | ✓ | ✎ EDIT |
| On Time | 11:45 AM | NW 77 | Monsanto | 324103034 | INBOUND | ✓ | ✎ EDIT |
| Redirected | 12:00 PM | E 8 | FedEx | 417736680 | INBOUND | ✓ | ✎ EDIT |
| On Time | 1:00 PM | SE 90 | UPS | 666825109 | OUTBOUND | ✓ | ✎ EDIT |
| ⚠ Unconfirmed | 1:30 PM | S 63 | Monsanto | 858384908 | INBOUND | ✓ | ✎ EDIT |
| On Time | 2:00 PM | SW 9 | Monsanto | 641933914 | OUTBOUND | ✗ | ✎ EDIT |
| Early | 2:45 PM | SW 68 | Monsanto | 394800112 | OUTBOUND | ✓ | ✎ EDIT |
| On Time | 3:30 PM | NE 99 | Monsanto | 575870491 | INBOUND | ✓ | ✎ EDIT |

FIG. 28

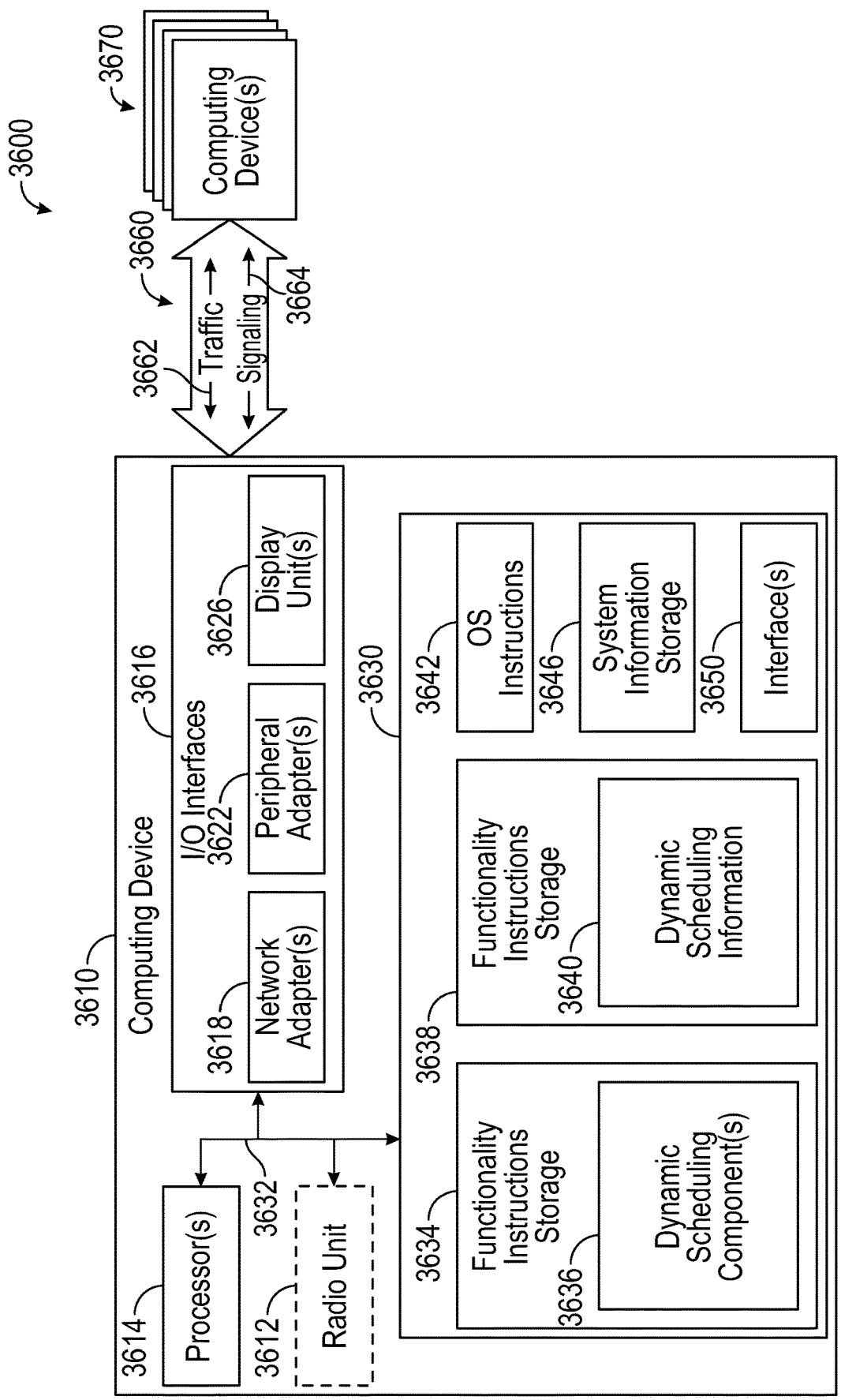

PROVIDING TRUCK DRIVERS DIRECTIONS TO A LOADING DOCK OR AN OFF-SITE LOCATION BASED ON DOCK AVAILABILITY

CROSS REFERENCE TO RELATED APPLICATIONS

This application claims the benefit of U.S. Patent Application No. 62/553,027, filed Aug. 31, 2017, the contents of which are incorporated by reference herein and priority of which is hereby claimed.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

FIG. 6 illustrates an example screen of a scheduling portal showing an alert message, according to one or more embodiments of the present disclosure.

FIG. 7 illustrates an example screen of a scheduling portal showing an alert message, according to one or more embodiments of the present disclosure.

FIG. 8 illustrates an example screen of a scheduling portal, according to one or more embodiments of the present disclosure.

FIG. 9 illustrates an example screen of a scheduling portal, according to one or more embodiments of the present disclosure.

FIG. 28 illustrates an example screen of an administrative portal, according to one or more embodiments of the present disclosure.

FIG. 36 is a block diagram of a computer system for disclosed system components, according to one or more embodiments of the present disclosure.

DETAILED DESCRIPTION

Figure 1:
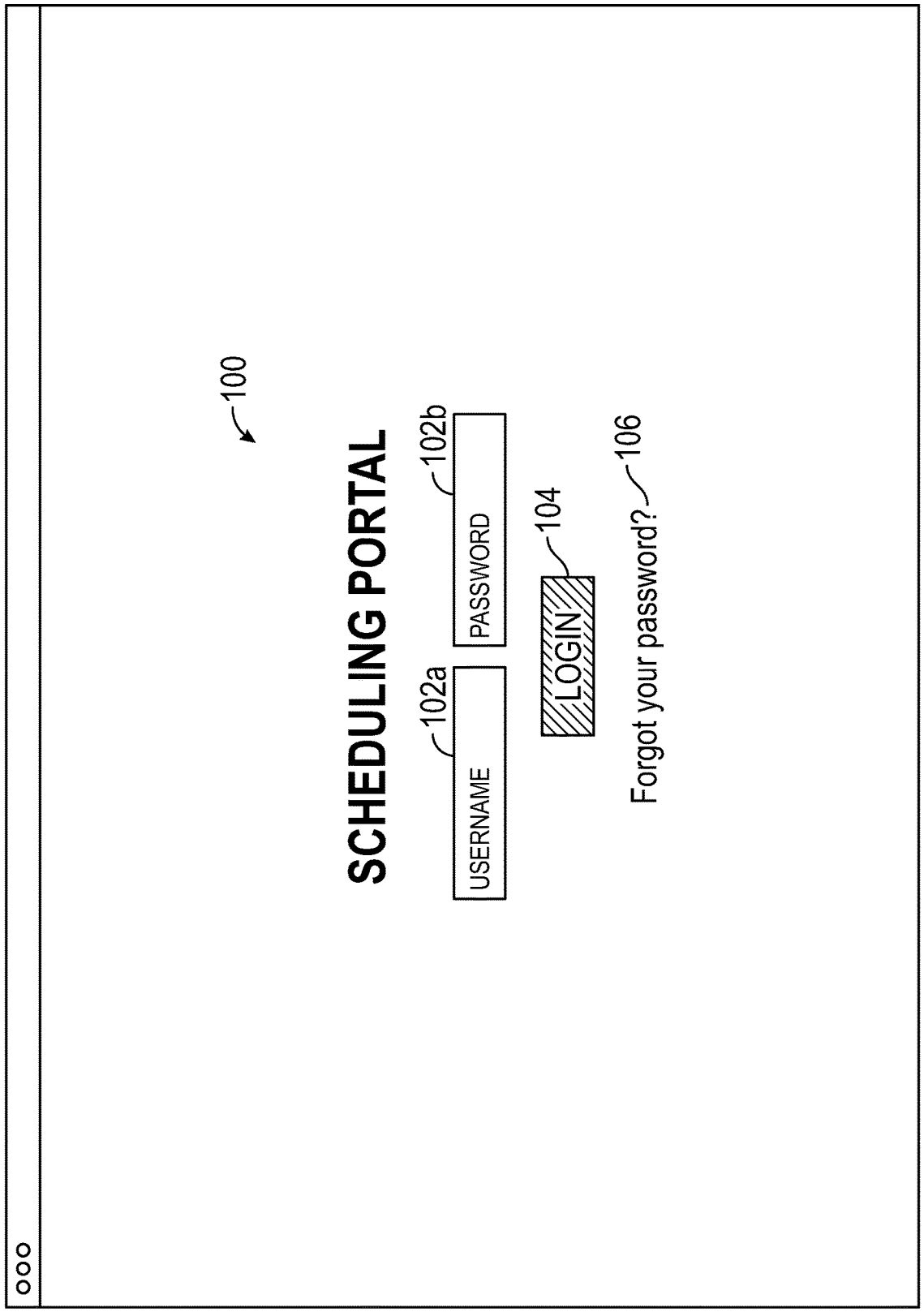
FIG. 1 illustrates an example screen of a scheduling portal, according to one or more embodiments of the present disclosure.

Disclosed systems, methods, and computer program products address issues of parking and vehicular traffic at a facility, such as a warehouse or a merchandise distribution hub, and provide improved supply chain logistics for transportation and distribution of goods. A combination of inefficient scheduling systems, limited dock space, and personnel redundancy has created significant parking and traffic issues around the majority of distribution hubs. The rapid increase of third party logistics (3PL) providers has increased the problem by creating fragmented accountability for transportation scheduling, multiple layers of dispatchers, and redundant call centers to schedule and track single deliveries. The lack of viable parking for truckers waiting to load/unload creates problems for cities, police, truckers, and warehouses. Disclosed embodiments may further provide improvements to other modes of transport and distribution of goods. For example, a disclosed scheduling and communication system may be effectively used for coordinating loading/unloading conveyances including ships, aircraft, etc., involving various storage facilities (e.g., grain elevators used to load and unload ships).

Disclosed embodiments provide a fully digital solution that integrates facility appointment scheduling, shipment tracking, and direct driver messaging with real-time data on facility dock status to direct vehicle/vessel operators to their assigned docks or an offsite location before arrival at a facility. Disclosed embodiments include a cloud-based platform and multiple interfaces that seamlessly connect vehicle/vessel operators, carrier dispatchers, brokers, and facility operators.

Disclosed embodiments are designed to meet the needs of at least four major stakeholders in the supply chain: the buyer, the shipper, the carrier, and the facility, such as a warehouse or distribution center. To meet their needs, disclosed systems include modules that may be used by at least eight different users, all of which relate to one of the main stakeholders mentioned above. The eight players that are related to the four main stakeholder categories include the buyer, shipper, broker, carrier, driver, facility operator, dock worker, and verifier. These are described in greater detail as follows. The shipper can be a manufacturer, vendor, refinery, processing plant, etc., (i.e., any entity in the supply chain that can receive a purchase order).

The buyer initiates an order fulfillment process by placing an order with shippers, manufacturers, and/or vendors. Buyers may place orders on their own behalf or on behalf of end-users. End-users may be raw-material processors, refineries, retailers, direct consumers, etc. Buyers and end-users desire on-time and damage-free delivery and advanced notifications of delays.

The shipper typically is a manufacturer and/or vendor who fulfills the order. Shippers and/or manufacturers sometimes directly select carriers to transport an order, or may use brokers and intermediaries. Shippers generally want on-time shipment pick-ups, notification of shipment delays, notification and proof of delivery, inspection and confirmation of damage-free arrival, on-time delivery to end-user, and an ability to track assets to know they are secure.

A broker is often a 3PL provider who is engaged by a shipper to handle shipping logistics. The broker acts as an intermediary and selects carriers to fulfill the shipper's transportation needs. The broker works to comply with shipper requirements, to maintain a good working relationship with the shipper, and to select reliable carriers and drivers who can reliably meet shipment appointment times.

The carrier is a transportation provider who transports goods between locations along the supply chain via truck, rail, air, or vessel. Carriers seek to attain preferred carrier status by providing consistently reliable service. Carriers often employ location tracking and vehicle telematics to monitor driver performance and to avoid delivery delays. Carriers expect prompt receipt of proof of delivery (POD) after a shipment is delivered to a consignee. In this way, the POD may be promptly submitted to the shipper/manufacturer for payment to the shipper.

Drivers are employees or independent contractors of carriers who are individually assigned to transport shipments. Drivers seek to avoid delays because delays reduce a driver's hours of service and, in turn, reduce their income. Drivers also seek to reduce time spent driving trailers without cargo because such time also leads to reduced income. Drivers are incentivized to keep accurate records of arrival and departure time to ensure they receive detention and demurrage (D&D) payment for unavoidable delays at a pick-up/delivery facility. Drivers are also encouraged to promptly submit POD so they may avoid delays in receiving payment for their services.

Warehouse operators maintain intermediate storage locations that house inventory as it travels through the supply chain to reach the end-user. Warehouse operators benefit from advanced notifications on no-shows, next-day deliveries, and shipment delays, to reduce paying for unnecessary labor. Warehouse operators strive to maximize efficiency to thereby process more shipments per day to increase profitability. Warehouse operators also strive to keep diligent records (e.g., properly recording occurrences of damaged goods on the bill of lading (BoL)). Increased efficiency allows warehouse operators to increase profits by increasing warehouse capacity, reducing D&D fees paid to drivers, and increasing rates of on-time delivery.

Dock workers are warehouse employees that have duties related to outbound shipments, including driving forklifts, picking, packing, staging, and loading outgoing shipments into trucks. Dock workers may also be involved in duties related to incoming shipments, including unloading trucks, driving forklifts, and putting away received inventory. Dock workers are incentivized to perform their duties efficiently and to provide accurate inspection records.

Verifiers are warehouse employees who inspect inbound and outbound shipments for accuracy. This includes verifying that the correct cargo and quantities were picked, properly packaged, and were maintained in a damage free condition. Verifiers further check that all inbound delivered items are in the correct quantities, are damage free, and properly packaged. Verifiers also are incentivized to perform their duties efficiently and to provide accurate inspection records.

The above example describes the scheduling of interrelated activities of eight players (buyer, shipper, broker, carrier, driver, facility operator, dock worker, and verifier) in the supply chain. The disclosure is not limited, however, to the number of players whose activities are scheduled. In other embodiments, greater or fewer players/stakeholders may have interrelated activities that may be coordinated and scheduled using disclosed systems and methods.

The following provides a high-level summary of an example process, according to an embodiment. A summary of possible technologies that may be used at various points within the process is also provided. A web portal of a main scheduling software platform may allow brokers, carriers, and/or drivers to choose an available delivery or pick-up window before delivering to or picking up a shipment from a warehouse or distribution hub. Shipments may then be tracked in real time as drivers travel from points of origin to destinations. Updated location data may then be transmitted to the main scheduling platform. The scheduling platform may then combine information on shipment locations, planned stops, weather, and traffic to continuously generate up-to-date delivery estimated times of arrival (ETAs) for a plurality of shipments.

For the plurality of shipments, the platform may cross-reference all delivery and pick-up ETAs for each day relative to current and forecasted dock availability data to automatically prioritize and reschedule early or late shipments that cannot be immediately unloaded. Before arriving at a warehouse or distribution hub, the platform sends updated appointment data and instructions to drivers via drivers' mobile devices. Drivers may be instructed to proceed to an assigned dock door or to an off-site location nearby, such as a truck stop, to wait for their new appointment time.

Mobile alerts may be simultaneously sent to dock workers to inform them of schedule changes, direct them to the assigned dock, and to instruct them on the proper equipment needed for unloading. Once unloading is complete, dock workers may use mobile devices to confirm receipt of delivery and to confirm that the dock is available for further deliveries. The platform may be configured receive confirmation from dock workers that the dock is available. The platform may further incorporate such information provided by dock worker for continued scheduling optimization. In other embodiments, dock workers may receive information on schedule changes, dock and equipment instructions, and additional alerts and notifications via automated or manual voice commands.

Disclosed systems include various software modules and a cloud-based master platform that may control other disclosed systems and may have multiple access levels for different users. Authorized users may be identified during a setup process. Disclosed embodiments may include at least three access levels. Access levels for warehouse operators may include (1) an executive master user view, (2) an administrator master user view, and (3) a limited access user view, as described in greater detail below.

The executive master view is intended for managers and/or executives and may include a high-level analytics dashboard that provides real-time information for all facilities connected to the platform. Information provided by the dashboard may provide warehouse productivity statistics including: percentage breakdowns for on-time, early, delayed, and rescheduled appointments; positive and negative trends in warehouse labor productivity; positive and negative trends in warehouse throughput/load volumes; statistics related to average load and unload time per inbound and outbound shipments; etc. Information provided by the dashboard may further include statistics related to carrier performance, alerts for unexpected deviations from historical warehouse data, and data related to percentages of shipments that reached end-users as scheduled.

The administrator master user view is intended for an operations manager or other warehouse worker responsible for daily warehouse activities. This view may provide information on appointments for the day, delays, re-scheduled appointments, and other features important to streamlining operations in real-time. Such features may include: daily scheduled inbound and outbound deliveries, daily completed inbound and outbound deliveries, inbound truck locations and updated ETAs, dock worker location and status, verifier location and status, driver arrival and departure times, etc.

The limited access user view is intended for warehouse clerks, customer service reps, or gate guards with limited ability to alter automated functions; for example, a gate guard using a tablet computer (or other computing device) at the entrance to the facility may have access to the updated schedule and real-time dock status, but may lack the ability to alter appointments.

Carriers and brokers may interact with the system using a scheduling portal, which may be a limited-access web-based module. The scheduling web portal may be implemented as a module of the master platform. The module may allow carriers and brokers to schedule delivery and pick-up appointments with facilities like warehouses. Carriers and brokers may also log in to the portal while shipments are in transit to check the status and location of drivers during transit. A location view of the scheduling web portal may pull information from the master platform but may show locations only of drivers associated with the specific carrier and brokered load and may not provide information regarding drivers associated with all carriers and all facility locations.

In certain embodiments, communications with drivers, dock workers, and verifiers may occur via progressive web applications (i.e., "apps") rather than via native apps. Such implementations may ease maintenance of apps, may avoid potential non-compliance by eliminating the hassle of downloading an app, and may prevent a need to create multiple versions of various apps to accommodate different operating systems. In other embodiments, communications with drivers, dock workers, and verifiers may occur via SMS, manual voice commands, and/or automated voice commands.

Drivers may use a progressive web app or native app for initial registration, for pick-up confirmation, for receiving in-transit updates, and for receiving instructions regarding redirection, warehouse check-in, and dock assignments. In other embodiments, drivers may use SMS or voice-enabled commands for the aforementioned activities.

Facility dock workers and verifiers may also use a web app or native app to receive assignments for unloading inbound shipments, loading outbound shipments, to receive information regarding necessary equipment (e.g., forklifts), and to receive instructions regarding shipment verification. Along with assignments, the apps may include procedures for dock workers and verifiers to follow while performing loading and unloading tasks and for checking the packaging, quantity, and damage to any transported goods to note on the BoL. In other embodiments, dock workers may receive assignments and information via SMS or voice-enabled commands. These procedures are intended to provide information to administrative master users and to limited-access users regarding the status of loading and unloading, to provide high-level data on worker productivity to executive master users, and to allow the system to predict labor availability for ongoing dock scheduling optimization.

Input data needed to set up and run the software for a particular installation may generally be warehouse specific. Each warehouse where the software is implemented may have characteristic values for each input, which arise at one or more stages in a process of setting up the system for a particular warehouse. For example, a setup process may request and receive answers to a set of standard warehouse-specific set-up questions. Answers to certain per-shipment questions may provide information that may be used to optimize daily schedules and to maximize throughput of shipments. The system may further receive information regarding driver location, traffic, and weather from various external systems.

Disclosed systems may further include various application programming interfaces (APIs) that may be used to simplify use of the system. Such APIs may be used to generate Quick Response (QR) codes, electronic documents, electronic signatures, etc. These APIs may also receive warehouse-specific inputs to provide appropriate functionality. Based on warehouse preferences regarding the extent of optimization desired, APIs may be developed on a case-by-case basis to integrate disclosed systems with particular warehouse management systems (WMS), yard management systems (YMS), or transportation management systems (TMS). The integration of disclosed system APIs with specific WMS, YMS, and TMS allows disclosed systems to pull carrier and driver data, POs and BoLs, and inventory data to automatically send pick-lists to dock workers.

Answers to standard warehouse-specific setup questions provide data regarding general information, labor and equipment availability, dock information, staging area information, estimated staging time per package type, estimated load time per package type, estimated unload time per package type, and warehouse preferences. Answers to questions regarding general information may provide data regarding hours of operation and shifts, average daily throughput, warehouse type, number of warehouse locations, and current average turn-time (for benchmarking purposes and return-on-investment (ROI) calculations).

Answers to questions regarding labor and equipment availability may provide data regarding numbers of laborers at a given warehouse per-shift, and whether such laborers are limited to a specific role or if all laborers can perform all warehouse functions, such as picking and packing, driving forklifts, and unloading or loading trucks, interchangeably. For example, there may be different numbers of workers as a function of day, shift, etc. Such input data allows disclosed systems to accommodate such variations. Data regarding workers may specify numbers of pickers, forklift drivers, dock workers, verifiers, etc. Data may further specify available equipment such as, for example, specifying a number of forklifts at a given warehouse per-shift.

Answers to questions regarding dock information may provide data regarding a number of dock doors and dock door designations. Dock doors may be restricted to certain shippers, goods, carriers, etc., and designating dock doors may depend on a combination of features, such as a type of shipment, a type of cargo, a preferred carrier, and throughput (i.e., how many deliveries or pick-ups a given dock door can accommodate per hour). Door designations may specify usage types including inbound shipments only, outbound shipments only, mixed use docks, docks dedicated to specific transportation routes, full truckloads (FTL), less than a truckloads (LTL), etc. Designation of cargo or commodity types, for example, may include raw materials, liquids, food grade, refrigerated, frozen, etc.

Answers to questions regarding staging area information for outbound loads may provide data regarding a number of staging areas, a size of each staging area, which docks are serviced per staging area, staging area designations (e.g., which may mimic dock designations), throughput (e.g., how many outbound shipments each dock door may accommodate per hour), etc. For example, the staging area may be designated by type of shipment, such as FTL or LTL, cargo/commodity type, destination, etc., and may be associated with one or more docks based on the designation of the staging area and compatible dock designations.

Other important information includes data regarding an estimated time required for staging and for loading. In this regard, load and unload times may depend on package types, including whether the package to be loaded or unloaded is a pallet, a carton, a bag, etc. In general, loading typically takes approximately twice as long as unloading. For example, it may take about six minutes to load a pallet while it may take about three minutes to unload a pallet.

Answers to further questions may provide data regarding warehouse preferences. Such preferences may include terms related to preferred names for laborers, to shipment identification (ID), and to warehouse internal process steps. A shipment ID relates to a given warehouse's preferences for tracking deliveries for use in the scheduling web portal. For example, shipment ID may include designation of a BoL number, a purchase order (PO) number, a delivery number, a shipment number, etc. Data related to warehouse internal processes may specify procedures related to shipment loading and unloading in terms of staff, schedules, and protocols for receipt of incoming goods, and protocols for staging and loading of outgoing goods. Procedures may also include one-step, two-step, or multi-step verification procedures.

Disclosed systems may rely on dynamic input and APIs. During set-up and while disclosed systems are live, various inputs may be used along with standard initial set-up questions (described above) to optimize dock scheduling on a real-time basis. Standard and dynamic input data may provide input to calculations and algorithms that are used to determine optimal scheduling for a plurality of shipments. Dynamic data may be gathered based on input received at a scheduling portal (described in greater detail below) and input received from one or more real-time APIs. Input received from the scheduling portal may include shipment ID (described above), order quantity, load type, commodity, driver name and phone number, truck and trailer number, etc. Data received from real-time APIs may include information related to location tracking, traffic, weather, truck-routes, route optimization, and potential use (e.g., as specified in terms of geo-fencing data). Dynamical data may also include exceptions that occasionally arise such as information related to broken dock doors, broken forklifts, labor surpluses, labor shortages, etc. Such exceptions generally may need to be entered manually.

Optimization of dock schedules may be related to setup information, dynamic information, and information received via input to various APIs. For example, standard setup questions and dynamic inputs provided via the scheduling portal and information received from APIs may serve as primary data that may govern dock optimization. Ways in which various data inputs interact is described in the following.

For example, two useful pieces of information include an estimated arrival at time of driver shipment pickup and estimated arrival time during transit. The arrival time at time of driver shipment pickup may be calculated as an actual pick-up time plus travel time. In this example, travel time may be estimated based on input from a tracking API in terms of distance to the warehouse, based on predicted weather and traffic conditions, as well as based on predicted traffic route. The estimated arrival time during transit may be based on actual real-time location plus travel time. As before, the travel time may be determined based on input from a tracking API in terms of distance to the warehouse, based on predicted weather and traffic conditions, as well as based on a predicted traffic route. The system my further request and receive information from drivers regarding any planned stops and an estimated stop time before they start driving. In this regard, the system may take "slack time" into account in generating an accurate ETA.

Another useful piece of information includes an estimated time for loading and unloading. Such estimated loading and unloading times may be used to estimate how long the dock will be occupied. This information may be used to provide a prediction regarding when the dock and when the associated labor will be available again after starting a load/unload job. Estimated load and unload time depends on (1) types of packages being delivered/shipped, (2) an amount of time it takes to load/unload each type of package, and (3) a quantity of each type of package being delivered/shipped. Further, load times are typically twice as long as unload times. An estimated load time may be given as the average time per package type times the number of packages. For example, if a warehouse must load three pallets and two cases into a truck, the calculation would be given as: load time=3*(average time to load one pallet)+2*(average time to load one case).

Another useful piece of information relates to real-time estimates of dock availability. Such dock availability estimates may depend on one or more of a dock designation, a shipment type, load/unload times, labor availability, updated ETAs, etc.

Disclosed systems may include various embodiments that may be used at different points in various processes depending on a user level of sophistication and may depend on a selected software service tier (e.g., basic, pro, enterprise). Various software components/modules may include a warehouse master dashboard, a scheduling portal, a truck driver, dock worker, and verifier app, SMS system, manual or automatic voice commands, etc. The warehouse master dashboard may determine available appointments based on dock designation, shipment type, load/unload time, labor availability, and updated ETAs. The master dashboard may display a list of available appointments and request user-input designating a requested appointment. After a carrier selects an appointment, the master dashboard may confirm the appointment and may notify the carrier to supply other required information, such as information regarding an assigned driver corresponding to the appointment that was selected.

When a truck driven by an assigned driver is in transit, the system may periodically ping the driver to determine the driver's progress and to gather information that may be needed for revising/updating the schedule. For example, the master dashboard may ping the driver (i.e., may automatically communicate with a device used by the driver) every thirty minutes until the last hour of transit. If a driver's mobile device or smartphone is unavailable, the system may ping other devices, such as a carrier's TMS system or an Electronic Logging Device (ELD) associated with the truck.

During the last hour of transit, the master dashboard may ping the driver every fifteen minutes. The system may further use real-time location tracking (e.g., cellular triangulation, GPS, etc.), traffic information, information regarding road closures, etc., to track timeliness of a driver's progress. The system may further generate appointment updates if needed and may send alerts to warehouse administration, who may then confirm appointment changes.

While a driver approaches the warehouse, the system may determine whether the driver should proceed directly to an assigned dock or whether the driver should proceed to a truck stop or other waiting area until a dock is available. The determination regarding whether the driver should proceed to the dock or should go elsewhere may be determined based on dock availability, dock worker availability, staged status (i.e., goods staged for pick-up of outgoing shipments), designation of preferred carrier, etc. If the system determines that the driver should proceed to the dock, the system may send a dock number assignment to the driver. The system may further send information to a dock worker regarding the assigned dock and information regarding equipment that will be needed at the dock (e.g., a forklift).

Alternatively, if a dock and/or dock workers are not readily available, the system may instruct the driver to proceed to the truck stop or other waiting area until further instructed. When a dock is ready (i.e., when a dock and dock workers are available), the system may send a notification to the driver to proceed to an assigned dock. The system may further send information to one or more dock workers regarding the assigned dock and regarding equipment that is needed. After a loading or unloading operation has been completed, the system may receive dock worker information that may be incorporated into dock availability analysis. The system may then send various information including notifications, documents, invoices, etc., to the shipper and other related parties.

The system may include a scheduling portal that may be configured to receive input information from a carrier or broker. Input received from the carrier or broker may include pre-shipment information and requested appointment details. Such information may include broker and carrier ID, shipment ID, load type, device information (e.g., driver cell phone number), origin details, commodity or packaging details, quantity of items, etc. Information regarding a shipment's origin may include a shipper name, address, and pick-up time. Information regarding a shipment's destination may be manually input or selected via a dropdown menu and may include a preferred delivery date, etc. Upon receipt of the above-described information, the scheduling portal may provide a menu of selectable appointment options that are determined based on availability. A carrier or broker representative may then select an appointment. Upon receiving an appointment selection, the system may provide an appointment confirmation. If the carrier or broker representative fails to provide device information (e.g., driver cell-phone number) for a shipment, the system may provide a prompt to the representative requesting input of such device information.

While a truck is in transit, the scheduling portal may provide a limited view to carrier representatives through a log-in portal. In such a limited view, the system may provide information regarding only trucks/drivers associated with the carrier and may deny access to information related to trucks/drivers associated with other carriers. With this limited view, a carrier may view progress of their trucks based on information gathered during recent pings. After loading or unloading operations have been completed, the system may receive delivery confirmation from warehouse operators and/or from the driver. The system may then receive documentation, invoices, etc.

The system may further gather and provide information to drivers via a driver app running on a driver's mobile device (e.g., smart phone, etc.). The driver app may gather information at specific points in time or locations along the transportation route. For example, at a pick up location, a driver may receive an alert from the app requesting pick up verification. The driver may then enter information to the app to confirm pick up and to record time of pick up. Prior to pick up, the app may provide information to the driver regarding a scheduled pick up and location. The app may provide the information visually, in text form, or via manual or automated voice commands. Alternatively, the app may contact the driver via an automated phone call at a predetermined time before the scheduled pick up. For example, the app may call the driver 90 minutes before pickup, 60 minutes before pickup, etc.

Communication with a driver may be achieved using a driver app, as mentioned above and described throughout the disclosure below. The use of a driver app, however, is only one way to communicate with a driver and is used herein merely as an example for clarity. Other embodiments may use other modes of communication. For example, communication with a driver may be accomplished with text messaging (e.g., SMS), with automated voice calls, with PWA, with a native app, etc. For simplicity of discussion, a driver app is assumed in the following.

While in transit, the driver app may confirm tracking notifications via SMS (voice to text)/app/call functionality and may receive notifications when the appointment is adjusted or updated. When the driver is approaching the warehouse, the driver app may provide instructions to the driver. As described above, the instructions may include an indication that the driver should proceed to an assigned dock or that the driver should proceed to a truck stop or other designated waiting area. If instructed to proceed to the warehouse, the driver app may provide a dock number assignment and may prompt the driver to confirm that the instruction to proceed to the dock has been received. The app may then receive a confirmation from the driver.

Alternatively, if the driver is instructed to proceed to a truck stop or other waiting area, the app may provide instructions or directions to the truck stop or other waiting area. While a driver is waiting at the truck stop or other waiting area, the driver app may provide functionality to allow the driver to check in to alert the warehouse of the driver's arrival. For example, the driver may be provided with a QR code that may be scanned by a QR code reader or other check in apparatus. When a dock becomes available, the driver app may alert the driver and provide instructions to the driver to proceed to an assigned dock. The driver app may then prompt the driver for confirmation input. The driver app may then receive input from the driver confirming that the driver has received the instructions to proceed to the dock.

The system may provide a similar app to dock workers and verifiers that allows such workers to coordinate their activities relative to the driver, shipper, carrier, and warehouse operators. Such a dock worker app may be implemented on a dock worker's mobile device (e.g., may be implemented on a mobile phone or smart phone). For example, at the beginning of a dock worker's shift, the dock worker app may provide functionality for the dock worker to log into the system and to receive a schedule with appointment details. Appointments may include information regarding incoming and outgoing loads. As with the driver app, described above, the use of a dock worker app is only one mode of communication that may be employed. For example, communication with a dock worker may be accomplished with text messaging (e.g., SMS), with automated voice calls, with PWA, with a native app, etc. For simplicity of discussion, a dock worker app is assumed in the following.

The dock worker app may inform dock workers of dock door assignments and may provide information regarding equipment that may be needed to perform loading and unloading functions. After completing loading/unloading operations, dock workers may use the app to enter information confirming completion of loading/unloading operations. Dock workers may further use the dock worker app to confirm arrival and departure of delivery trucks. Following completion of a given assignment, dock workers may receive instructions for new assignments via the dock worker app. At the end of a work shift, dock workers may use the app to log out from the system.

The following examples illustrate how the system may be used in practice. After a shipper receives a shipment order from a customer, the shipper may select a carrier or broker to transport the shipment to a warehouse or distribution hub. Before picking up the shipment from the shipper, the carrier or broker may log into the platform's carrier web-portal to choose an available delivery window. The following description provides one scenario for how the system may be used.

In a first stage, the shipper may select a carrier or broker for transporting a shipment. If the shipper chooses to use a broker, then the broker may interact with the system using the scheduling portal web address in an internet browser. The broker may choose to act as carrier or the broker may coordinate with a carrier. In either case, actions performed by a carrier or by a broker acting as a carrier are similar, as described in greater detail below. If the shipper chooses to use a carrier, the carrier may interact with the system using the scheduling portal. By using the carrier web portal, the carrier may input a carrier ID number to authenticate the carrier and to initiate carrier onboarding.

If the carrier ID number is authenticated, then the carrier may activate additional screens of the scheduling portal to enter additional information and to create a unique carrier account. In this regard, the carrier may create an account using a login username and password. Alternatively, the carrier may use a login username and password that was previously created. If the carrier ID number is not authenticated, then the scheduling portal may display an error message. Along with the error message, the scheduling portal may further display a message requesting the carrier to make a second attempt to enter the carrier ID number and to be authenticated. If the procedure fails again, the scheduling portal may display a message instructing the carrier to contact support staff to help solve the problem. In such a situation, the carrier may contact support staff who may generate a new login username and password or may assist in other troubleshooting procedures.

When a procedure for authenticating a carrier username and password is successful, the carrier may log into the system. In some embodiments, the process of entering a carrier ID number may only be needed during the set up phase. Once the carrier has established an account with a username and password, future logins may only require the carrier to use the established username and password to log into the system.

FIG. 1 illustrates an example screen 100 of a scheduling portal, according to one or more embodiments of the present disclosure. Screen 100 may be presented on a graphical user interface (GUI) of a user device. Screen 100 may be activated by entering a web address into a web browser on a user device. Screen may include graphical elements that allow a user to enter information. In this example, screen 100 may include text entry box 102a and text entry box 102b. A user may enter a username into text entry box 102a. The user may also enter a password into text entry box 102b. Upon entry of the username and password into text entry boxes 102a and 102b, the user may submit the username and password information by selecting a further graphical element. In this example, the user may select a graphical element representing a login button 104. The user may select the login button 104 with a keystroke or a mouse click to enter the username and password information. Screen 100 may further provide a graphical element 106 to help a user who has forgotten one or more pieces of log-in information. In this example, graphical element 106 allows a user to initiate a process to reset a forgotten password.

Figure 2:
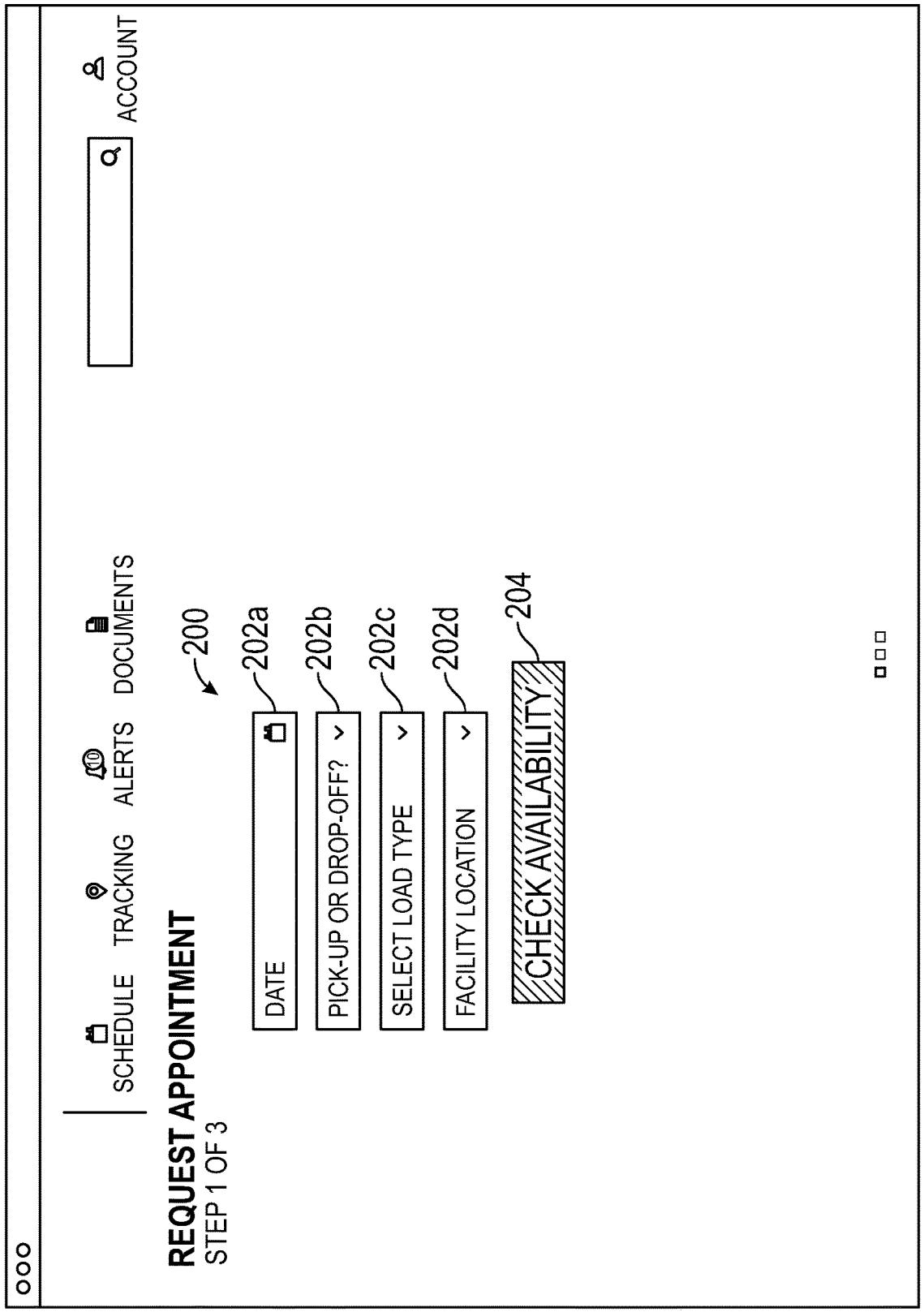
FIG. 2 illustrates an example screen of a scheduling portal, according to one or more embodiments of the present disclosure.

FIG. 2 an example screen 200 of a scheduling portal, according to one or more embodiments of the present disclosure. Screen 200 may be accessed after submission of log-in information from screen 100 (e.g., see FIG. 1) or from other screens (not shown) that allow entry of other relevant shipment information. In this example graphical elements 202a, 202b, 202c, and 202d are provided. A user may enter a desired appointment date using text entry box 202a. The user may designate whether a shipment is being picked up or being dropped off by entering information in text entry box 202b, selected from a drop-down menu, etc. A load type (e.g., FTL or LTL, specific type of cargo, etc.) may be designated by entering information in text entry box 202c. Further, a facility location may be designated by entering information in text entry box 202d. A user may submit the entered information by activating a graphical element. In this example, a graphical element representing a "CHECK AVAILABILITY" button 204 may be activated through a keystroke or a mouse click.

Figure 3:
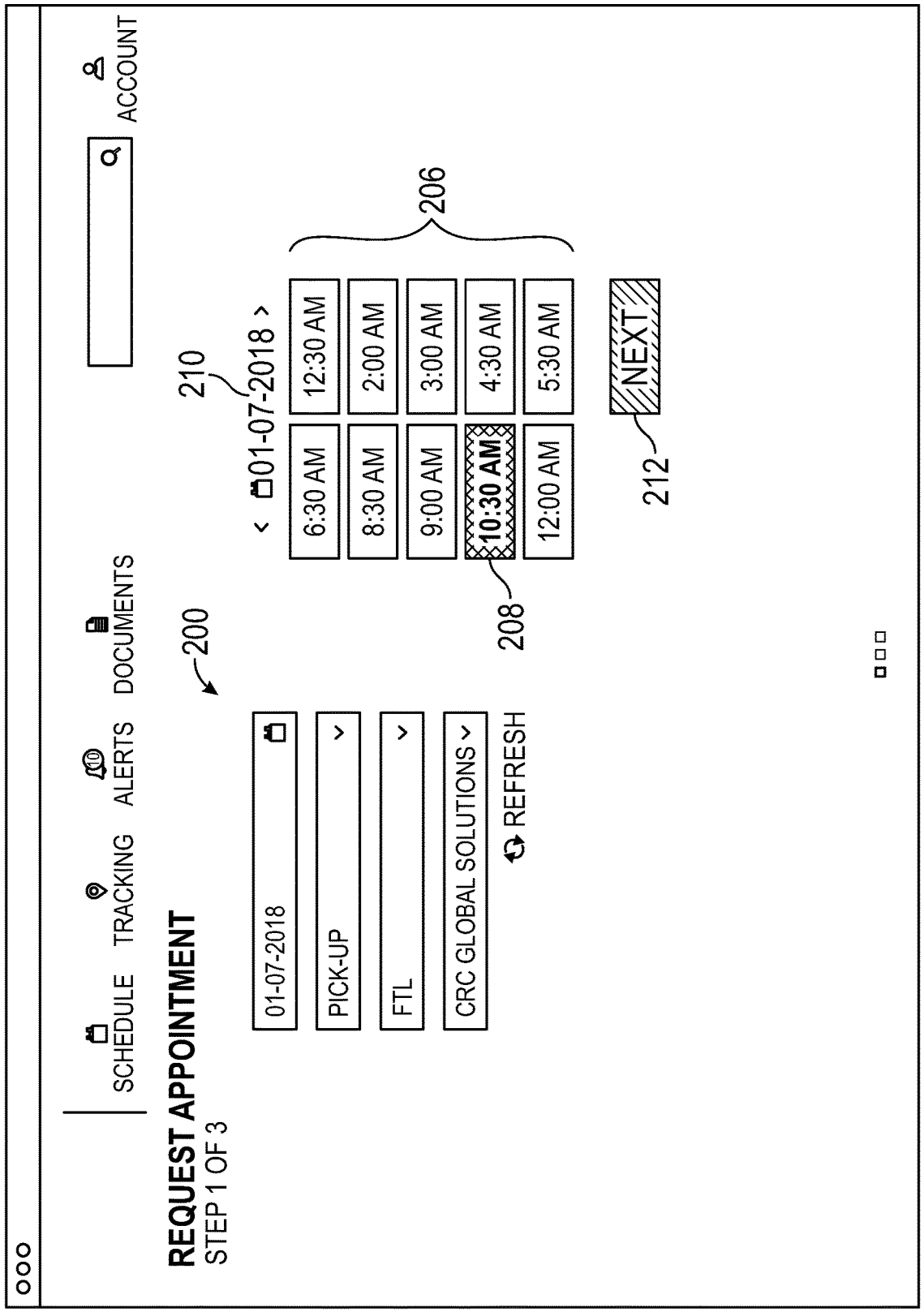
FIG. 3 illustrates a further configuration of the example screen of scheduling portal shown in FIG. 2, according to one or more embodiments of the present disclosure.

FIG. 3 illustrates a further configuration of the example screen 200 of a scheduling portal shown in FIG. 2, according to one or more embodiments of the present disclosure. FIG. 3 shows a configuration of screen 200 after the "CHECK AVAILABILITY" button 204 of FIG. 2 has been selected. In this regard, activation of the "CHECK AVAILABILITY" button 204 of FIG. 2 may cause screen to change its appearance to show text boxes 202a to 202d with the requested information filled in. Further, a plurality of selectable graphical elements 206 may be displayed, as shown in FIG. 3. Selectable graphical elements 206 may each represent various selectable appointment times. In this example, graphical element 208 has been selected to designate that an appointment is desired at 10:30 am. A further graphical element 210 allows a user to select a desired appointment date. In this example, the selected date is Jan. 7, 2018 represented as Jan. 7, 2018. A further graphical element 212 may represent a "NEXT" button that allows the user to input the selected information and to proceed to a next stage.

In further embodiments, the user (e.g., a carrier or broker) may designate the shipment as either an inbound or an outbound shipment. The scheduling portal may provide a drop-down menu (not shown) that may allow the carrier to select "inbound" or "outbound." In a first example, the carrier may select "inbound." In general, the terms "inbound" and "delivery" may be used interchangeably and "outbound" and "pick-up" may be used interchangeably.

In further embodiments, the scheduling portal may prompt the carrier to input further information relevant to an inbound shipment. For example, the carrier may be prompted to enter required booking information including a shipper name, an address of origin, and a shipment destination. In some embodiments, the shipment destination may be selected via a drop-down menu (not shown) of warehouse locations that were previously identified during an initial software set-up and customization process. The carrier may further enter shipment identification information. For example, the scheduling portal may request input of one or more of a BoL number, a PO number, a delivery number, a shipment number, an order number, etc. As described above, the carrier may select a preferred method of designating shipment identification information during a set up phase. For example, a carrier may prefer to only enter a single one of a BoL number, a PO number, a delivery number, a shipment number, an order number, etc. Alternatively, the carrier may choose to further specify two or more of such shipment identification information.

Figure 4:
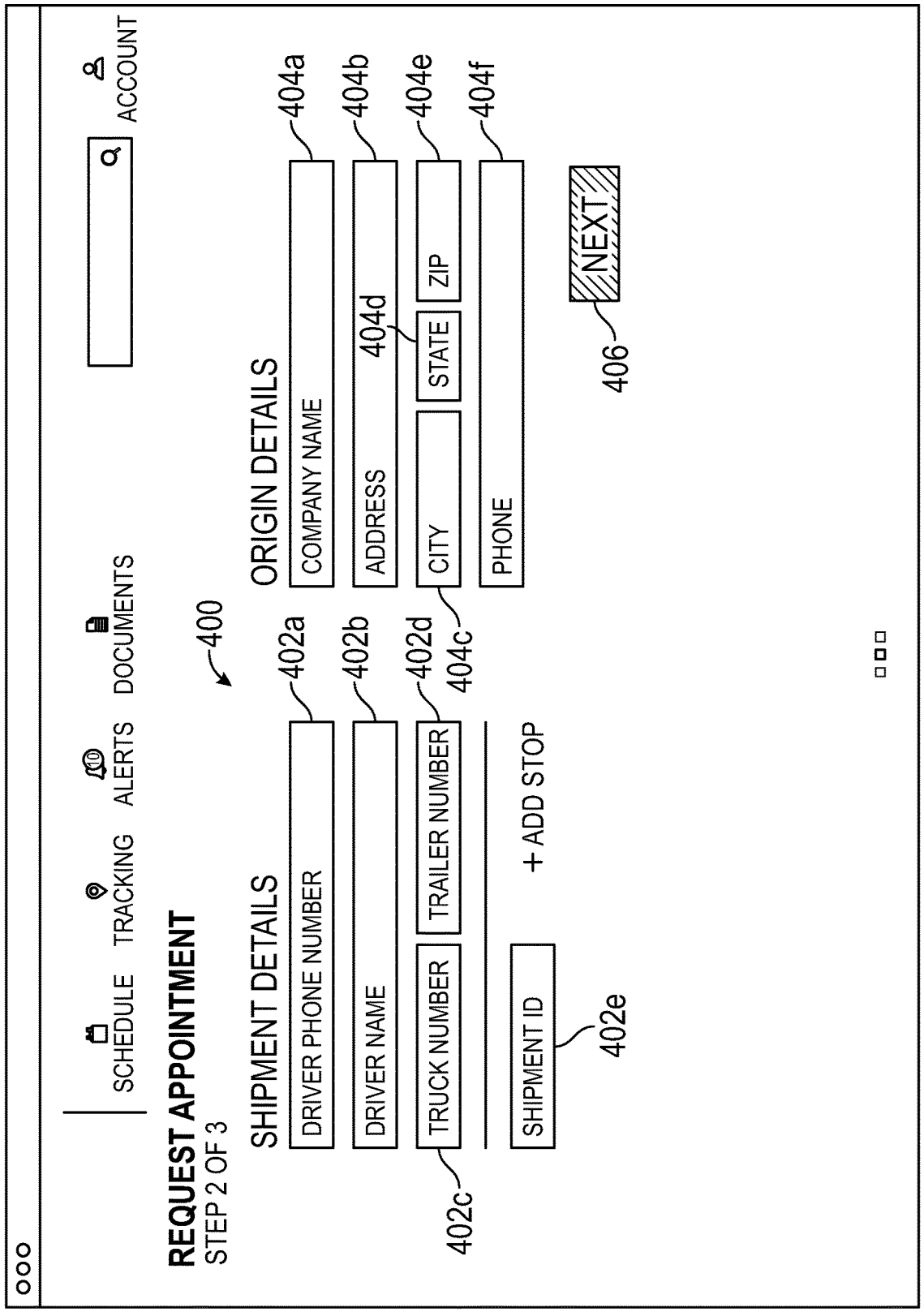
FIG. 4 illustrates an example screen of a scheduling portal, according to one or more embodiments of the present disclosure.

FIG. 4 illustrates an example screen 400 of a scheduling portal, according to one or more embodiments of the present disclosure. In this example, shipment information may be provided by entering text in various text boxes. For example, a driver phone number, a driver name, a truck number, a trailer number, and a shipment ID may be entered in text entry boxes 402a to 402e, respectively. Similarly, details regarding the origin of the shipment may be provided by entering text in various text boxes. For example, a company name, address, city, state, zip code, and phone number may be entered in text boxes 404a to 404f, respectively. This information may then be submitted to the system by selecting a graphical element. In this example, selection of a graphical element representing a "NEXT" button 406 submits the entered information and may initiate activation of a further screen of the scheduling portal.

In some embodiments, the system may be configured to be integrated with a Transportation Management System (TMS), with a Warehouse Management System (WMS), with a Yard Management System (YMS), etc. In such embodiments, the system may be configured to automatically retrieve all required shipment information that is needed for tracking purposes from the TMS/WMS/YMS system. In embodiments in which the system is not integrated with a TMS/WMS/YMS system then further information may be required. For example, the scheduling portal may prompt the carrier to enter driver information such as a driver name, driver phone number, truck/trailer number, etc., as described above with reference to FIG. 4. The scheduling portal may be configured to allow such driver information to be entered at a later time to accommodate situations in which the carrier has not yet assigned a driver for the shipment or if the carrier does not yet know the required driver information.

If the requested appointment date is not available, the scheduling portal may decline the appointment request and may display a message providing alternative options. The carrier may then select an alternative appointment day. In response, the scheduling portal may display a message and/or may display separate screen confirming that the requested appointment has been accepted. The scheduling portal may then display a message requesting the carrier to upload the BoL or other relevant information. The carrier may then respond by uploading the BoL or other information as requested. If an appointment is accepted but carrier has failed to enter driver information, such as a driver name, driver phone number, truck/trailer number, etc., then the scheduling portal may issue an alert message, as shown in FIG. 5.

Figure 5:
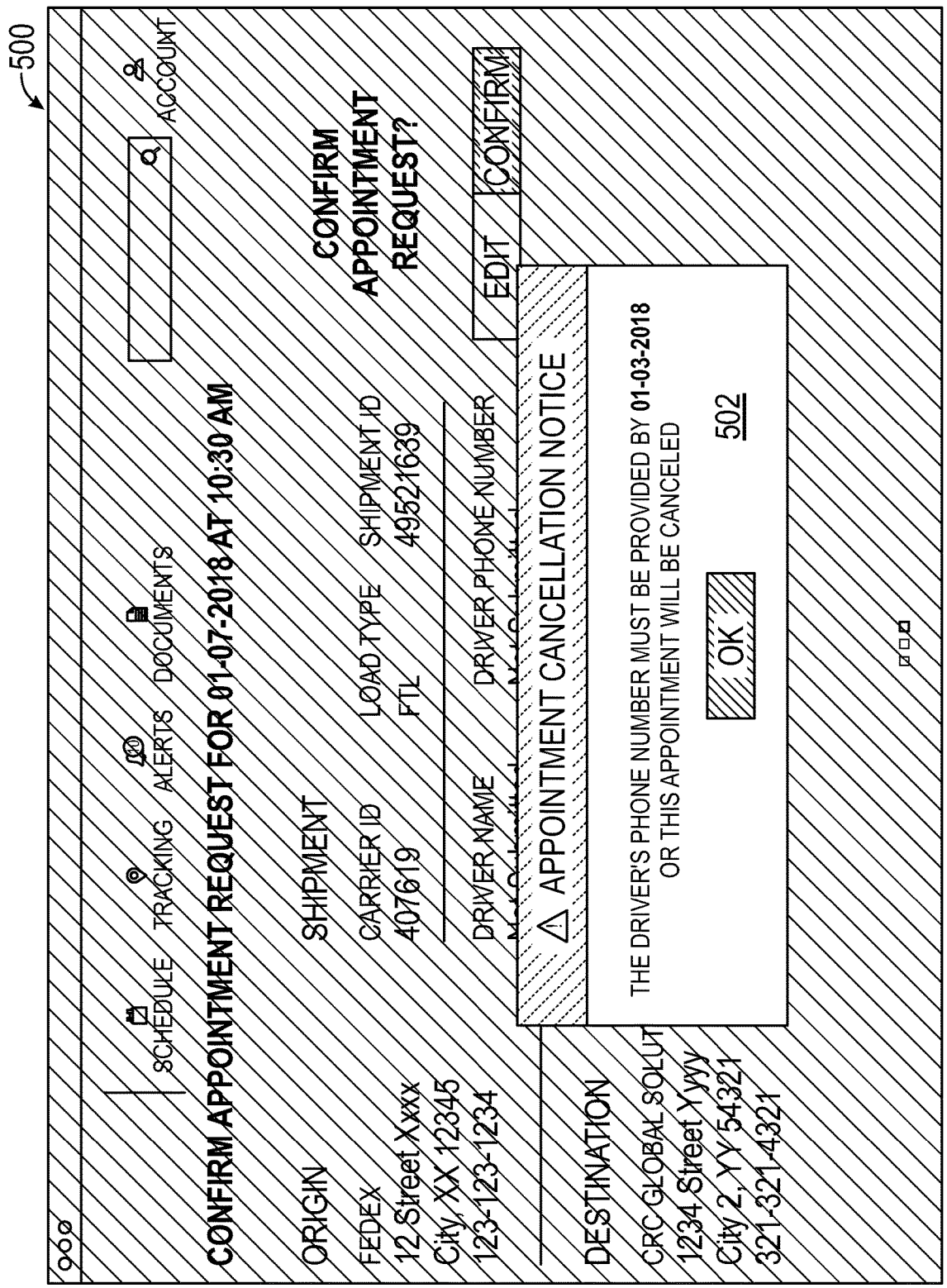
FIG. 5 illustrates an example screen of a scheduling portal showing an alert message, according to one or more embodiments of the present disclosure.

FIG. 5 illustrates an example screen 500 of a scheduling portal showing an alert message 502, according to one or more embodiments of the present disclosure. The alert message 502 may be presented as a pop-up message that warns the carrier to input requested driver information within a predetermined time interval before the appointment time. In an example, the predetermined time interval may be displayed as "X" hours before the scheduled appointment, with "X" specifying a time such as one hour, two hours, a half hour, etc., before the latest possible pick-up time (described above). The system may warn the carrier that the appointment may be automatically canceled if the required information is not entered within the predetermined time interval before the appointment time, as shown in the alert message 502 of FIG. 5. A user may acknowledge the alert message by selecting a graphical element, such as the "OK" button in this example.

FIG. 6 illustrates an example screen 600 of a scheduling portal showing an alert message, according to one or more embodiments of the present disclosure. Whereas the example of FIG. 5 was a pop-up message, the alert message 602 of this example is a displayed graphical element, as shown in FIG. 6. FIG. 6 also shows further details of a confirmation screen that confirms a scheduled appointment. In this example, screen 600 shows shipment details regarding origin 604, destination 606, carrier ID 608, load type 610, and shipment ID 612. Note however, in this example, the appointment has been confirmed without the user having entered driver information 614 and truck/trailer information 616. The lack of such driver and truck/trailer information triggers alert message 602. As described above, the appointment may be confirmed without such information and the user may enter the requested information at a later time. In this example, the appointment may be confirmed when a user selected a graphical element such as the "CONFIRM" button 618. Alternatively, the user may select the "EDIT" button 620 to activate a process for entering the requested driver and truck/trailer information. Alternatively, if the carrier/broker fails to enter the requested information within "X" hours (e.g., one hour, two hours, one half-hour, etc.) of the scheduled appointment time, the warehouse administrative platform may unilaterally cancel the scheduled appointment.

Similarly, if the appointment is accepted, but the carrier has not uploaded the BoL, if required, or other relevant information, an alert may be presented (e.g., as a pop-up message) that warns the carrier to upload the BoL or other relevant information at least Y hours before the latest possible pick-up time. In this example, Y and X may be equal predetermined time intervals or they may be different. If the appointment has been accepted and all required information (e.g., driver name, phone number, truck/trailer number, etc.) has been entered, the system may send a text message to start tracking the assigned driver at least Z hours before the scheduled delivery appointment time. In an example, all time intervals, X, Y, and Z, may be equal, two of the three may be equal, or the predetermined time intervals X, Y, and Z may be independent from one another.

FIG. 7 illustrates an example screen 700 of a scheduling portal showing an alert message, according to one or more embodiments of the present disclosure. This example shows how the scheduling portal may look after the appointment of FIG. 6 has been accepted without the user having entering the required driver 614 and truck/trailer 616 information. In this configuration, screen 700 may provide graphical elements to allow further actions. For example, a graphical element representing an "ADD NEW" button may be selected to activate a process whereby the user may schedule a further appointment. Alternatively, the user may select a graphical element representing a "DONE" button 704 to complete the scheduling process.

FIG. 8 illustrates an example screen 800 of a scheduling portal showing an alert message, according to one or more embodiments of the present disclosure. This example shows an alternative to the situation shown in FIG. 7, described above. In this example, the requested driver 614 and truck/trailer 616 information was entered before the appointment was scheduled. Screen 800 displays the requested information along with graphical elements allowing the user to confirm the appointment by selecting a "CONFIRM" button 802. Alternatively, the user may select the "EDIT" button 804 to modify information related to the requested appointment.

FIG. 9 illustrates an example screen 900 of a scheduling portal, according to one or more embodiments of the present disclosure. Screen 900 shows how the scheduling portal may look after the appointment of FIG. 8 has been confirmed. Screen 900 is analogous to screen 700 but whereas screen 700 shows how the scheduling portal may look after an appointment has been confirmed without entering driver 614 and truck/trailer 616 information, screen 900 shows a how the scheduling portal may look after the appointment has been confirmed with the driver and truck trailer information having been entered. Graphical elements representing the "ADD NEW" button 702 and "DONE" button 704, having similar functionality to like elements shown in FIG. 7, are shown.

The above description outlines a procedure a carrier may follow to schedule an inbound (i.e., delivery) shipment. A similar procedure may also be followed for outbound (i.e., pick-up) shipments. For example, if the carrier designates the shipment as an outbound shipment, the scheduling portal may prompt the carrier to enter information including a desired date for delivery/pick-up. The scheduling portal may then attempt to schedule an appointment for delivery/pick-up. If the requested date is available, then the scheduling portal may display available appointment times associated with the requested date. The carrier may then select a time from the displayed available options. Once the carrier selects an available appointment time, the scheduling portal may display a confirmation message. The scheduling portal may further prompt the carrier to upload the BoL or other information relevant to the shipment.

If the requested shipment is designated as an outbound appointment, then the system may be configured to automatically create an estimate of a latest possible time for shipment pick-up that would allow sufficient time for a driver to transport the shipment to the warehouse by the requested appointment time. In this regard, the system may estimate a travel time based on a distance from the point of origin to the destination. The estimated travel time may incorporate historical data received from a tracking API. Such historical data may include information regarding typical truck routes, traffic, predicted weather conditions for the time window of the shipment, etc.

At the scheduled pick-up time, the driver may pick up the shipment from the point of origin, may gather paperwork, and may perform confirmation checks before departure. In certain embodiments, the carrier may instruct the driver to download the driver app if the driver has not already installed the driver app. With the driver app, the driver may select a preferred language, and may accept terms of service, including agreeing to be monitored via location tracking. Using the driver app, the driver may register basic information in a one-time set-up process. Such basic information may include a driver name, a commercial driver's license (CDL) number, a CDL picture, a vehicle registration number, a truck and trailer number, etc. The driver may further provide additional information including a motor carrier (MC) number, a department of transportation (DOT) number, etc.

Figure 10:
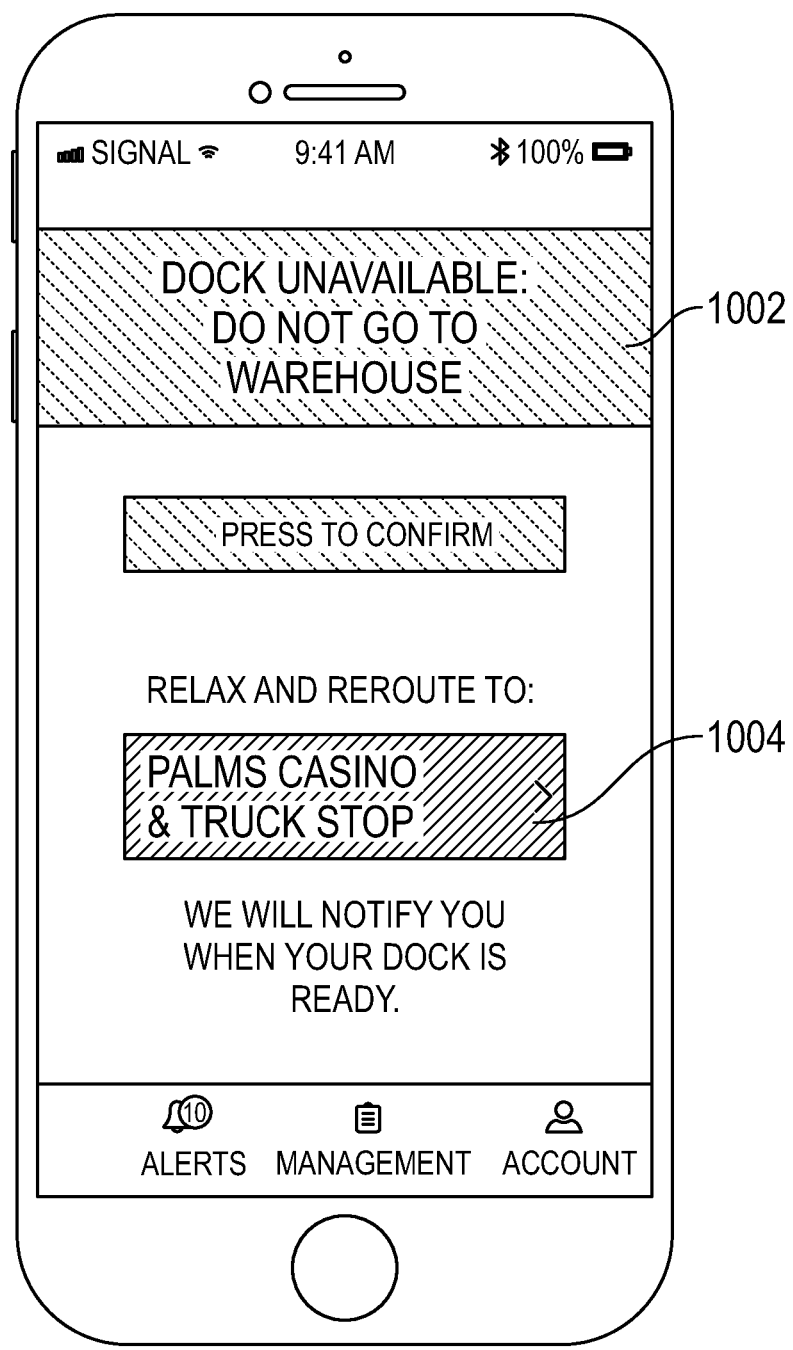
FIG. 10 illustrates an example screen of a driver app, according to one or more embodiments of the present disclosure.
Figure 11:
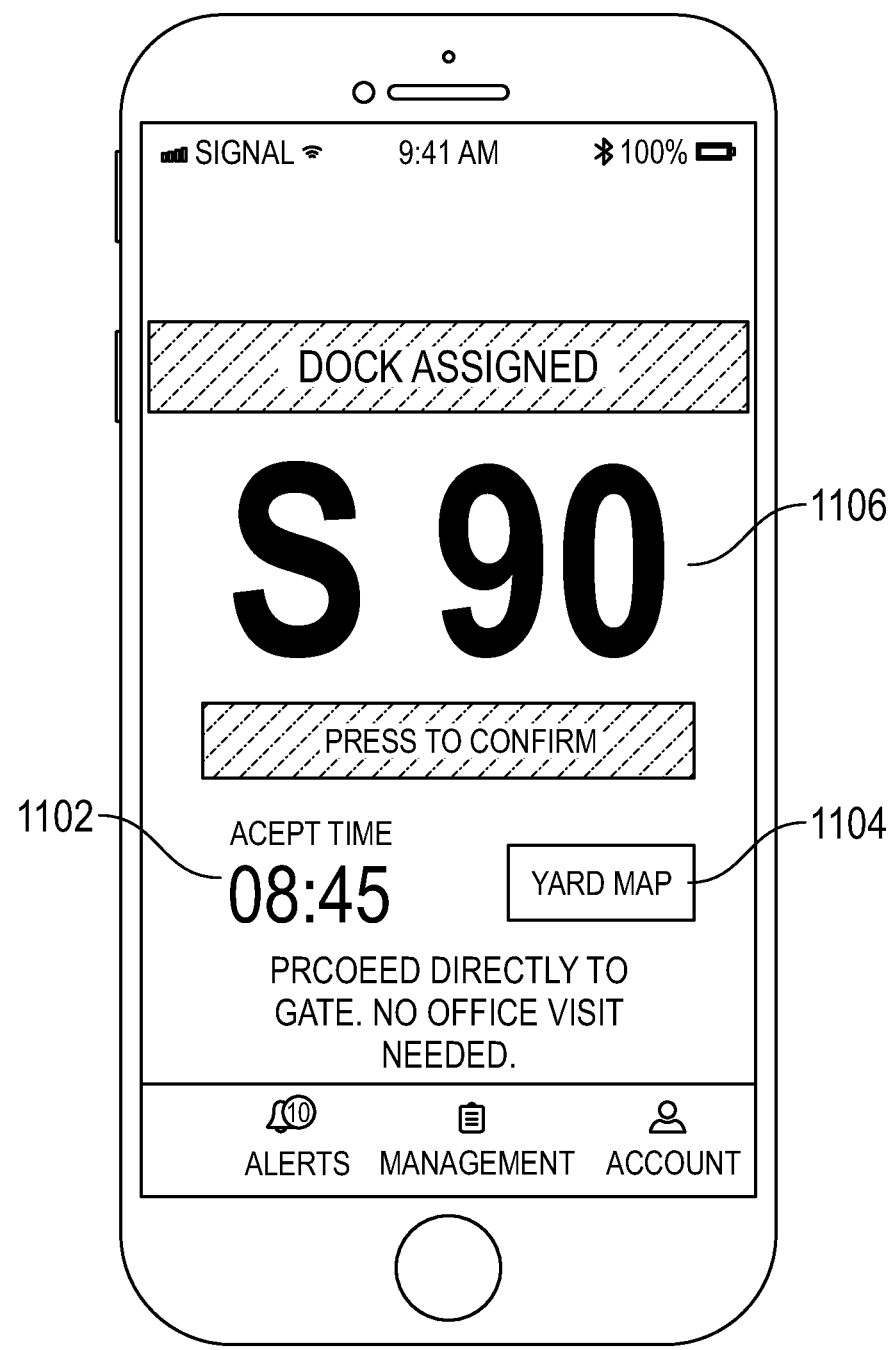
FIG. 11 illustrates an example screen of a driver app, according to one or more embodiments of the present disclosure.
Figure 12:
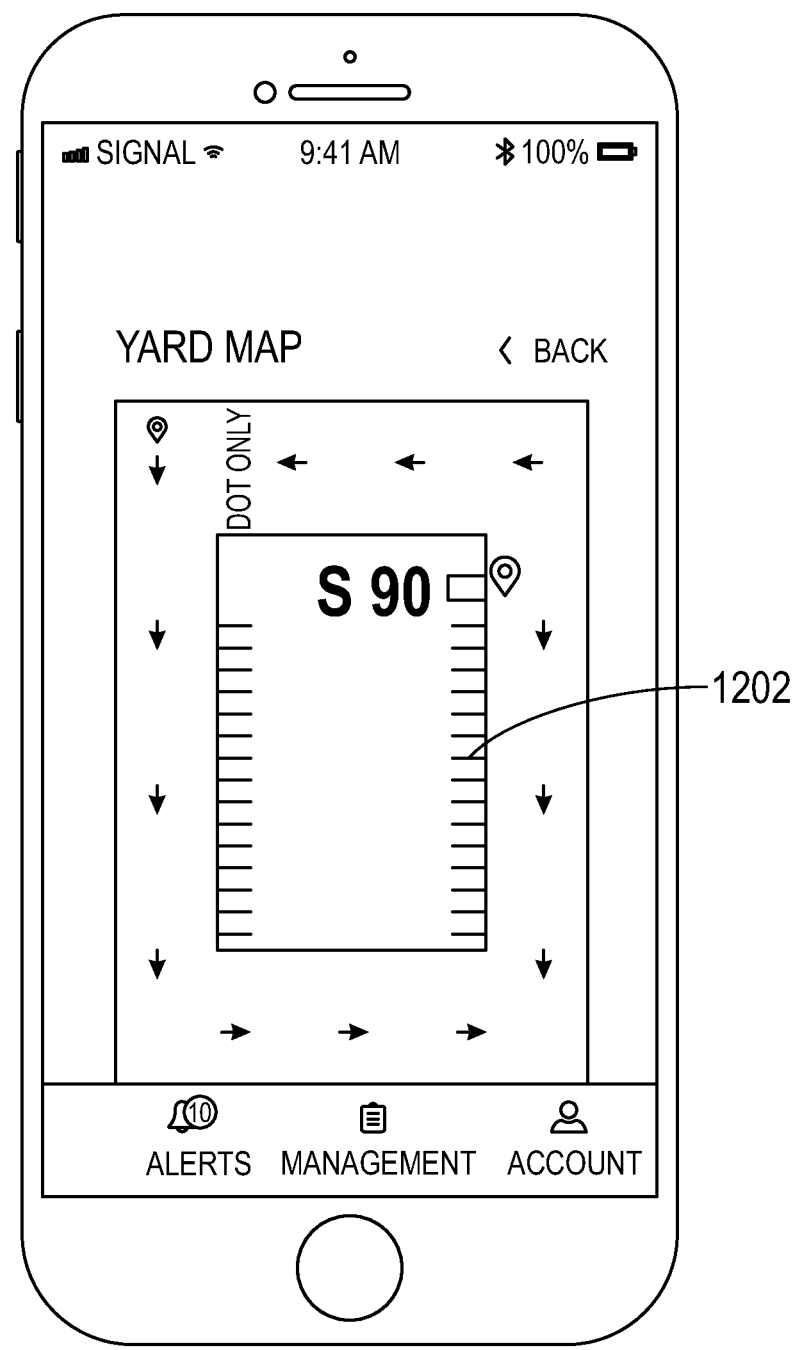
FIG. 12 illustrates an example screen of a driver app, according to one or more embodiments of the present disclosure.

FIGS. 10 to 12 illustrate example screens of a driver app, according to one or more embodiments of the present disclosure. As described in greater detail below, FIG. 10 shows a driver alert message 1002 informing the driver that a dock is not available at the driver's time of arrival. In this instance, a message 1004 may instruct the driver to go to an alternative location. FIG. 11 shows a driver alert indicating that a dock 1106 has been assigned at the delivery destination. The alert of FIG. 11 also indicates the appointment time 1102. A selectable graphical element 1104 activates a new screen showing a map 1202 of the delivery destination, as shown in FIG. 12. In other embodiments, the driver may receive alerts via SMS or automated calls.

The driver app, described above and illustrated in the example screens shown in FIGS. 10 to 12, may be used to facilitate all operations that a driver may perform in picking up, transporting, and dropping off shipments. As a first operation, the driver may drive to the shipper's pick-up location. The shipper may then load the truck and provide appropriate paperwork to the driver. The driver app may prompt the driver to confirm receipt of BoL and may then prompt the driver to confirm accuracy of shipment as specified by details provided on the BoL. The driver app may then prompt the driver to take a picture of the BoL for electronic submission of the BoL. The system may then transmit the BoL in electronic form based on the picture of the BoL. The driver app may then prompt the driver to confirm that the shipment has been loaded and that the driver is ready for departure. The driver app may then receive a QR code with embedded data needed for driver check in at the delivery destination. The QR code may encode information including the scheduled appointment time, the shipment ID number, carrier information, the truck and trailer, the DOT or MC number, the driver's name, etc. (all or some of which may be auto-populated in the app).

The system may provide functionality for in-transit tracking of the shipment as the driver proceeds to the delivery or pick-up destination (e.g., a warehouse, a grain elevator, a distribution center, retailer, etc.). Shipments may be tracked in real time as drivers travel from point of origin to their destination, and updated location data may be transmitted to the main scheduling platform. In-transit location information may be gathered by periodically pinging the driver's mobile device. For example, a driver's phone may be pinged every 30 minutes to identify a shipment location. In response to pinging the driver's phone, the system may receive truck location data. Using various APIs, the system may receive various additional pieces of information including a real-time truck route as well as weather and traffic data. The system may cross-reference real-time truck location information with current and predicted data transmitted by one or more APIs. The system may generate a new shipment ETA based on a real-time estimate of truck location data regarding truck route, traffic, and weather, as provided by the API. This process may continue until the truck is a predetermined time interval (e.g., an hour) away from the destination.

When the truck is within the predetermined time interval away from the destination, the frequency at which the driver's phone is pinged may be increased. For example, when the driver is less than an hour away from the destination, the driver's phone may be pinged every fifteen minutes for the first thirty minutes of the hour. If truck is thirty minutes away or less, the frequency at which the driver's phone is pinged may be further increased. For example, during the last thirty minutes of the journey, the driver's phone may be pinged every ten minutes.

In various embodiments, disclosed system components may be configured to optimize and prioritize dock operations. The system may cross-reference all delivery and pick-up ETAs for each working day with dock availability data. In this regard, the system may automatically prioritize and reschedule early or late shipments that cannot be immediately loaded or unloaded. For drivers whose appointments need to be changed or updated, the system may send updated appointment data and instructions to a driver's mobile device before the driver arrives at the warehouse. The system may be configured to determine periodically updated ETAs for all inbound shipment deliveries and shipment pick-ups that are in transit and/or are scheduled for the day.

The system may cross-reference all ETAs with existing appointment schedules. In this way, the system may prioritize and optimize schedules based on various pieces of information (described in greater detail below) and any warehouse specific scheduling or process operating rules that may be established during initial set-up. The system may prioritize and optimize schedules based on predicted dock availability, an existence of slack docks, a designation of docks, predicted labor availability at the predicted ETA, and predicted equipment availability at the predicted ETA. Such information is described in greater detail below.

Dock availability at an updated ETA may be based on estimated shipment load and unload times. Further, load and unload times may be determined by a combination of load and shipment type, whether the load is an FTL or an LTL (which may take longer due to complexity of staging process), commodity type, packaging type, and associated unload and load times. As mentioned above, loading times may depend on the types of packages that are being loaded. Package types may include pallets, cartons, bags, barrels, etc., each of which may have different typical load and unload times. For example, a pallet may take six minutes to load and three minutes to unload. The overall load or unload time also depends on the number of packages per shipment.

The way docks are designated may also affect loading and unloading times. This is because warehouses sometimes limit the type of inventory that may be unloaded or loaded into a specific dock to maximize efficiency when picking, packing, and staging outbound goods and/or putting away inbound goods. Docks may be designated as inbound only, outbound only, mixed-use, product-specific, etc. Dock availability may be limited according to types of goods that may be loaded and unloaded. Docks may be designated for delivery of specific types of goods, such as frozen goods, commodities, bulk shipments, etc. Dock availability may also be limited depending on whether the dock has been assigned to a specific customer, carrier, or transportation lane.

Predicted labor availability at ETA may be based on a number of laborers on-duty per day and a predicted schedule and may be determined as described above. Predicted equipment (e.g., forklift) availability at ETA may depend on a specific number of functioning forklifts per day and a number of forklifts available for a predicted schedule as described above. When scheduling labor and equipment for various loading/unloading jobs, the system is configured to create schedules that minimize driver detention and demurrage (D&D) fees.

If updated ETAs indicate that a driver is running late, the system may display an alert indicating the delay for the shipment. The system may then send a delay notification to dock workers and also may send a delay notification to the driver. Further, the system may send a message to the driver providing instructions to redirect and to proceed to an off-site location (e.g., a truck stop or other waiting area). When deciding to redirect a driver to an off-site location, the system may consider various factors including proximity to a warehouse, a number of parking spots available at the off-site location, etc.

Information regarding a number of parking spots at the off-site location may be determined based on driver feedback supplied by drivers to the driver app, via SMS, or via an automated call. For example, drivers who are leaving the off-site location may be prompted to input an estimated number of parking spots available at the off-site location. A number of parking spots may also be voluntarily reported using methods other than using the driver app, such as a driver reporting via a phone call, a text message, etc. A number of parking spots may further be affected by an existence of parking reservations at a truck stop or other waiting area.

When a driver is instructed to go to an off-site location (e.g., see alert 1002 on driver app shown in FIG. 10), the driver app may send an alert to the system. For example, the alert may be sent to the system when the driver is within a predetermined distance (e.g., one half mile) of the off-site location. The main system platform may then record driver arrival time (e.g., for purposes of driver check-in and calculating D&D). The main platform may then send an alert 1002 to the driver app, which the driver may receive on their mobile device as shown in FIG. 10, or on an in-cab mounted device, not shown. The driver alert may include information such as a new appointment time 1102 and a new dock assignment 1106, as shown in FIG. 11. The driver app may further provide directions to the facility, a map 1202 of the facility (e.g., as shown in FIG. 12), etc.

If updated ETAs indicate that a driver is early, then the main system platform may display an alert indicating that the driver is early for the appointment. The system may then cross-reference the new early ETA against available docks, taking predicted shipment delivery delays into account. If a dock is available at the early ETA due to a delay on another shipment, then the system platform may send a notification of early appointment availability to the driver app. The driver app may then prompt the driver to accept the new earlier appointment time. If the driver accepts the new appointment time, then the system platform sends a confirmation to the driver app, updates the schedule, and sends alerts to dock workers. If the driver rejects the suggested new appointment time, then the schedule remains unchanged and the system platform may send instruction to the driver app telling the driver to wait at off-site location until the originally scheduled appointment time.

If the warehouse is running behind schedule so that the originally-scheduled appointment cannot be accommodated, and if the driver's ETA shows that they will be arriving within a predetermined time interval (e.g., a thirty minute window) of their appointment, then the system sends a notification to the driver app. The notification may inform the driver of the warehouse delay and may redirect the driver to go to the off-site location. The notification may further inform the driver of a new appointment time and may indicate an arrival time, two hours after which the driver may accrue D&D fees. Generally, a driver accrues D&D fees if they are delayed by a facility for more than two hours from time of arrival.

For example, say a driver has a 1 pm appointment time but, due to no fault of his own, the appointment time gets rescheduled to 4 pm due to a backup at the warehouse. In this example, the driver will receive a larger D&D payment the earlier he arrives in his originally scheduled window. For example, if he arrives at the original appointment time, he will get at least 1 hour of D&D, plus the time spent during load or unload at the facility. If he arrives late at, say, 2 pm, he would only get D&D for the time spent during load or unload at the facility.

When arriving at the warehouse, a driver may check in as follows. Upon arrival at the warehouse, the driver app may generate a QR code (not shown) that may be used for driver authentication. The QR code may be displayed on the driver's mobile device. The QR code may be scanned at the gate by a gate guard with a handheld scanner or a mobile device (e.g., a smart phone, a tablet computer, etc.) running the warehouse master platform view. Alternatively, the driver may use the QR code to check in at an automated access control gate with a mounted QR code scanner. In another embodiment, the driver may be checked-in by the dock worker at the time of the driver's arrival at the dock without use of the app or QR code.

The QR code scanner may interface with the main system platform to retrieve various pieces of driver-related information, which may have been previously entered during the driver initial setup procedure. For example, driver-related information may include a driver name, a CDL number, a CDL image, a vehicle registration number, a truck and trailer number, a MC number a DOT number, etc. Driver-related information may further include a BoL image that was previously uploaded by the driver at the time of shipment pick-up, a BoL uploaded by the carrier into the carrier web portal, and/or scheduling portal shipment information. Scheduling portal shipment information may include information related to a shipment origin, a carrier name or other designation, a driver name, a shipment ID number, etc.

If all of the information mentioned above is consistent with information contained in warehouse documents, then the system may display information associated with a next stage in the check-in process. For example, the driver app and/or the gate check-in device (e.g., a smart phone, a table computer, etc., used by a guard, or other autonomous check-in device) may display the appointment time, or a rescheduled appointment time (if applicable), an arrival time, etc. If the driver's appointment time was not changed, then the time at which the QR code is scanned may be taken as the time of arrival. If the driver's appointment time was changed, the time of arrival may be taken as the time when the driver reaches the off-site location. In either case, the arrival time may be determined by information collected by a location-tracking device that may periodically ping the driver's mobile device, and/or may provide data related to a geo-fence that may be associated with the warehouse or may be associated with the off-site location.

Also, as part of the check-in process, the driver app and/or the gate check-in device may further display one or more of an order number, a carrier designation, a truck and trailer number, a DOT number, a MC number, a driver name, a driver cell phone number, a signature block, etc. If there are any inconsistencies with any of the check-in information (e.g., carrier designation, BoL or shipment ID, truck and trailer number, MC or DOT number, etc.) then the driver app and/or an app running on a guard mobile device or other check-in device may display an error message specifying what information requires correction. The driver may then be given an opportunity to correct any errors. Once all information has been confirmed to be consistent, the driver may then sign the signature block on a display device of the driver's mobile device. Alternatively, the driver may sign a signature block presented on a device associated with a guard or other check-in device at the gate. The driver signature may confirm accuracy of the various pieces of information. Upon signing the signature block, the driver may click a submit button (e.g., a physical button or a virtual button on a touch screen) to complete the check-in process.

Upon completion of the check-in process, the system may send instructions to dock workers to proceed to an assigned dock and to bring appropriately scheduled equipment (e.g., a forklift). The dock worker app, running on a dock worker's mobile device, may display a prompt instructing the dock worker to proceed to the appropriate dock. The dock worker app may further display a map of the facility directing the dock worker to the appropriate dock. The dock worker may then respond to the prompt on the dock worker's mobile device to confirm that instructions have been received and that the dock worker is proceeding to the assigned work location. The dock worker may then proceed to the assigned dock to begin the assigned task of loading or unloading the truck brought by the driver.

Figure 13:
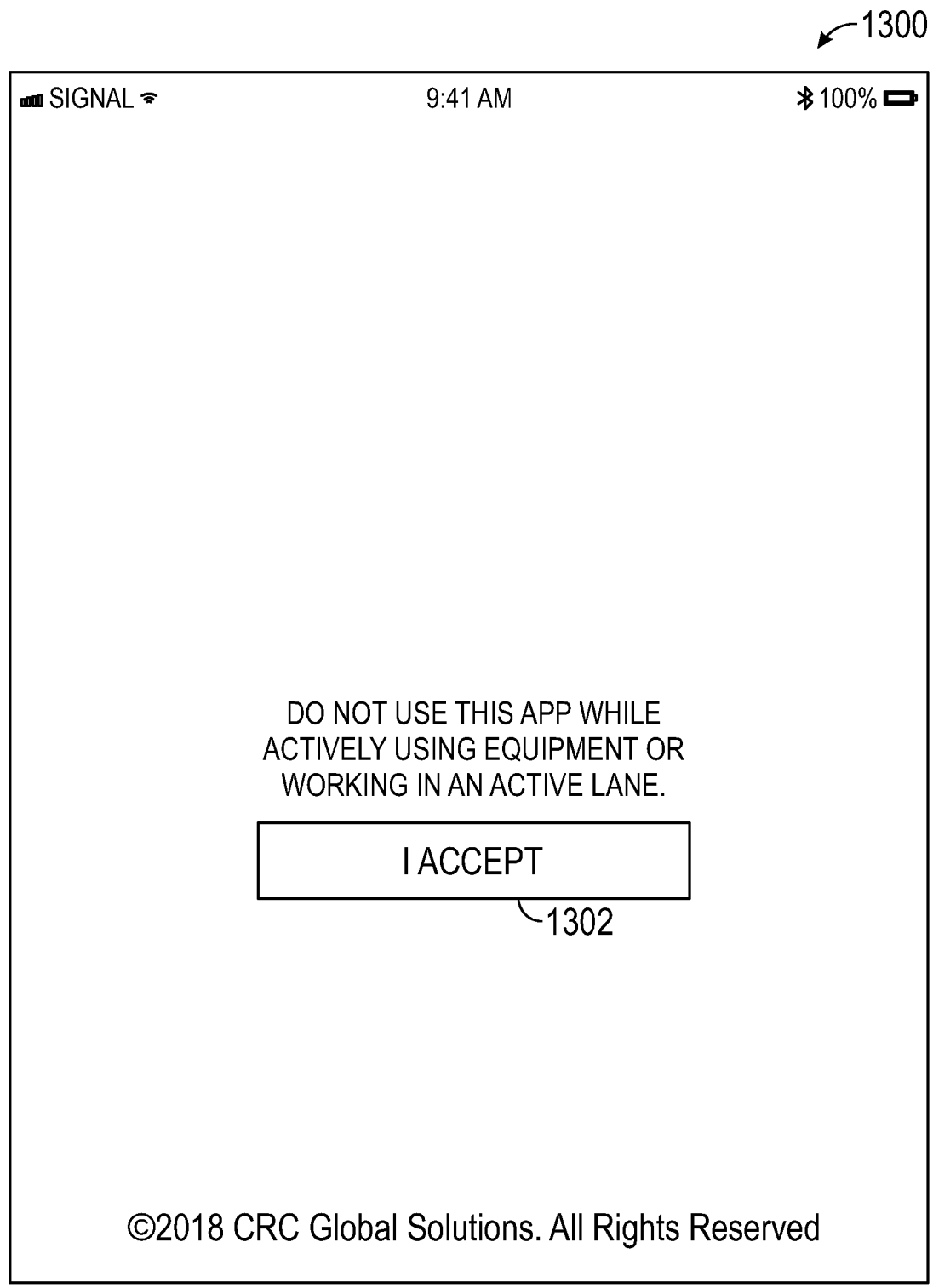
FIG. 13 illustrates an example screen of a dock worker app, according to one or more embodiments of the present disclosure.

FIG. 13 illustrates an example screen 1300 of a dock worker app, according to one or more embodiments of the present disclosure. Screen 1300 may present a message to a dock worker and request a response from the dock worker. In this example, the message is a safety message instructing the dock worker to not use the app while using equipment of while actively working. The dock worker may provide a response by activating the graphical element representing an "I ACCEPT" response button 1302.

Figure 14:
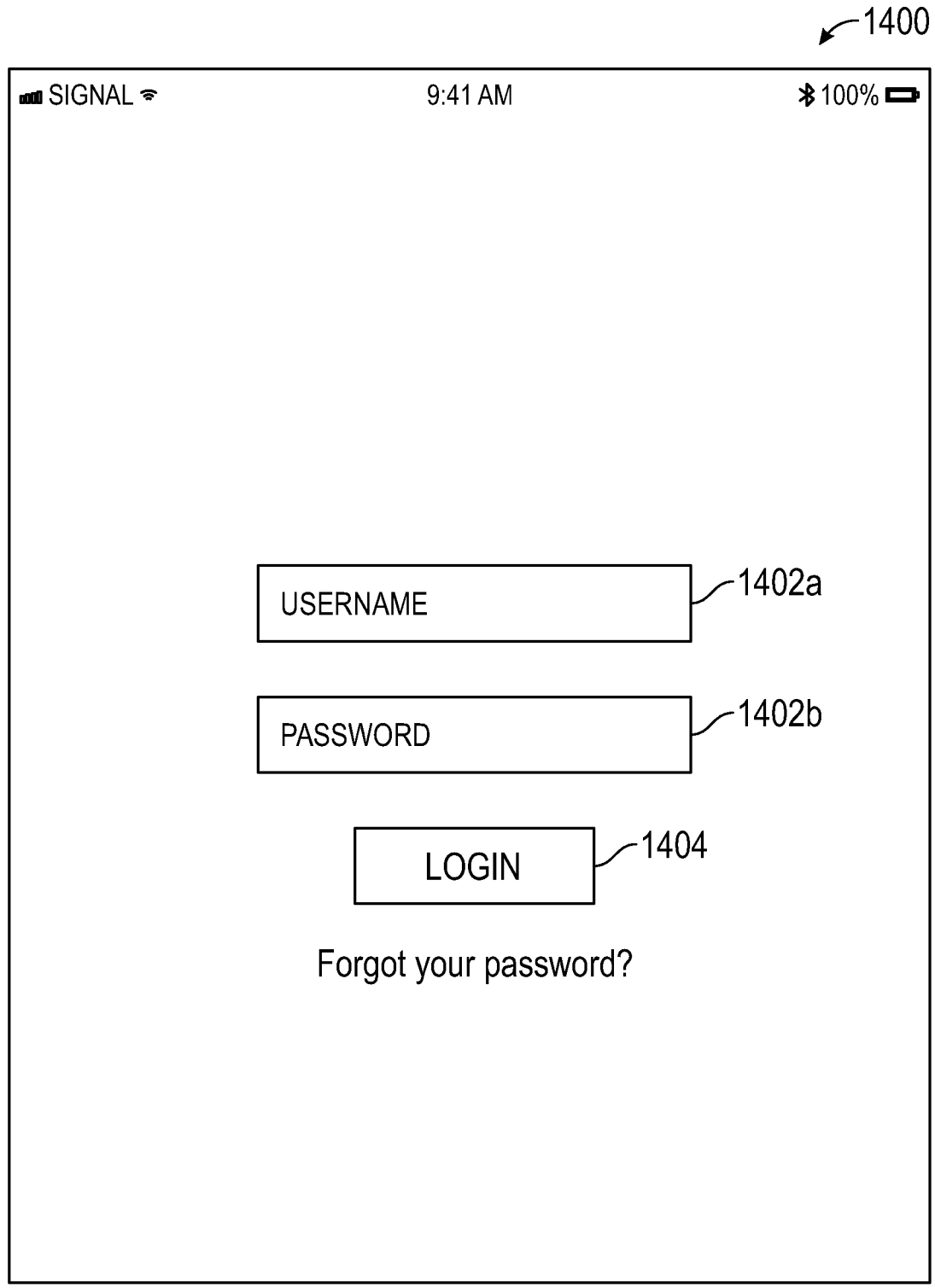
FIG. 14 illustrates an example login screen of a dock worker app, according to one or more embodiments of the present disclosure.

FIG. 14 illustrates an example login screen 1400 of a dock worker app, according to one or more embodiments of the present disclosure. Login screen 1400 may provide graphical elements that may allow a dock worker to log into the dock worker app. In this example, graphical elements 1402a and 1402b allow the dock worker to enter a username and password, respectively. A further graphical element may represent a "LOGIN" button 1404 that a dock worker may select to submit the username and password. Upon selecting the "LOGIN" button 1404, the dock worker app may display a further screen as shown in FIG. 15.

Figure 15:
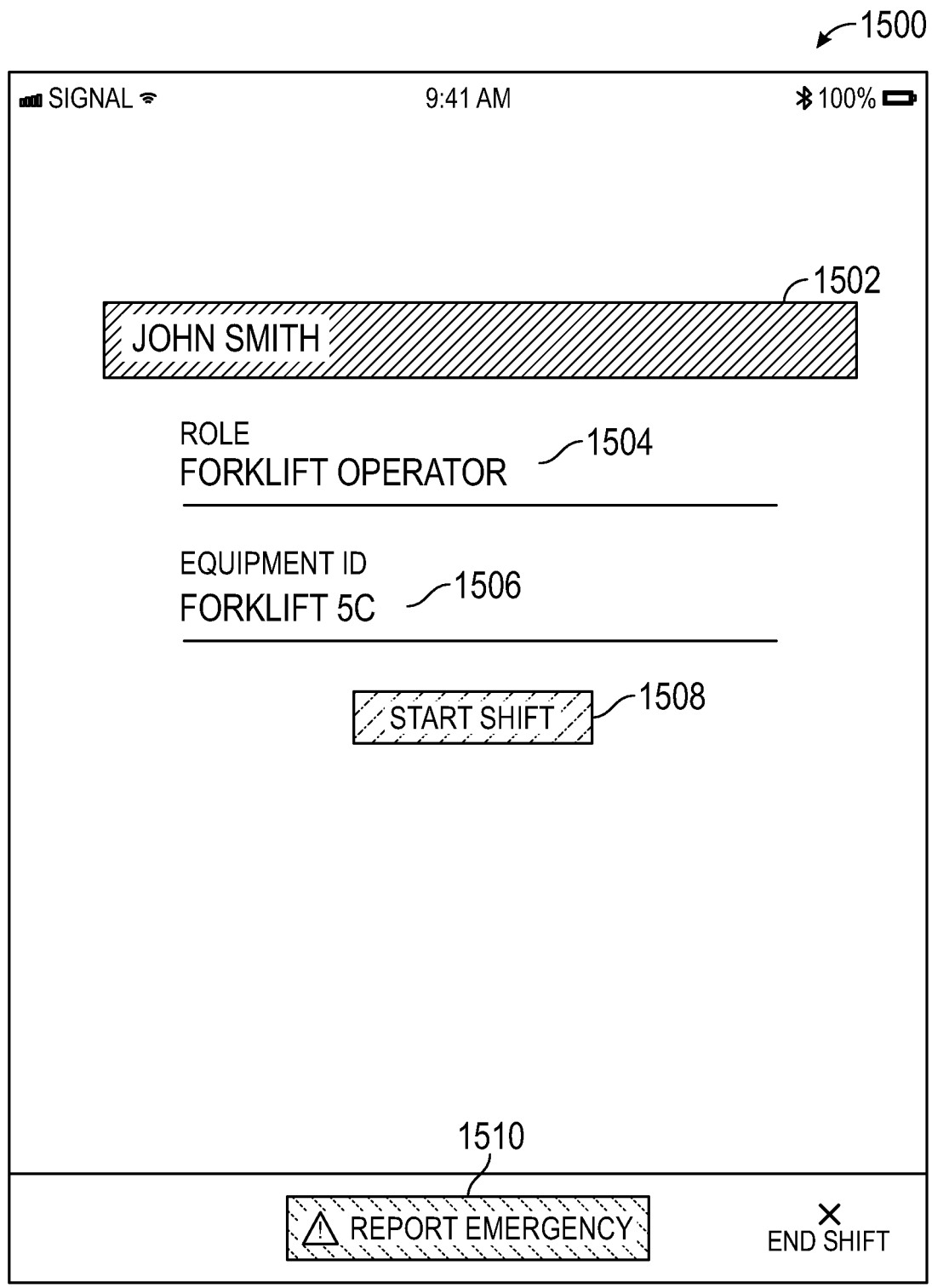
FIG. 15 illustrates an example start-shift screen of a dock worker app, according to one or more embodiments of the present disclosure.

FIG. 15 illustrates an example start-shift screen 1500 of a dock worker app, according to one or more embodiments of the present disclosure. Screen 1500 may display the dock worker's name 1502, the dock worker's role 1504, and any equipment 1506 that the dock worker may need to perform his/her duties. Screen 1500 may further include a graphical element representing a "START SHIFT" button 1508. By selecting the "START SHIFT" button 1508, the dock worker may officially start his/her shift. Selecting button 1508 may start a clock that automatically records the dock worker's service hours that may be tied to his/her compensation. Screen 1500, like other screens described below, may provide additional functionality. For example, screen 1500 may provide a graphical element representing a "REPORT EMERGENCY" button 1510. Button 1510 may be selected by a dock worker to initiate a process whereby an emergency may be reported. Such a process may document the emergency situation and may cause an alert to be sent to call proper emergency response personnel.

Figure 16:
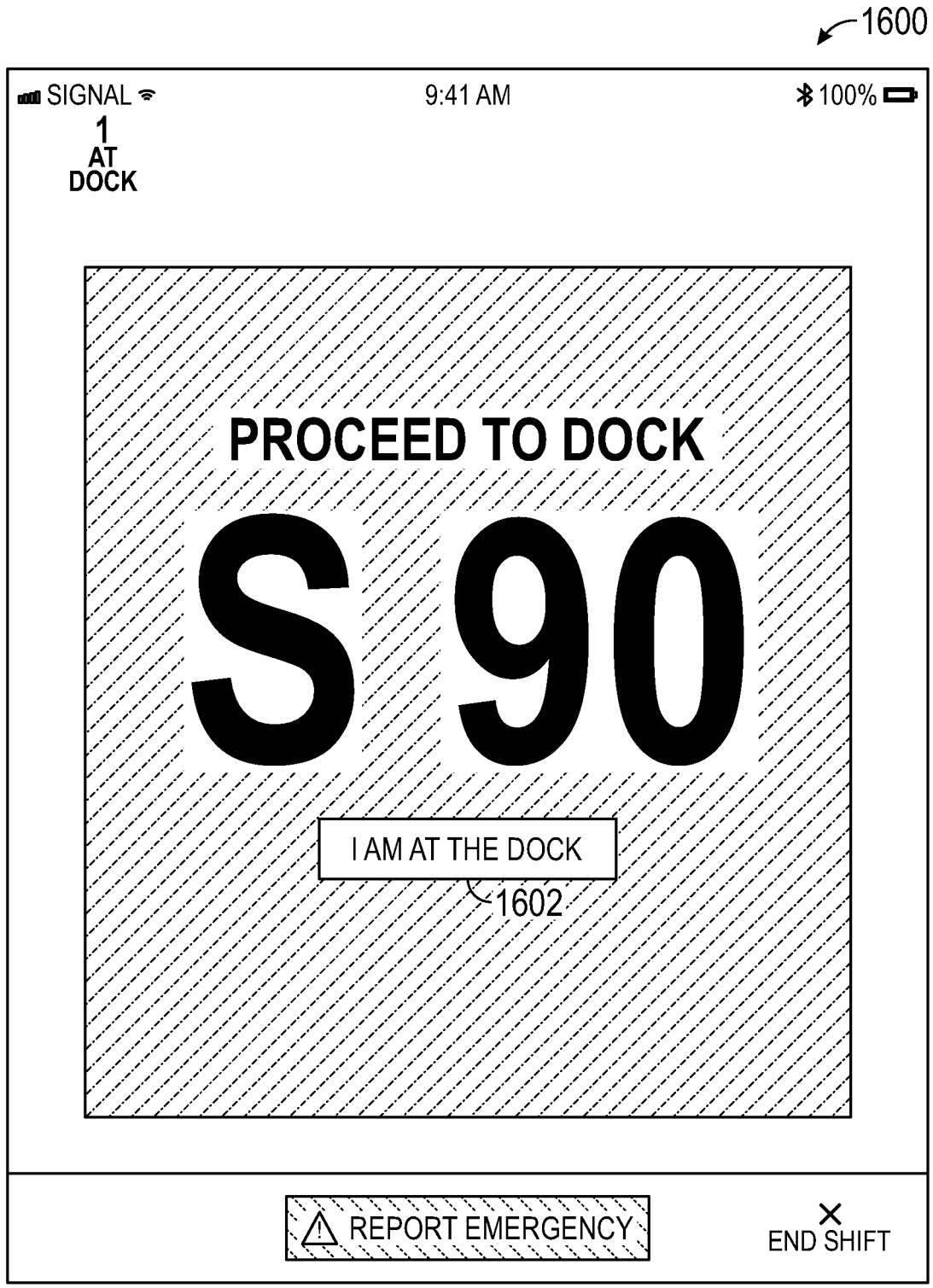
FIG. 16 illustrates an example instruction screen of a dock worker app, according to one or more embodiments of the present disclosure.

FIG. 16 illustrates an example instruction screen 1600 of a dock worker app, according to one or more embodiments of the present disclosure. Instruction screen 1600 may provide an instruction for the dock worker to proceed to an assigned gate. In this example, the message displayed on instruction screen 1600 tells the dock worker to proceed to dock S90. The dock worker may provide feedback to the dock worker app to let the system know that the dock worker is at the gate. For example, a graphical element may be provided that represents an "I AM AT THE GATE" button 1602. Selecting the "I AM AT THE GATE" button 1602 informs the system that the dock worker is ready to load or unload a shipment. This information may be used by the system to update information regarding labor availability.

Figure 17:
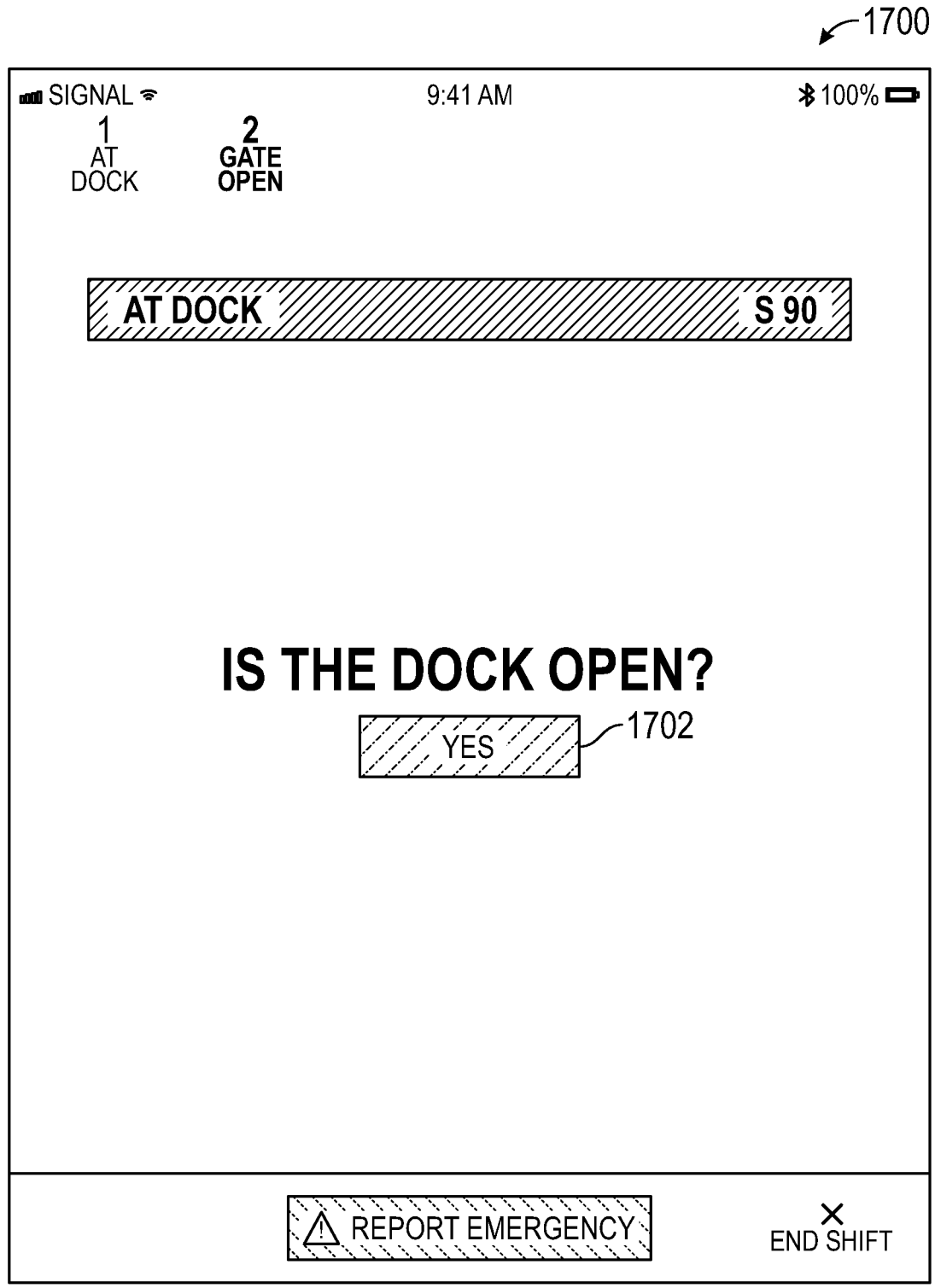
FIG. 17 illustrates an example instruction screen of a dock worker app, according to one or more embodiments of the present disclosure.

FIG. 17 illustrates an example instruction screen 1700 of a dock worker app, according to one or more embodiments of the present disclosure. In this example, instruction screen 1700 requests information from the dock worker regarding whether the gate and/or dock door is open. The dock worker may respond by selecting a graphical element representing a "YES" button 1702. This information may be used by the system to further update labor and facility availability information.

A process of unloading and verification of an inbound shipment may proceed as follows. At the appointed time, when the driver and the dock worker arrive at the dock, the dock worker app may display a prompt requesting confirmation that the driver/truck has arrived with the truck, as shown in instruction screen 1800 FIG. 18. The dock worker may enter a response to the dock worker app indicating that the truck has arrived. In this example, a dock worker may indicate the truck/driver has arrived by selecting a graphical element that represents "YES" button 1802. Upon selection of "YES" button 1802, the dock worker app may further display a prompt requesting confirmation that unloading has begun, as shown by instruction screen 1900 of FIG. 19.

Figure 20:
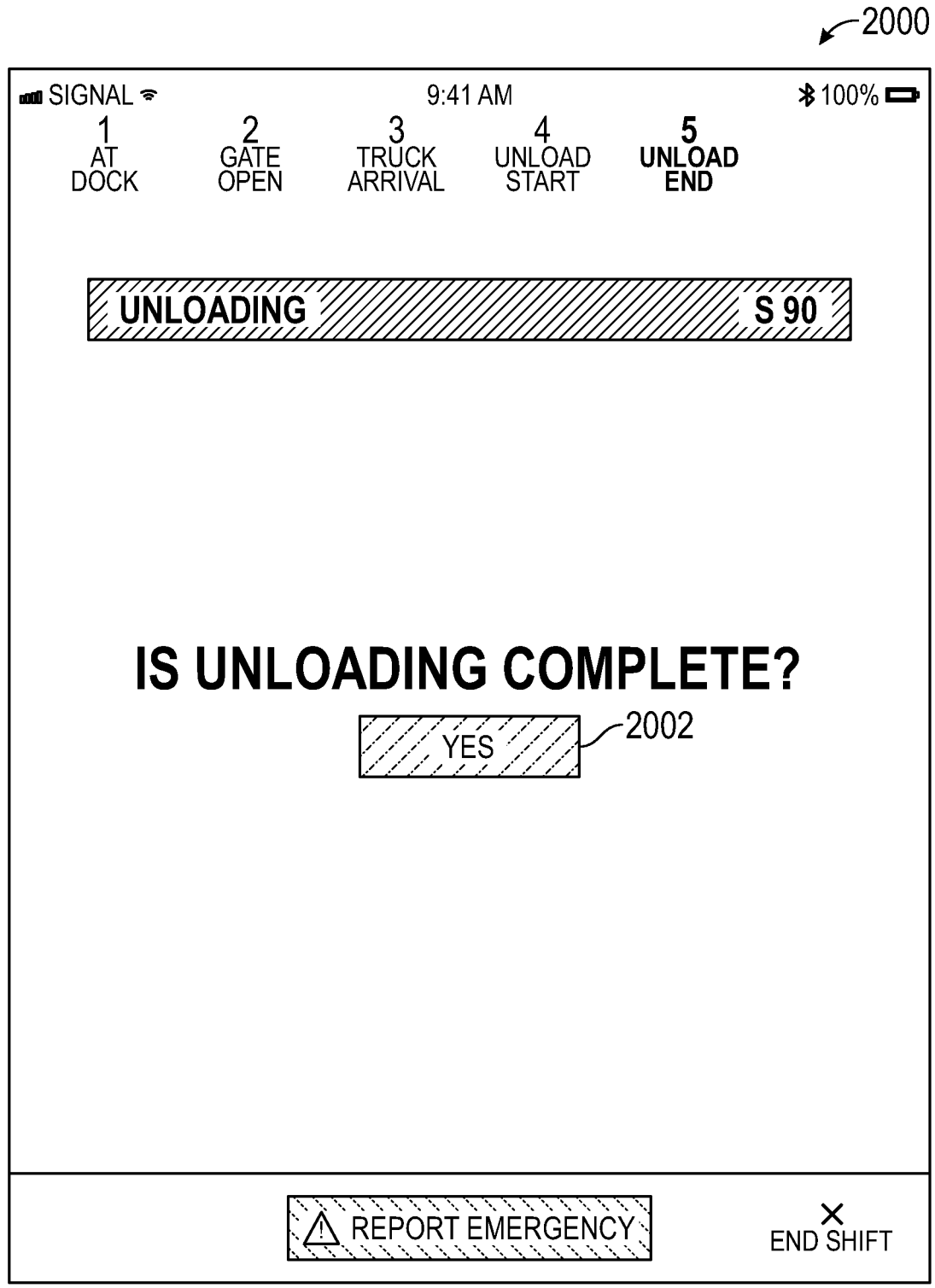
FIG. 20 illustrates an example instruction screen of a dock worker app, according to one or more embodiments of the present disclosure.

The dock worker may then enter a response (e.g., by clicking or touching a virtual button on a touch screen) to indicate that unloading has begun. In this example, the dock worker may select the graphical element representing a button 1902 confirming that dock unloading has begun. The dock worker app may then present a notification requesting confirmation when unloading has been completed, as shown by instruction screen 2000 of FIG. 20. The dock worker may then enter a response confirming that unloading is finished. In this example, the dock worker may confirm that unloading has been completed by selecting a graphical element 2002, as shown in FIG. 20. In alternative embodiments, the dock worker may receive instruction through automated or manual voice prompts and reply in the same manner.

Figure 21:
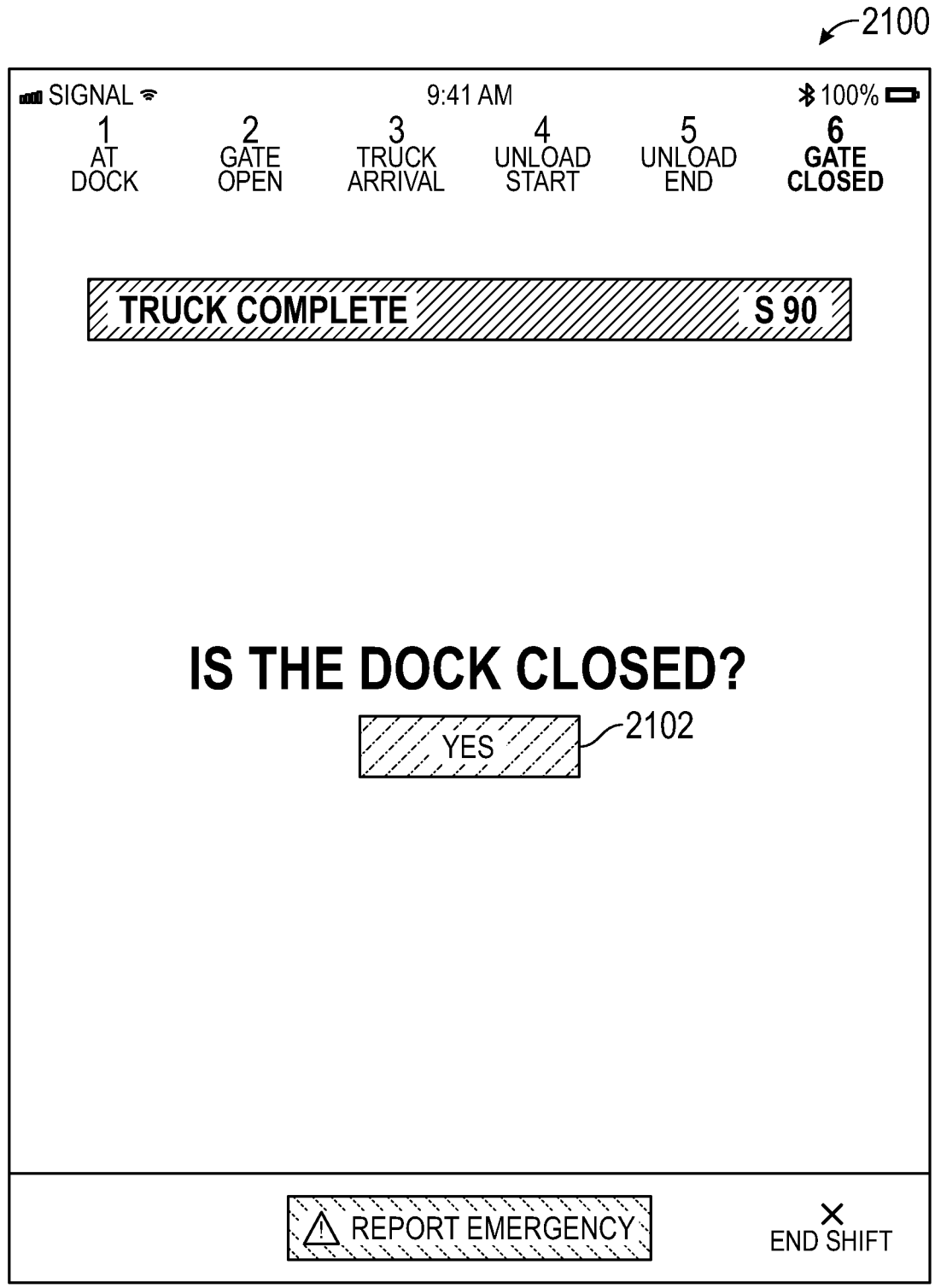
FIG. 21 illustrates an example instruction screen of a dock worker app, according to one or more embodiments of the present disclosure.

The dock worker app may then prompt the dock worker to enter additional information. For example, the dock worker app may ask the dock worker if the gate has been closed. The dock worker may respond in the affirmative by selecting graphical element 2102, shown in FIG. 21. The dock worker app may request various other items of information (not shown) to which the dock worker may provide appropriate responses. For example, the dock worker app may request confirmation that the shipment includes correct packaging. If the dock worker responds that there are problems with packaging, the dock worker app may provide a comment box requesting further input. The dock worker may then enter comments describing the problems with packaging. The dock worker app may then display a message asking if the shipment included correct quantities of goods and whether any of the received goods are damaged. If there are incorrect quantities or if there are any damaged goods, the dock worker app may provide an additional comment box requesting feedback about problems with the shipment.

Figure 22:
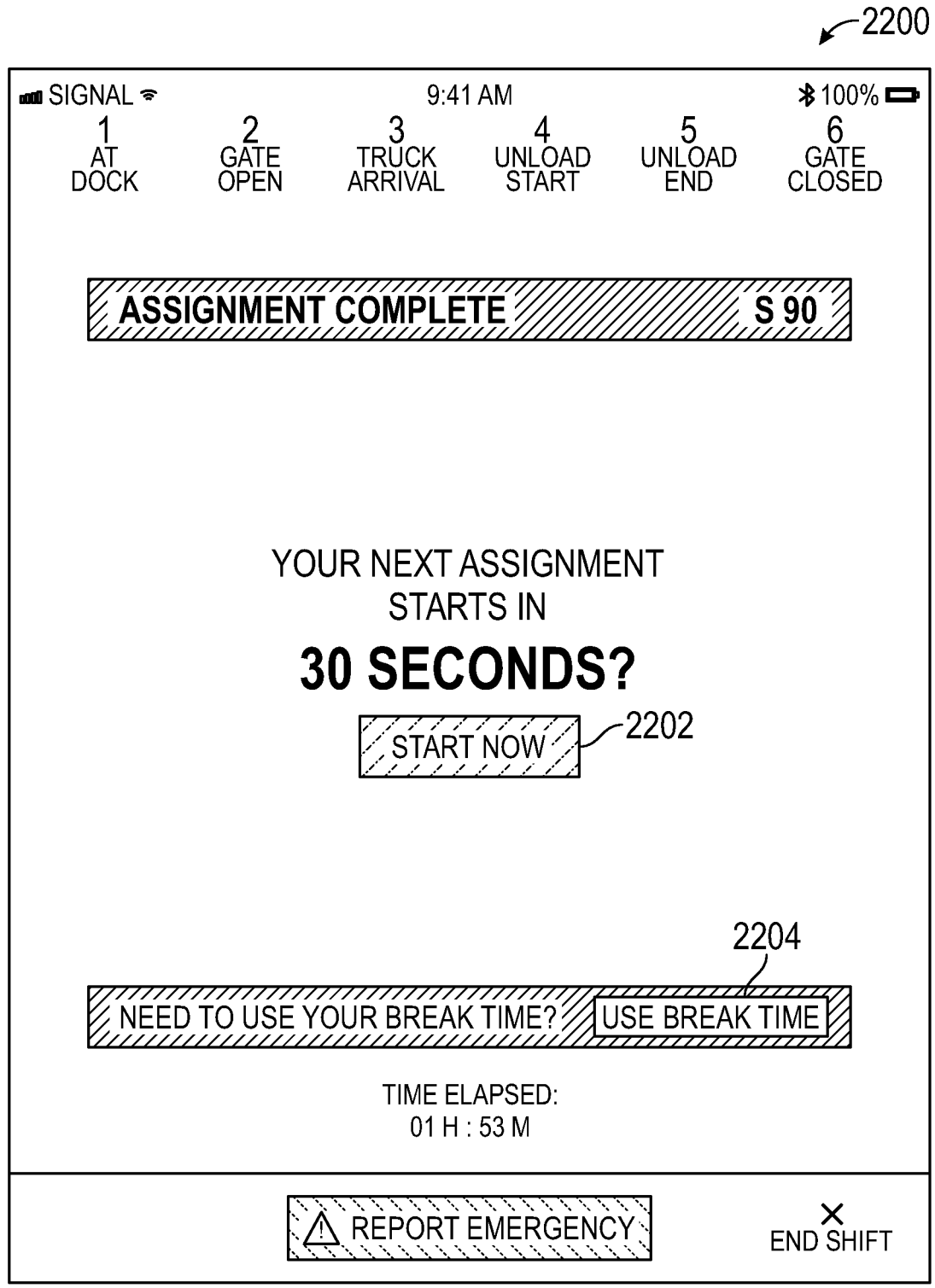
FIG. 22 illustrates an example instruction screen of a dock worker app, according to one or more embodiments of the present disclosure.

The dock worker app may then display a message requesting feedback from the dock worker regarding their next assignment, as shown by instruction screen 2200 of FIG. 22. For example, the dock worker app may ask the dock worker if they are ready to proceed to their next assignment or if they want to take a break before their next assignment. In response, the dock worker may select graphical element 2202 if they want to immediately start their next assignment, or they may select graphical element 2204 to take a break.

Figure 23:
FIG. 23 illustrates an example instruction screen of a dock worker app, according to one or more embodiments of the present disclosure.

If the dock worker indicates that they want to take a break (e.g., by selecting graphical element 2204), the dock worker app displays a message with an assigned break time duration, as shown in instruction screen 2300 of FIG. 23. At this point, the dock worker may wait the entire time of the assigned break duration or they may cut their break short. In this example, the dock worker may cut his/her break short by selecting graphical element 2302. After the assigned break time duration has elapsed, the dock worker app may automatically display information regarding the dock worker's next assignment. Alternatively, if the dock worker does not choose to take a break, the dock worker app displays information (not shown) regarding the dock worker's next assignment without providing a time delay.

If the warehouse requires double verification, then a verifier app may be launched on a mobile app of a worker designated with the task of verifying the shipment. The verifier app may display a message instructing the verifier to proceed to the particular dock at which an unloading operation has just been conducted. The message may say something like "proceed to staging area X for inbound inspection" (where "X" may designate the location of the newly unloaded goods). The verifier app may then prompt the verifier for various pieces of information such as whether the unloading is complete, if the correct packaging was used, if the goods were shipped with the correct quantities, if there are any damaged goods, etc. The verifier may then submit responses to the verifier app to provide appropriate feedback regarding the requested information. For example, the verifier may indicate their responses in the form of yes/no answers to questions. Alternatively, the verifier may provide comments in a comment box that may be displayed by the verifier app, and/or the verifier may answer questions by selecting answers from one or more drop-down menus and/or via voice confirmation.

If the dock worker app and the verifier app receive matching responses, then the verifier app may load a BoL screen and may provide a prompt requesting the verifier to sign the BoL as confirmation of delivery. In contrast, if there are discrepancies between information provided by the dock worker and the verifier, the verifier app may display an alert that there are mismatches between data entered by the dock worker relative the similar data entered by the verifier. The verifier app may then prompt the verifier to go through a similar procedure to re-enter responses regarding whether the correct packaging was used, whether the goods were shipped with the correct quantities, whether there are any damaged goods, etc.

If a discrepancy continues to exist between information provided by the dock worker and the verifier, then the answers provided by the verifier may be taken as the official answers used for verification. Alternatively, a third party may be requested to perform an independent inspection and verification. The third party may be requested to provide a signature to the BoL to confirm their assessment. After the BoL is signed by one or more of the dock worker, the verifier, and/or the third party, the BoL may then be sent to the driver app. The driver app may then prompt the driver to enter a response confirming that they have received the BoL. The driver app may further prompt the driver to confirm receipt of further POD documentation. Upon confirming receipt of POD, the driver may leave the dock area. The driver app may then display a QR code that the driver may use to exit the facility. For example, the driver may present the QR code to be scanned by a dock worker, a verifier, a gate guard, or by a mounted QR code scanner upon departure.

The system may then send an alert to the driver app instructing the driver to leave the warehouse, as well as providing further instructions. The system may record the time at which the alert was sent to the driver app as the driver departure time. Alternatively, system may record the time that the QR code was scanned as the driver departure time. In other embodiments, the system may define a departure times as a median or average of the time at which the QR code was scanned and the time at which the departure alert was sent to the driver app. At or the near the time at which the driver receives instructions to depart from the warehouse, the verifier app and/or the dock worker app may display a message requesting confirmation that the dock is free. The dock worker and/or the verifier may then enter a response indicating that the dock is free to be scheduled for another delivery. The system may then incorporate data on driver departure time, dock worker availability, verifier availability, and dock availability, to use for continued schedule optimization.

Staging and verification of outbound shipments may proceed as follows. In response to a notification and/or prompt received on the dock worker app, the scheduled dock worker may begin the staging and verification process by moving items that were retrieved from warehouse inventory to the dock staging area. The dock worker may then receive a prompt on a mobile device from the dock worker app requesting information regarding the staged shipment and loading operation. For example, the dock worker app may request the dock worker to verify that the retrieved goods have appropriate packaging, whether there are appropriate quantities of the goods, and whether any of the goods are damaged. The dock worker may provide answers to such questions by pushing a button (e.g., a physical button or a virtual button on a touch screen), by answering yes/no questions, by selecting answers from a pull-down menu, etc. The dock worker app may further provide a comment box in which the dock worker may provide comments regarding the goods to be shipped and noting any problems with packaging, quantities, broken goods, etc.

If the facility/warehouse requires double verification, then a verifier app may provide a message or an alert to another worker who is assigned to be an inspector/verifier. The system may trigger the verifier app after receiving responses from the dock worker app indicating that a verifier is needed for the next stage of the loading and verification process. For example, the verifier app may send a message to the verifier directing them to go the appropriate staging area and to perform an inspection of an outgoing shipment. The verifier app may prompt the verifier to respond to questions about the goods to be shipped using a process similar to the one provided to the dock worker on the dock worker app. For example, the verifier app may request information indicating whether the staged goods have appropriate packaging, whether there are appropriate quantities of the goods, and whether any of the goods are damaged. The verifier may provide answers to such questions by pushing a button (e.g., a physical button or a virtual button on a touch screen), by answering yes/no questions, by selecting answers from a pull-down menu, etc.

If responses received by the dock worker app and the verifier app match, then the verifier app may load a screen and prompt the verifier to sign as proof that the goods retrieved from the warehouse have been properly staged and are ready to be loaded and shipped. If a discrepancy is found between responses provided by the dock worker app and the verifier app, the verifier app may request the verifier to go through the inspection process once more. In this regard, the verifier may be asked to respond to questions concerning whether the staged goods have appropriate packaging, whether there are appropriate quantities of the goods, and whether any of the goods are damaged. If there is no remaining discrepancy, then the verifier may then be prompted to sign as proof of inspection. If the responses received by the dock worker app and the verifier app still do not match, then the verifier app may designate the verifier's answers as the official responses to the questions. Alternatively, a third party worker may be brought in to provide a third inspection/verification.

Once the inspection issue has been resolved and final answers for the results of the inspection have been established, the dock worker app and/or the verifier app may display a message asking whether the staging process has been completed. The dock worker and/or verifier may provide an answer in the form of a yes/no response. If the answer is "no" the dock worker and/or verifier may be provided an opportunity to enter comments regarding the situation. Upon answering in the affirmative that staging is complete, the dock worker app and/or the verifier app may display a message regarding next steps. For example, the dock worker app and/or the verifier app may display a message regarding the worker's (i.e., dock worker and/or verifier) next assignment and request input asking if the worker would like to proceed to their next assignment or if they want to take a break.

If the worker indicates that they want to take a break, the dock worker or verifier app displays a message with an assigned break time duration and/or displays a screen tracking the duration of the break. After the dock worker or verifier have finished their break, the dock worker app or the verifier app may then automatically display information regarding the worker's next assignment. Alternatively, if the worker does not choose to take a break, the dock worker app or the verifier app displays information regarding the worker's next assignment without providing a time delay.

Loading and verification of outbound shipments may proceed as follows. The process begins when the driver arrives at the dock with the truck and the dock worker arrives at the dock with appropriate equipment (e.g., with a forklift).

Figure 18:
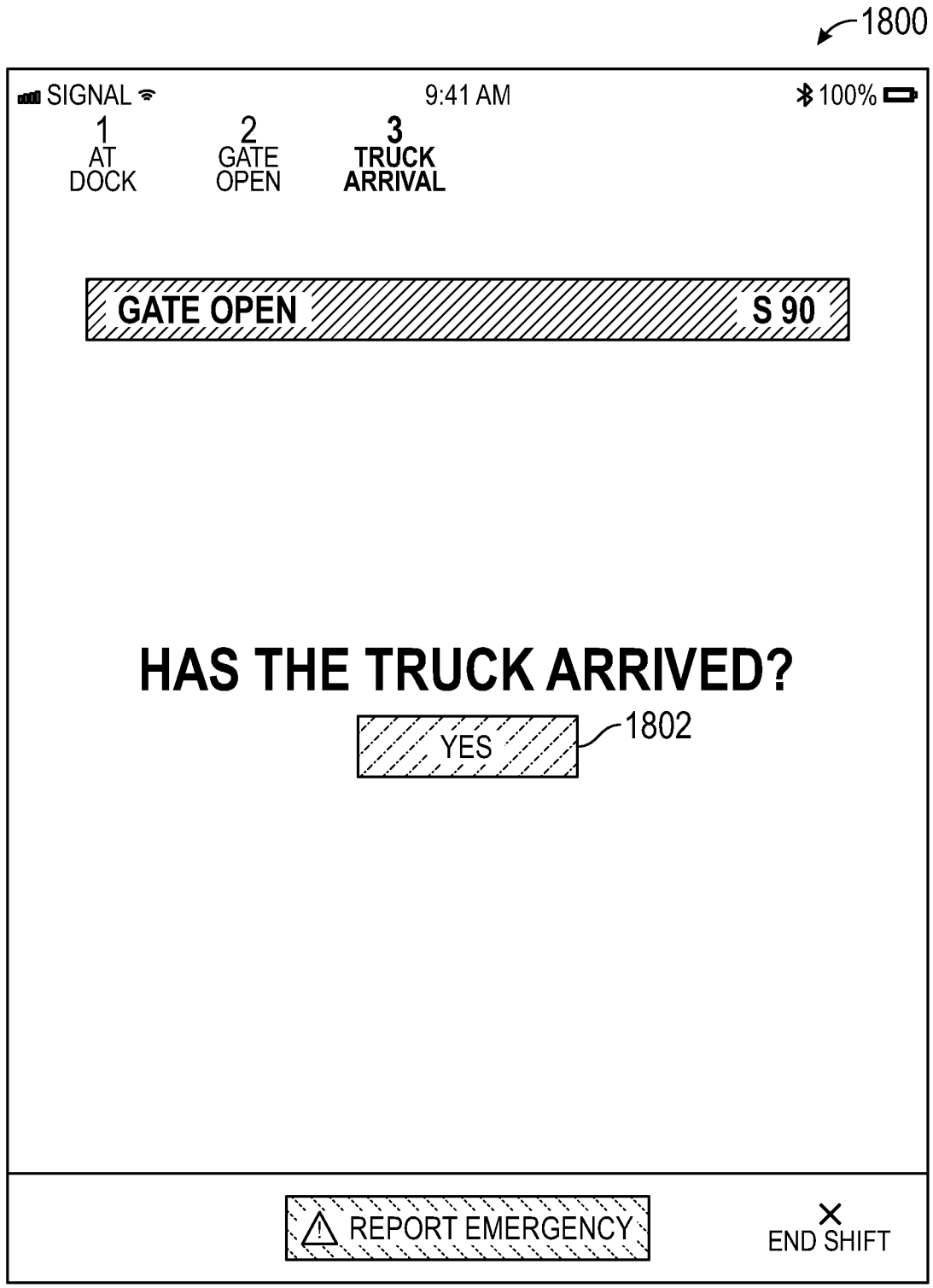
FIG. 18 illustrates an example instruction screen of a dock worker app, according to one or more embodiments of the present disclosure.
Figure 19:
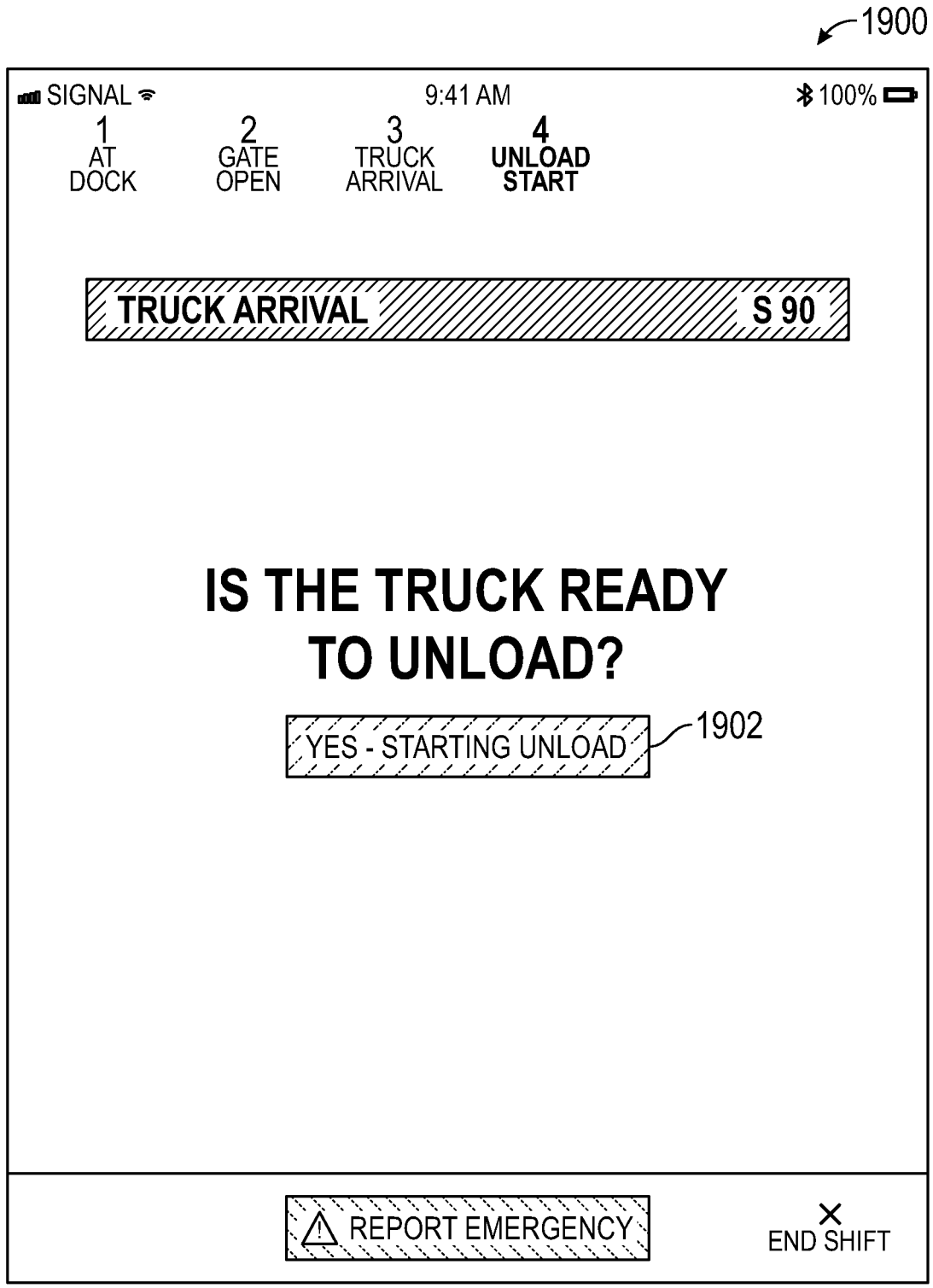
FIG. 19 illustrates an example instruction screen of a dock worker app, according to one or more embodiments of the present disclosure.
Figure 24:
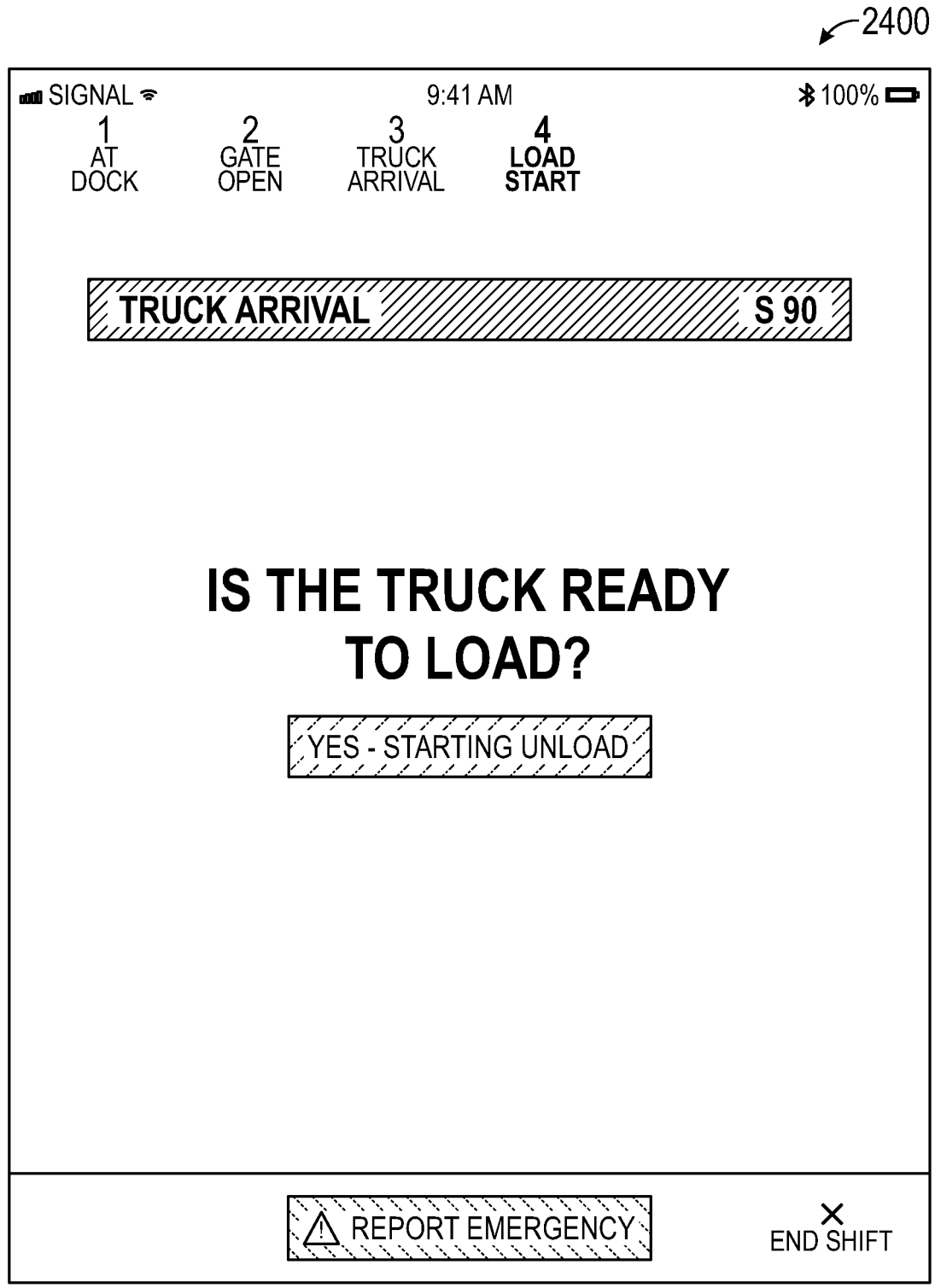
FIG. 24 illustrates an example instruction screen of a dock worker app, according to one or more embodiments of the present disclosure.

The dock worker app may display a message asking for a response indicating whether the truck has arrived, as shown in FIG. 18. The dock worker may respond to indicate whether the truck has arrived. For example, the dock worker may select graphical element 1802 of FIG. 18 to answer in the affirmative that the truck has arrived. The dock worker app may then ask the dock worker if the truck is ready to load, as shown in information screen 2400 shown in FIG. 24.

When the dock worker responds that the truck is ready to load, the dock worker app may display a notice (not shown) providing instructions to the dock worker to begin loading the truck with the goods that were previously staged, as described above. In certain embodiments, the dock worker app may provide multiple prompts to load different items on the truck on different phases of the loading process. For example, for a given load pattern of goods, the dock worker app may request image captures to document different phases of the loading process. The dock worker app may provide a prompt at each phase.

Figure 25:
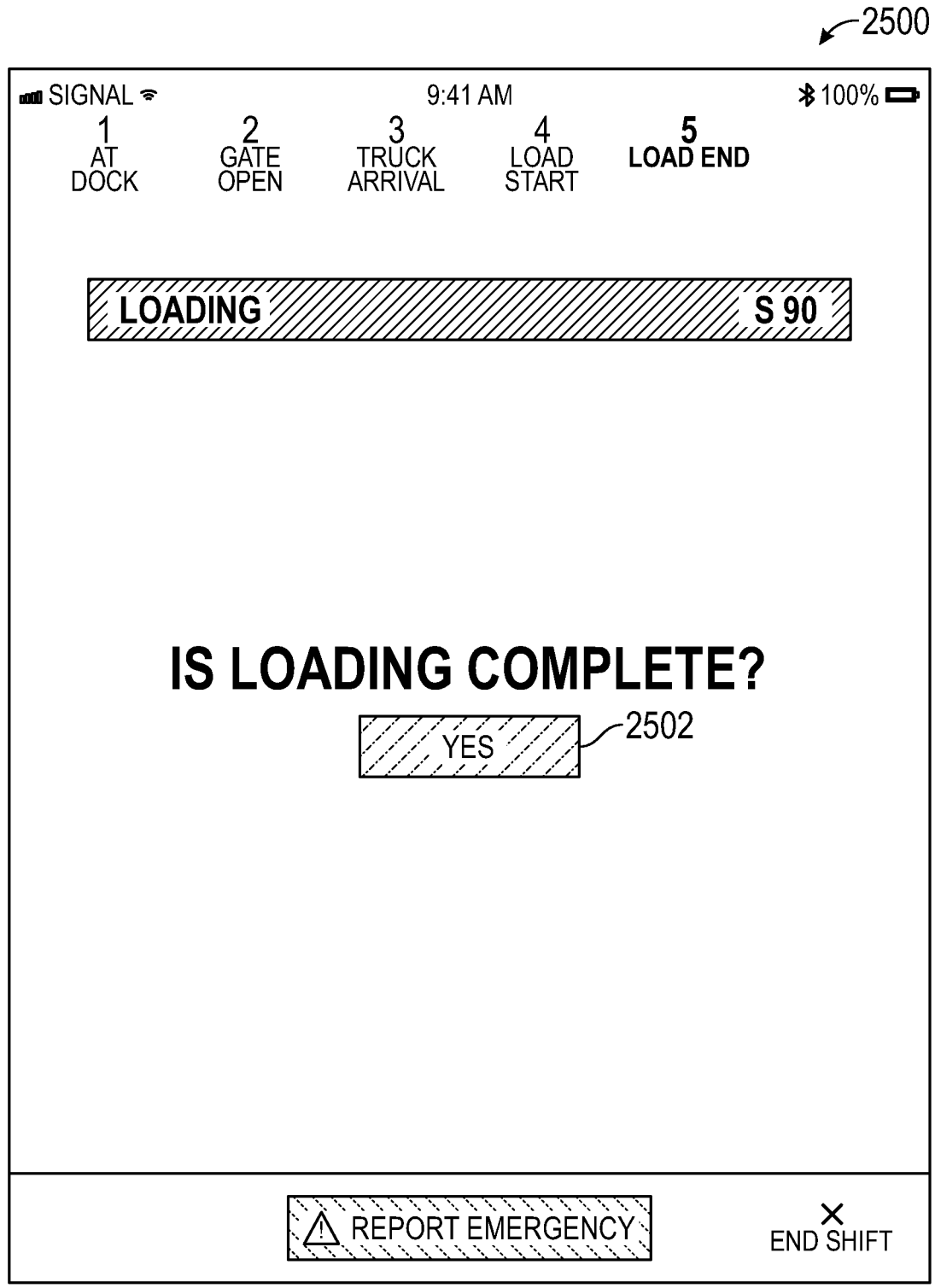
FIG. 25 illustrates an example instruction screen of a dock worker app, according to one or more embodiments of the present disclosure.

After prompts have been issued and responses have been received for each phase of a loading process, the dock worker app may display a message asking if the load process is complete, as shown by instruction screen 2500 of FIG. 25. The dock worker may answer in the affirmative by selecting graphical element 2502. When the dock worker answers that the loading process is complete, the dock worker app may then display a message asking if a dock door is closed, as shown, for example, in FIG. 21. Upon closing the dock door, the dock worker may provide a response to the dock worker app indicating that the dock door has indeed been closed. Upon receiving confirmation that the dock door is closed, the dock worker app may conclude that the loading process has been completed. The dock worker app may then display information regarding the dock worker's next assignment as shown, for example, in FIGS. 22 and 23.

For example, the dock worker app may ask the dock worker if they are ready to proceed to their next assignment or if they want to take a break before their next assignment. If the dock worker indicates that they want to take a break, the dock worker app may display a message with an assigned break time duration, and/or a screen tracking the duration of the break. After the dock worker or verifier have finished their break, the dock worker app may then automatically display information regarding the dock worker or verifier's next assignment. Alternatively, if the dock worker or verifier chooses to not take a break, the dock worker app displays information regarding the dock worker's next assignment without providing a time delay.

The driver app may then display a message prompting the driver to confirm receipt of a signed BoL and POD documents. Upon responding in the affirmative, the driver app may display a message prompting to driver to leave the dock area. The driver app may then display a QR code that the driver may use to exit the warehouse/facility. The QR code displayed by the driver app on the driver's mobile device may be scanned by a dock worker or by a gate guard using a mobile or stationary QR scanning device (e.g., smart phone, tablet computer, mounted QR scanner, etc.). The system may then record the time the driver app sent the alert to the driver as the driver departure time. Alternatively, the system may record the time at which the QR code was scanned as the driver departure time. In further embodiments, the system may record the average or median between the two times as the driver departure time. The dock worker app and/or the verifier app may then display a message asking if the dock is free. The dock worker and/or the verifier may then provide a response indicating that the dock is free. The system may then incorporate data on driver departure, dock worker availability, verifier availability, and dock availability into system for continued schedule optimization.

Figure 26:
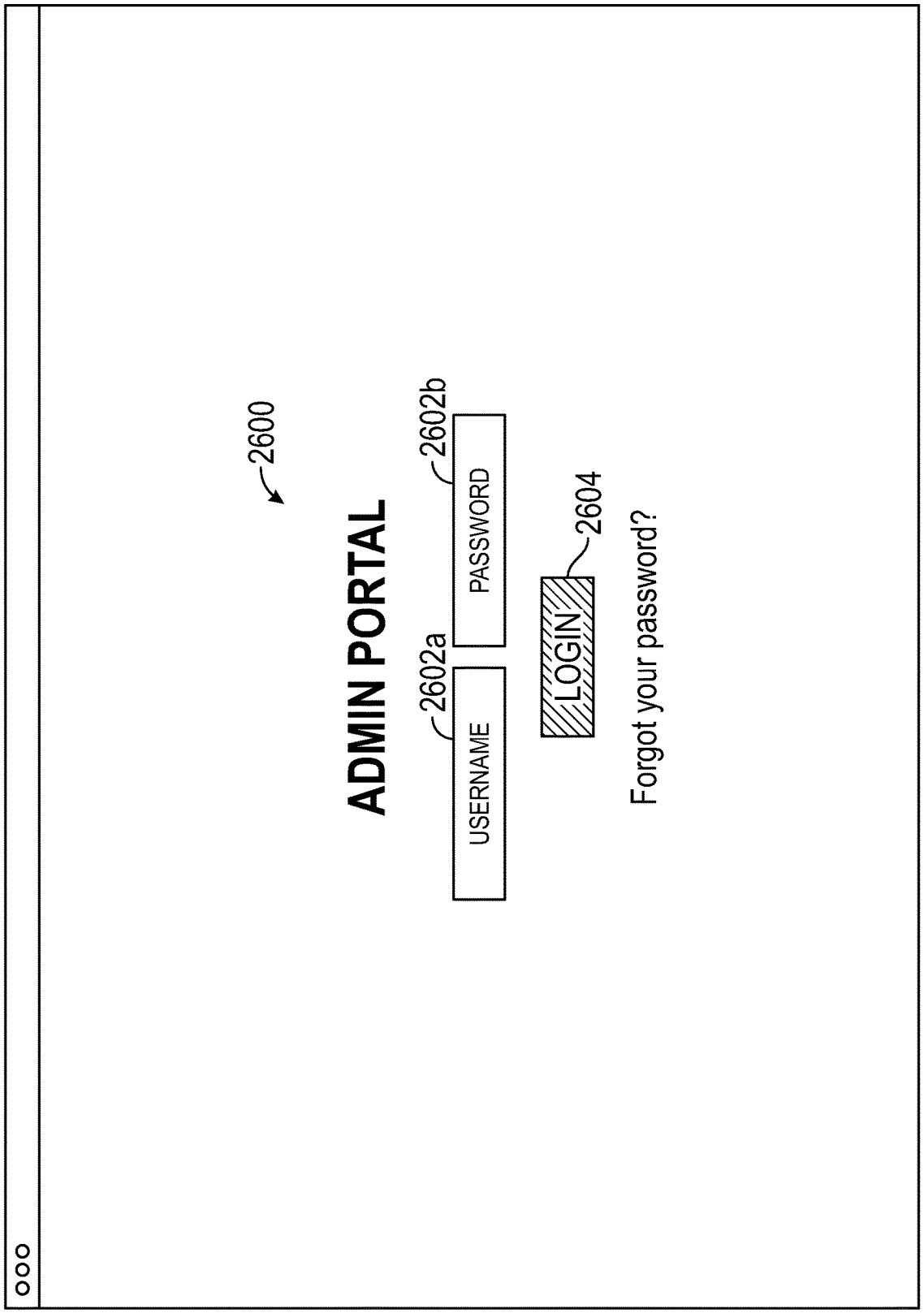
FIG. 26 illustrates an example screen of an administrative portal, according to one or more embodiments of the present disclosure.

FIG. 26 illustrates an example screen 2600 of an administrative portal, according to one or more embodiments of the present disclosure. As mentioned above, the administrator master user view, as shown in screen 2600 is intended for an operations manager or other warehouse worker responsible for daily warehouse activities. Screen 2600 provides an interface for an administrator to log into the system. For example, a username and password may be entered in text boxes 2602a and 2602b, respectively. The login information may be submitted to the system when a user selects graphical element 2604.

Figure 27:
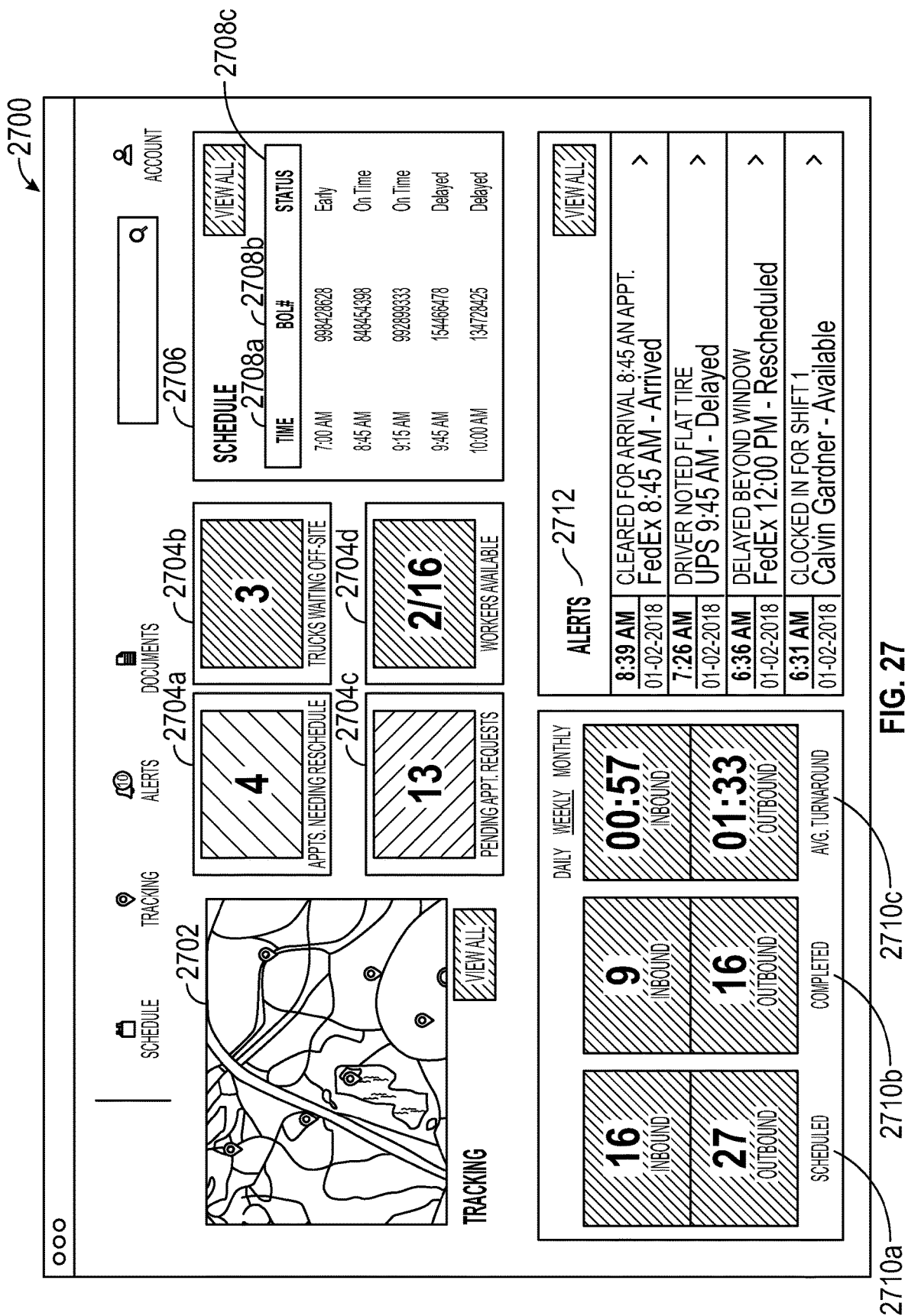
FIG. 27 illustrates an example screen of an administrative portal, according to one or more embodiments of the present disclosure.

FIG. 27 illustrates an example screen 2700 of an administrative portal, according to one or more embodiments of the present disclosure. Screen 2700 provides an overview of details related to a number of shipments. For example, a tracking view 2702 provides a visual display of in-transit shipments in a map view. The map view may be periodically or continuously updated. Graphical elements 2704a, 2704b, 2704c, and 2704d, may indicate appointments that need to be rescheduled, trucks waiting at off-site locations, pending appointment requests, and numbers of available workers, respectively. A schedule view 2706 may provide a list of various shipments with appointment times 2708a, BoL number 2708b, and status values 2708c, respectively. Further graphical elements show scheduled 2710a inbound and outbound shipments, completed 2710b inbound and outbound shipments, and average turnaround times 2710c of inbound and outbound shipments. Screen 2700 further includes a list 2712 of alerts.

FIG. 28 illustrates an example screen 2800 of an administrative portal, according to one or more embodiments of the present disclosure. Screen 2800 provides details for a plurality of shipments. Details include a status 2802, a arrival/departure time 2804, an assigned dock 2806, a carrier designation 2808, a shipping number 2810, and a designation of whether the shipment is inbound/outbound 2812. The schedule presented in screen 2800 may further include information 2814 regarding whether each shipment has a verified BoL.

Figure 29:
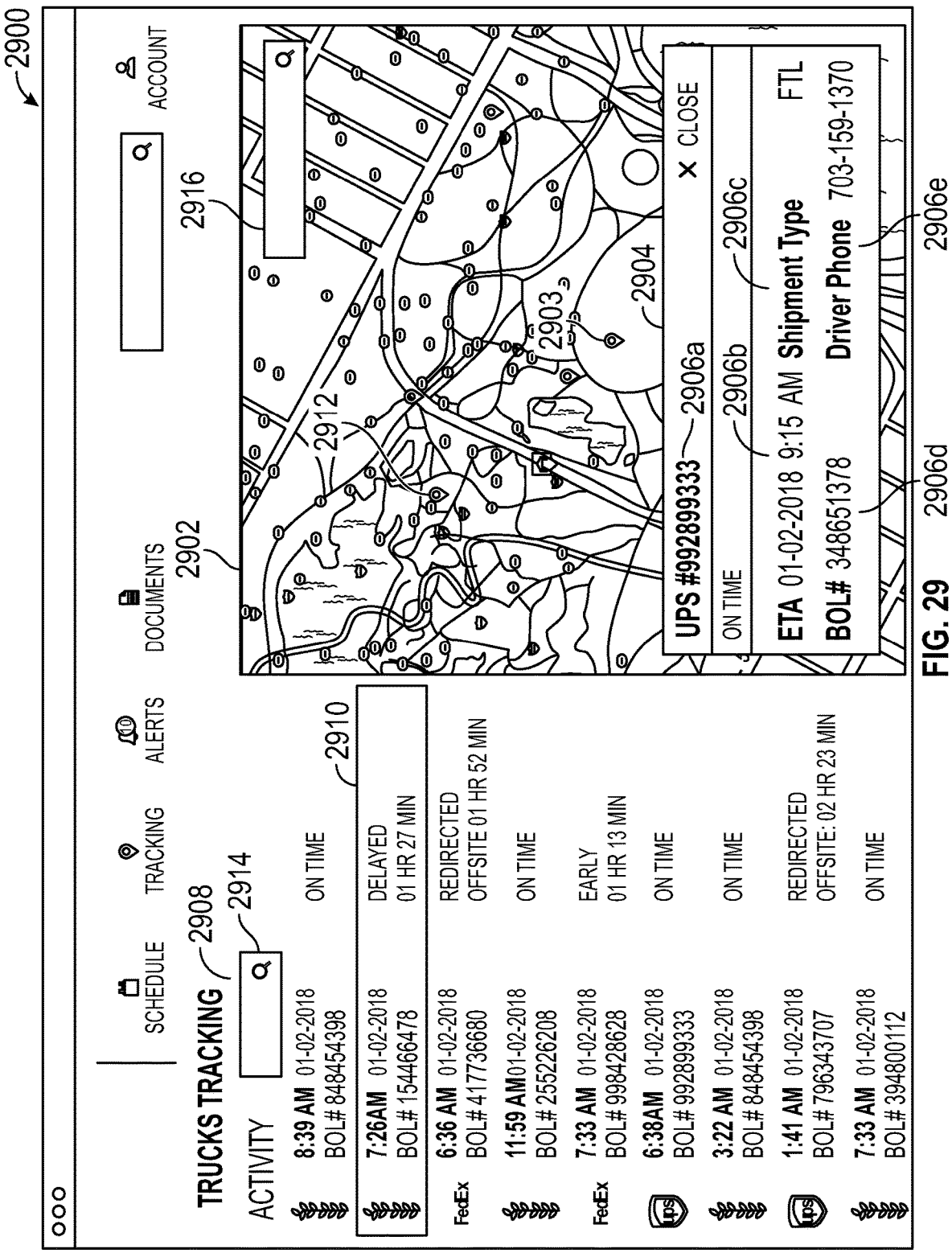
FIG. 29 illustrates an example screen of an administrative portal, according to one or more embodiments of the present disclosure.

FIG. 29 illustrates an example screen 2900 of an administrative portal, according to one or more embodiments of the present disclosure. Screen 2900 presents a map view 2902 that provides a visual representation of locations of various in-transit shipments. Details of a shipment are presented when a visual representation 2903 of a shipment is selected from the map view. In this example, selection of visual representation 2903 causes the system to present a pop-up window 2904 that gives details of the shipment. For example, the pop-up window may provide a shipment ID 2906a, an ETA 2906b, a shipment type 2906c, a BoL number 2906d, and a driver phone number 2906e.

An activity list 2908 shows the various shipments that are shown in the map view 2902. Details of a shipment may be obtained by selecting a corresponding shipment from the list. In this example, shipment 2910 is selected, which may cause a visual representation 2912 of the location of the shipment to be displayed on the map view 2902. A search box 2914 may also be provided. A user may search for details on a particular shipment in the activity list 2908 by entering search terms in the search box 2914. A similar search box 2916 may allow a user to search shipments that are displayed in the map view 2902.

Figure 30:
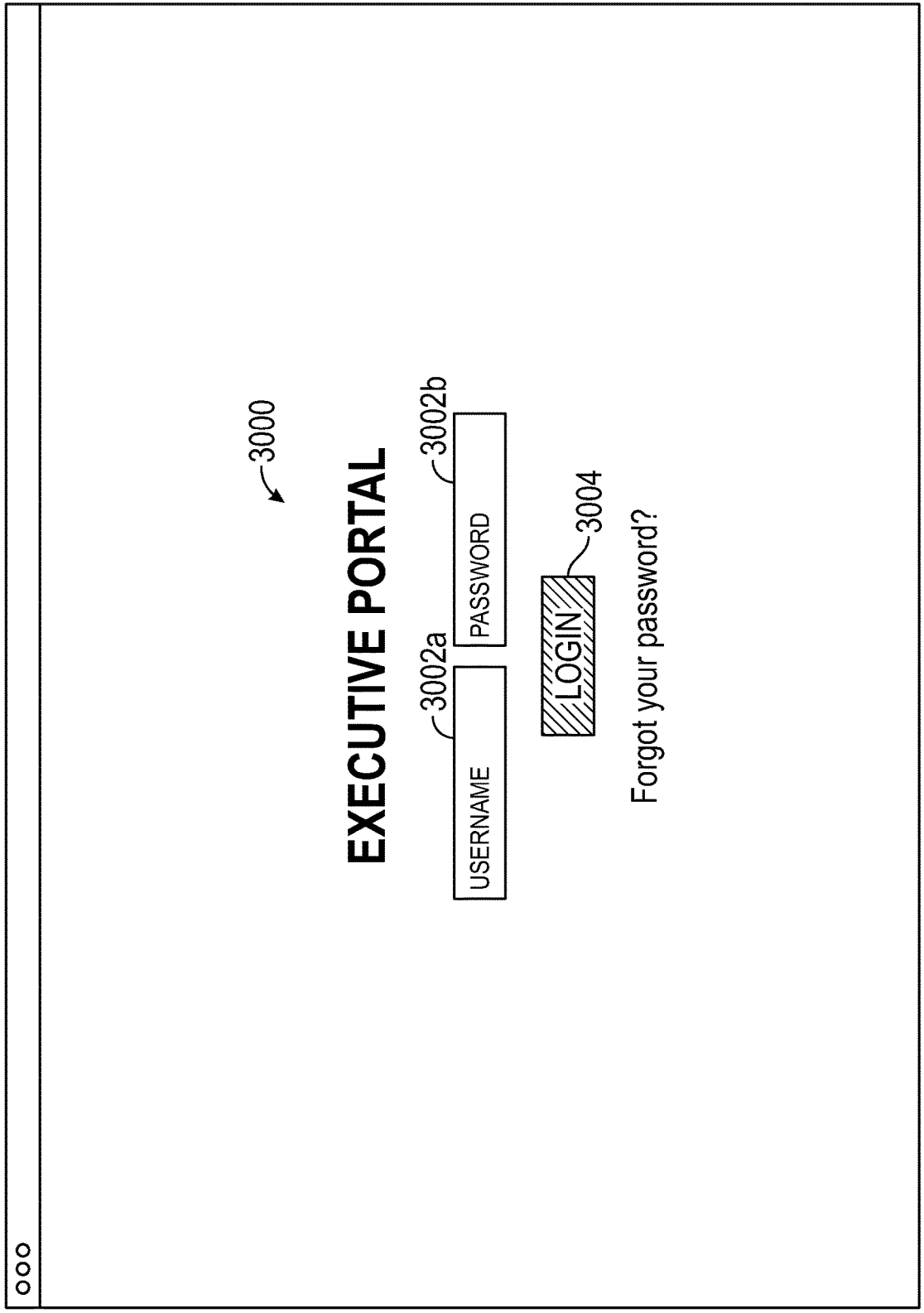
FIG. 30 illustrates an example screen of an executive portal, according to one or more embodiments of the present disclosure.

FIG. 30 illustrates an example screen 3000 of an executive portal, according to one or more embodiments of the present disclosure. Screen 3000 provides an interface for users to log into the system. For example, a username and password may be entered in text boxes 3002a and 3002b, respectively. A user may submit the login information to the system by selecting graphical element 3004. Once the user has successfully logged into the system, the executive portal may display a dashboard screen that may provide information regarding a number of shipments, as described below with reference to FIG. 31.

Figure 31:
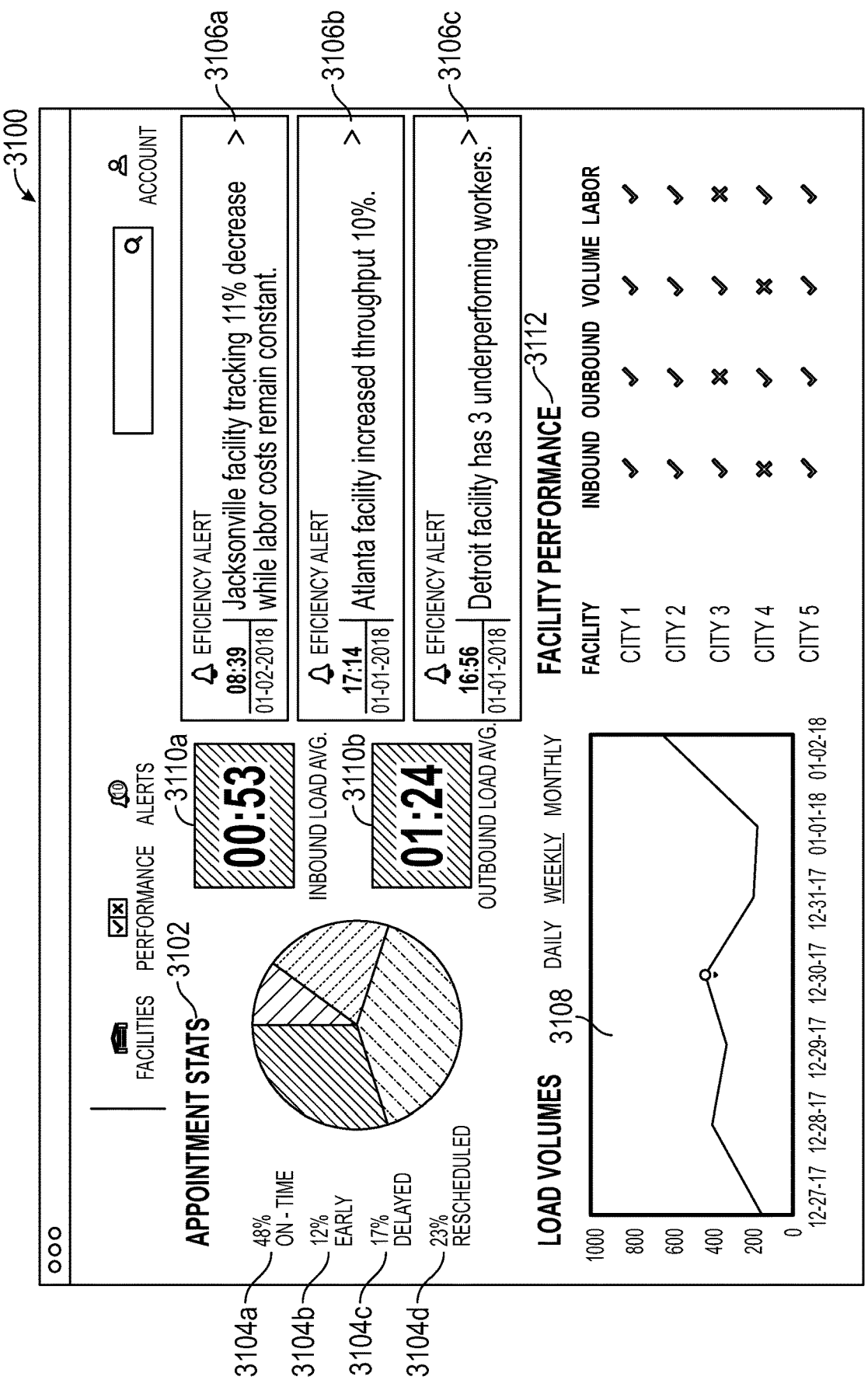
FIG. 31 illustrates an example screen of an executive portal, according to one or more embodiments of the present disclosure.

FIG. 31 illustrates an example screen 3100 of an executive portal, according to one or more embodiments of the present disclosure. As described above, the executive master view, as shown in FIG. 31, for example, is intended for managers and/or executives and may include a high-level analytics dashboard that provides real-time information for all facilities. Information provided by the dashboard may provide warehouse productivity statistics 3102 including: percentage breakdowns for on-time 3104a, early 3104b, delayed 3104c, and rescheduled 3104d appointments. Screen 3100 may further show positive and negative trends in warehouse labor productivity (e.g., 3106a, 3106b, 3106c) and positive and negative trends in warehouse throughput/load volumes 3108. Displayed information may further include statistics related to average load times 3110a and unload times 3110b time per outbound and inbound shipments, respectively. Information provided by the dashboard may further include statistics related to carrier performance 3112, alerts for unexpected deviations from historical warehouse data (e.g., 3106a, 3106b, and 3106c), and data related to percentages of shipments that reached end-users as scheduled (not shown in this example).

Figure 32A:
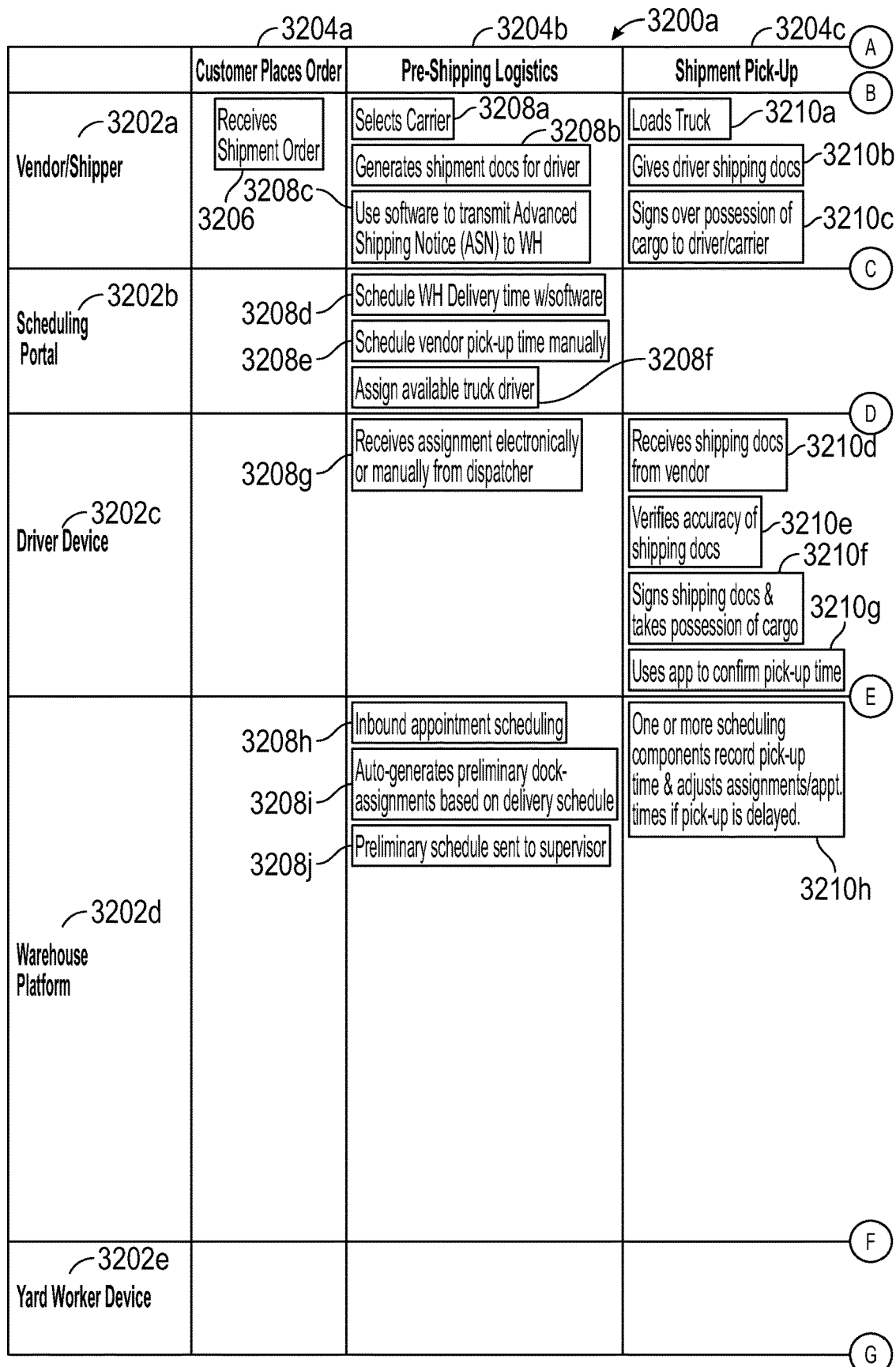
FIG. 32A is a first portion of a matrix illustrating coordinated operations between components of disclosed systems, according to one or more embodiments of the present disclosure.

FIG. 32A is a first portion 3200a of a matrix illustrating coordinated operations between components of disclosed systems, according to one or more embodiments of the present disclosure. Columns of the matrix represent various stages of a shipping operation. Rows of the matrix represent the various agents/operators who perform the various operations in the shipping operation. This example considers an inbound shipment in which goods are picked up from a shipper and are transported to a warehouse. Outgoing shipments would involve similar agents/operators who perform similar operations. Rows 3202a, 3202b, 3202c, 3202d, and 3202e illustrate operations performed by a vendor/shipper, a carrier or scheduling portal, a driver device, a warehouse platform, and a warehouse/yard worker device, respectively. The lines labeled A to G are visual guides indicating how portion 3200a of the matrix, shown in FIG. 32A, connects with portion 3200b of the matrix shown in FIG. 32B, as described in greater detail below.

Column 3204a illustrates a first stage in an inbound shipping operation. In this stage the vendor/shipper receives 3206 a shipment order from a customer. The receipt 3206 of the order from the customer initiates a plurality of coordinated operations of the various system components. For example, a second stage of the inbound shipping operation is indicated by column 3204b of the matrix. Stage 3204b represents pre-shipping logistics that are performed by the vendor/shipper, the carrier via the scheduling portal device 3202b, the carrier/driver device 3202c, and the warehouse platform 3202d. The activities of these various devices may be performed sequentially or in parallel. In this regard the vendor/shipper selects a carrier generates 3208b shipment documents for a driver, and transmits 3208c an advanced shipping notice (ASN) to a warehouse.

At the same time, or sequentially before or after the activities of the vendor/shipper, the carrier schedules 3208d a warehouse delivery time, schedules 3208e a vendor pickup time, and assigns 3208f an available truck driver via the scheduling portal device 3202b. Similarly, at the same time or sequentially before or after the above-described activities, the driver device 3202c may receive 3208g an assignment electronically or manually from the dispatcher.

At the same time, or sequentially before or after the activities of the above-described activities, the warehouse platform 3202d performs a number of operations. In this regard, the warehouse platform 3202d may perform inbound appointment scheduling 3208h, may auto-generate 3208i preliminary dock assignments based on a delivery schedule and dock designations, and may send 3208*j* a preliminary schedule to a supervisor.

A next stage of operations is illustrated by column 3204*c* of the matrix. This column represents operations involved in a shipment pickup and involve the vendor/shipper, the driver device 3202*c*, and the warehouse platform 3202*d*. For example, the vendor/shipper device 3202*a* performs communications regarding loading 3210*a* of the truck, provides 3210*b* shipping documents to the truck driver, and provides documentation that conveys 3210*c* possession of the cargo to the driver/carrier. In other embodiments, the vendor/shipper communicates, provides shipping documents to the truck driver, and provides documentation that conveys 3210*c* possession of the cargo to the driver/carrier manually via phone calls and printed materials.

Similarly, at the same time or sequentially before or after the above-described activities, the driver device 3202*c* receives 3210*d* shipping documents from the vendor, verifies 3210*e* accuracy of the shipping documents, receives 3210*f* a signature of shipping documents indicating that the carrier/driver has taken possession of the cargo, and confirms 3210*g* a time at which cargo was picked up. Similarly, at the same time or sequentially before or after the above-described activities, one or more components of the warehouse platform records 3210*h* the shipment pickup time and adjusts assignments and pickup times if the pickup is early or is delayed.

Figure 32B:
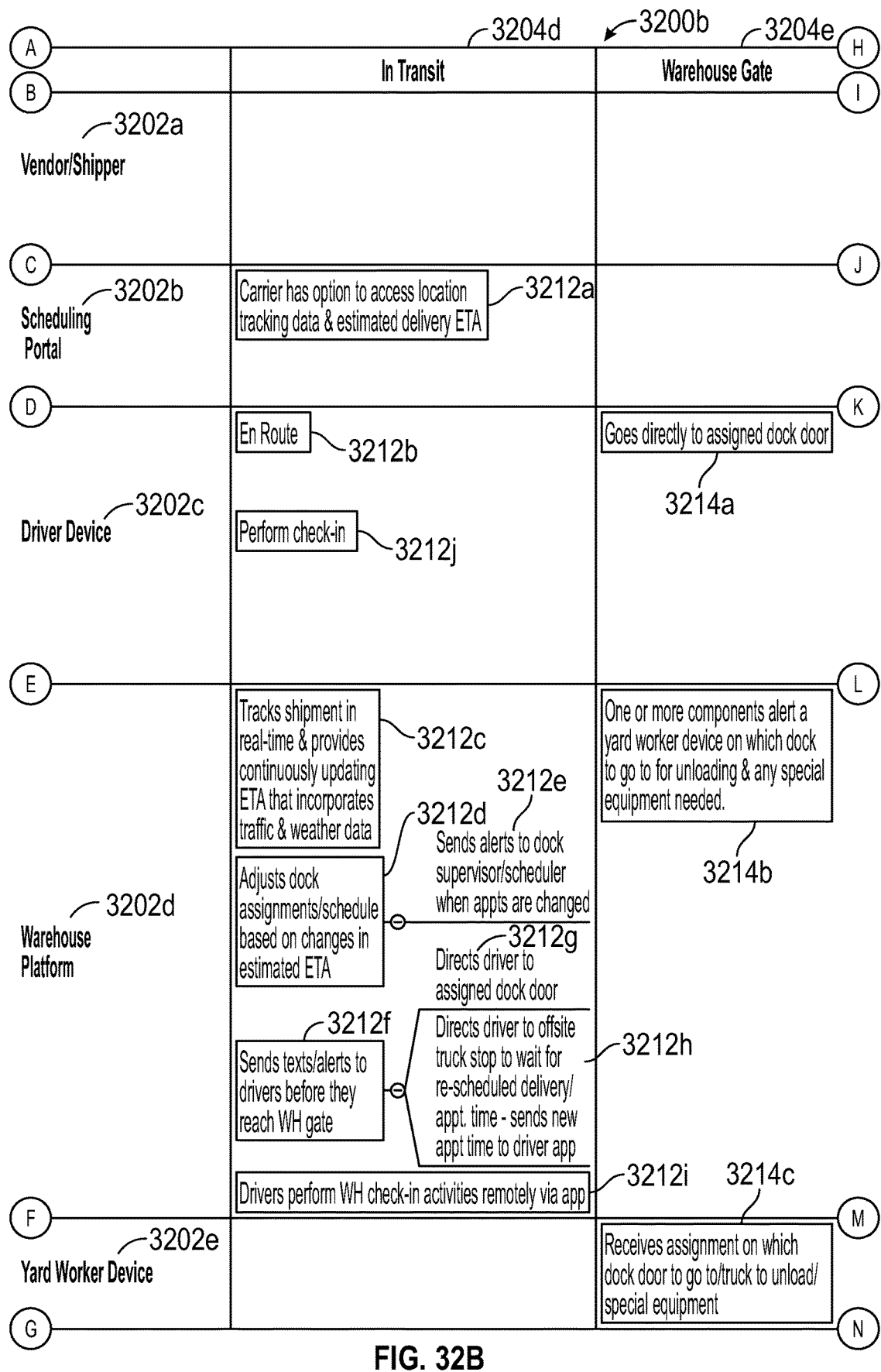
FIG. 32B is a second portion of a matrix illustrating coordinated operations between components of disclosed systems, according to one or more embodiments of the present disclosure.

FIG. 32B is a second portion 3200*b* of the matrix illustrating coordinated operations between components of disclosed systems, according to one or more embodiments of the present disclosure. The lines labeled A to G are visual guides indicating how portion 3200*b* of the matrix, shown in FIG. 32B, connects with portion 3200*a* of the matrix shown in FIG. 32A, as described in greater detail below.

A next stage of operations is illustrated by column 3204*d* of the matrix. This column represents operations involved in transport of a shipment involving the scheduling portal device 3202*b*, the driver device 3202*c*, and the warehouse platform 3202*d*. In this regard, the driver device may perform 3212*a* location tracking of the driver and the warehouse platform may periodically estimate a delivery ETA. At the same time, or sequentially before or after the above-described activities, the driver device 3202*c* may communicate 3212*b* with the scheduling portal device 3202*b* and the warehouse platform 3202*d*. In this regard, the driver device 3202*c* may receive messages or may otherwise be pinged by the warehouse platform, scheduling portal 3202*b* and/or the warehouse platform 3202*d* to provide location information.

At the same time, or sequentially before or after the above-described activities, the warehouse platform 3202*d* performs various operations. In this regard, the warehouse platform 3202*d* may perform 3212*c* real-time shipment tracking and may continuously update shipment ETA. The updating of the shipment ETA may include information regarding traffic and weather patterns. The warehouse platform 3202*d* may further adjust 3212*d* assignments and the overall schedule of multiple shipments based on changes in estimated ETA. The warehouse platform 3202*d* may send 3212*e* alerts to a dock supervisor/scheduler when appointments need to be changed. The warehouse platform may further send 3212*f* texts or other alerts to drivers before they reach the warehouse or other delivery destination. The warehouse platform 3202*d* may further provide instructions to the driver directing 3212*g* them to go to an assigned dock door. Alternatively, the scheduling platform 3202 may send instructions directing 3212*h* the driver to go to an off-site location to wait until a dock assignment has been made. The warehouse platform may further receive 3212*i* communications from a driver who is performing check-in operations at a dock. Such communications may be received 3212*i* from a driver who uses his mobile device 3202*c* to perform 3212*j* check-in operations.

A next stage of operations is illustrated by column 3204*e* of the matrix. This column represents operations related to activities performed at a warehouse gate related to unloading of an inbound shipment. These operations involve the driver device 3202*c*, the warehouse platform 3202*d*, and a dock worker device 3202*e*. In this regard, the driver device 3202*c* may instruct 3214*a* a driver to go to an assigned dock door. The driver may further interact with the driver device 3202*c* to confirm that he/she has arrived at the assigned dock door.

At the same time, or sequentially before or after the above-described activities, the warehouse platform 3202*d* may provide 3214*b* one or more alerts to a dock/yard worker device instructing the dock/yard worker to go to the assigned dock and bring any required equipment (e.g., a forklift) to the dock to use in unloading operations. At the same time, or sequentially before or after the above-described activities, the dock/yard worker device 3202*e* may receive 3214*c* an assignment message from the warehouse platform 3202*d*. The assignment message may instruct the dock/yard worker to proceed to an assigned dock and to bring appropriate equipment. The lines labeled H to N are visual guides indicating how portion 3200*b* of the matrix, shown in FIG. 32B, connects with portion 3200*c* of the matrix shown in FIG. 32C, as described in greater detail below.

Figure 32C:
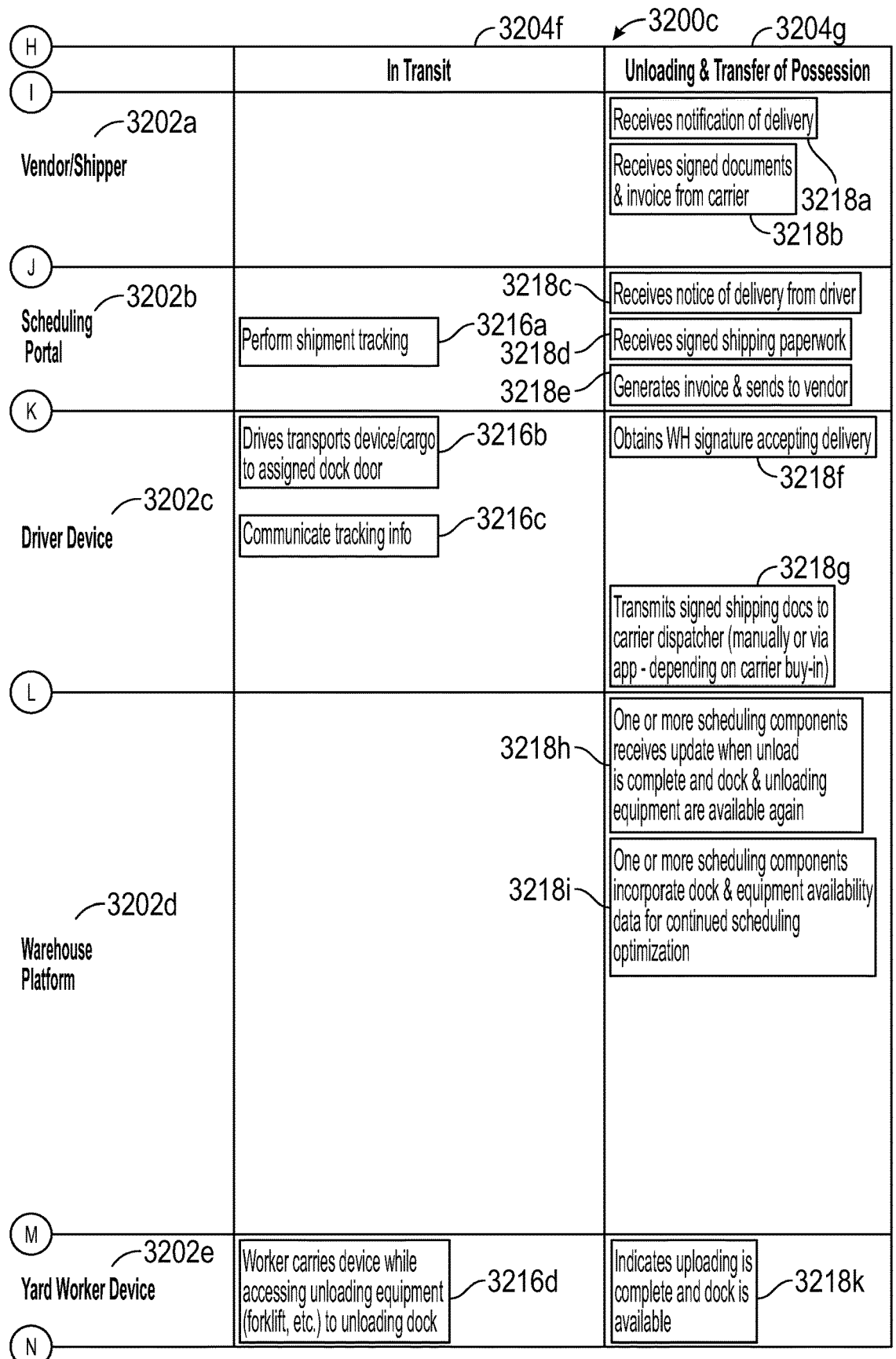
FIG. 32C is a third portion of a matrix illustrating coordinated operations between components of disclosed systems, according to one or more embodiments of the present disclosure.

FIG. 32C is a third portion 3200*c* of the matrix illustrating coordinated operations between components of disclosed systems, according to one or more embodiments of the present disclosure. As mentioned above, lines labeled H to N are visual guides indicating how portion 3200*c* of the matrix, shown in FIG. 32C, connects with portion 3200*b* of the matrix shown in FIG. 32B. A next stage of operations is illustrated by column 3204*f* of the matrix. This column represents operations that occur during transit of cargo from the shipper to the warehouse. In this regard, warehouse platform device may perform 3216*a* shipment tracking operations by sending and receiving tracking information to/from the driver device 3202*c*. The driver device 3202*c* may receive 3216*b* instructions to transport its cargo from the shipper to the warehouse or other delivery destination. The driver device 3202*c* may further send and receive 3216*c* tracking information to/from the scheduling portal device 3202*b*. At the same time or sequentially before or after the above-described activities, the warehouse/yard worker device 3202*e* may access 3216*d* information regarding an assigned dock and required equipment (e.g., a forklift) for the unloading operation.

A next stage of operations is illustrated by column 3204*g* of the matrix. This stage illustrates coordinated operations performed by the vendor/shipper 3202*a*, the scheduling portal device 3202*b*, the driver device 3202*c*, the warehouse platform 3202*d*, and the warehouse dock/yard worker device 3202*e*. In this regard, the vendor/shipper may receive 3218*a* a notification of the delivery and may receive 3218*b* signed documents and an invoice from the carrier. At the same time, or sequentially before or after the above-described activities, the carrier may receive 3218*c* a notice of delivery from the driver, may receive 3218*d* signed shipping paperwork, and may generate 3218*e* an invoice that it may send to the vendor. At the same time, or sequentially before or after the above-described activities, the driver device 3202*c* may obtain 3218f a signature accepting delivery of cargo and may transmit 3218g signed shipping documents to the carrier.

At the same time, or sequentially before or after the above-described activities, one or more components of the warehouse platform 3202d may receive 3218h an update indicating when the loading process is complete and when the dock and equipment are once again available. One or more components of the warehouse platform may then incorporate 3218i dock and equipment availability date for continued scheduling optimization. Lastly, at the same time, or sequentially before or after the above-described activities, the warehouse platform may be used to receive 3218k a confirmation from the dock/yard worker that the uploading is complete.

Figure 33:
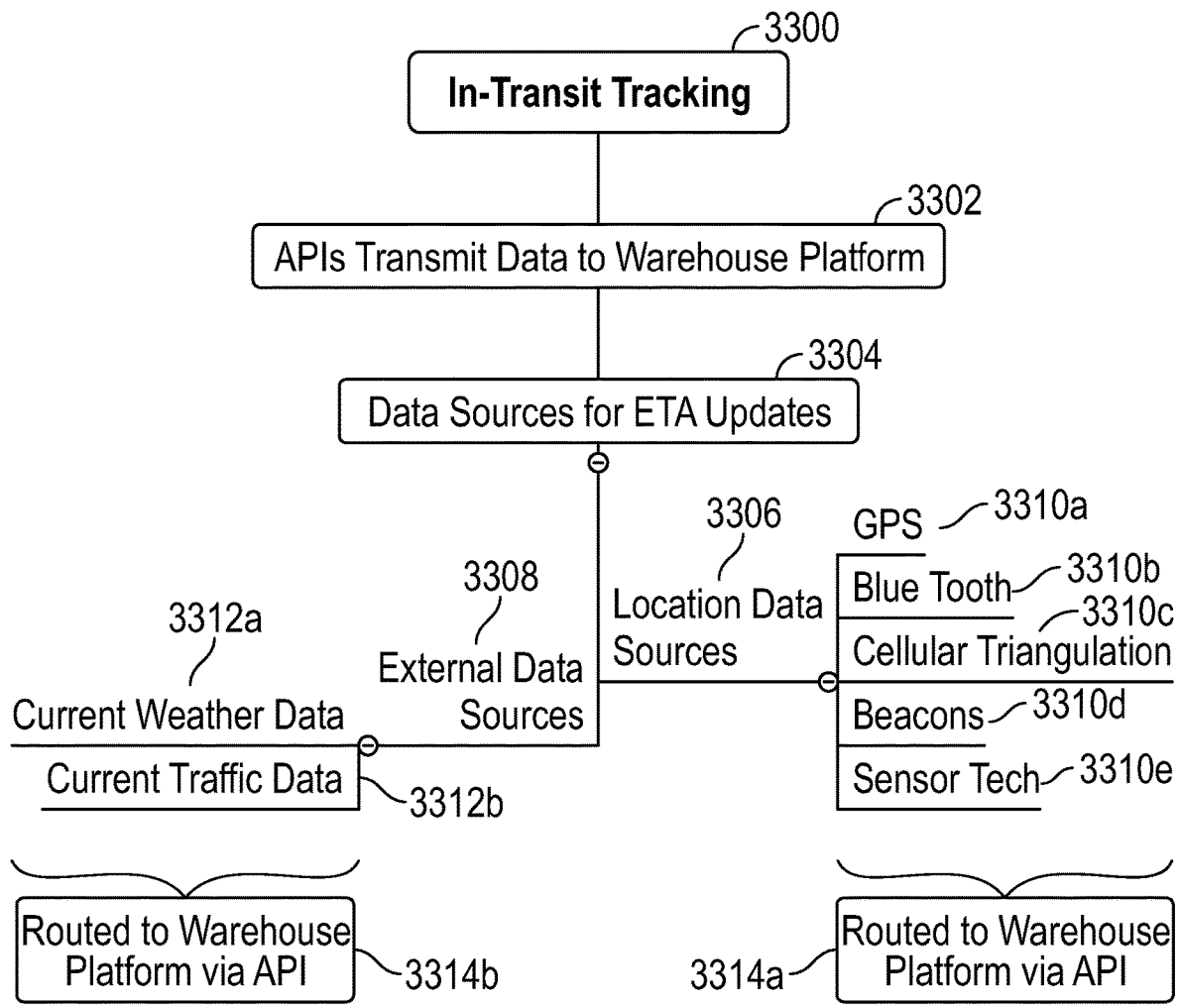
FIG. 33 is a block diagram illustrating a system that performs location tracking, according to one or more embodiments of the present disclosure.

FIG. 33 is a block diagram illustrating a system 3300 that performs location tracking, according to one or more embodiments of the present disclosure. As described above, tracking system 3300 may include one or more APIs that interact with various data sources 3304 to gather information that may be used to generate updated ETAs for shipments. Data sources 3304 may include location data sources 3306 and external data sources 3308. Location data sources 3306 may include one or more GPS systems 3310a, Bluetooth systems 3310b, cellular triangulation systems 3310c, radio-transmitter beacons 3310d, and various other sensors 3310e. External data sources 3308 may include sources 3312a of current weather data and sources 3312b of current traffic data. Data from location data sources 3306 may be routed 3314a to the warehouse platform via one or more APIs 3302 and data from external data sources 3308 may similarly be routed 3314b to the warehouse platform via one or more APIs 3302.

Figure 34:
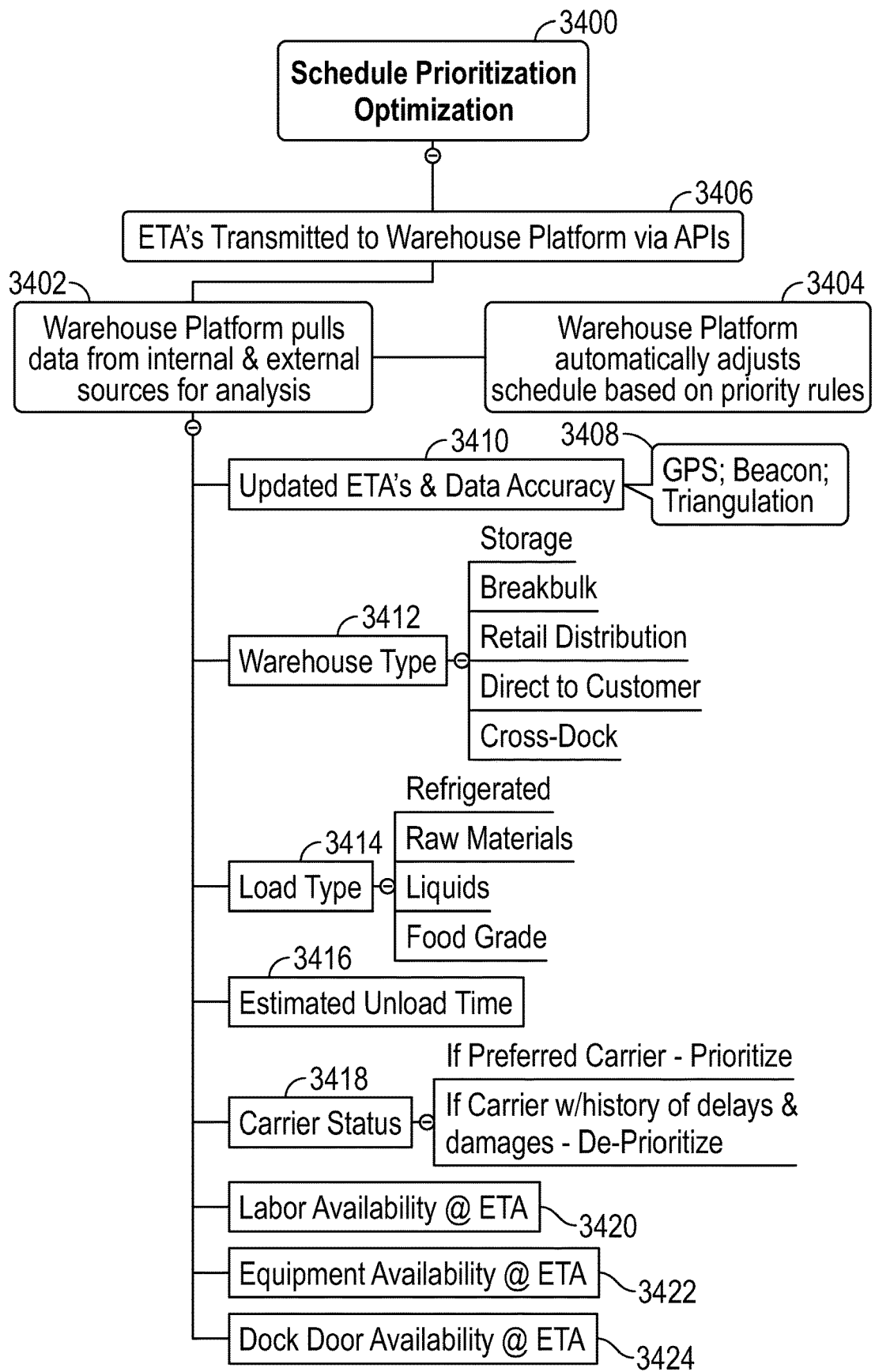
FIG. 34 is a flow chart illustrating a method 3400 of schedule prioritization optimization, according to one or more embodiments of the present disclosure.

FIG. 34 is a flow chart illustrating a method 3400 of schedule prioritization optimization, according to one or more embodiments of the present disclosure. In this example, the warehouse platform may retrieve 3402 data from internal and external sources, as described above with reference to FIG. 33. The warehouse platform may then automatically adjust 3404 a schedule based on one or more priority rules to generate updated ETAs. The updated ETAs may then be transmitted 3406 to the warehouse platform that may use such updated ETAs for schedule prioritization according to various priority rules. Method 3400 generates updated ETAs based on data collected from sensors 3408 that is verified 3410. ETAs may also be calculated based on warehouse type 3412, load type 3414, estimated load/unload time 3416, carrier status 3418, labor availability 3420, equipment availability 3422, and dock availability 3424, as described in greater detail above.

Figure 35:
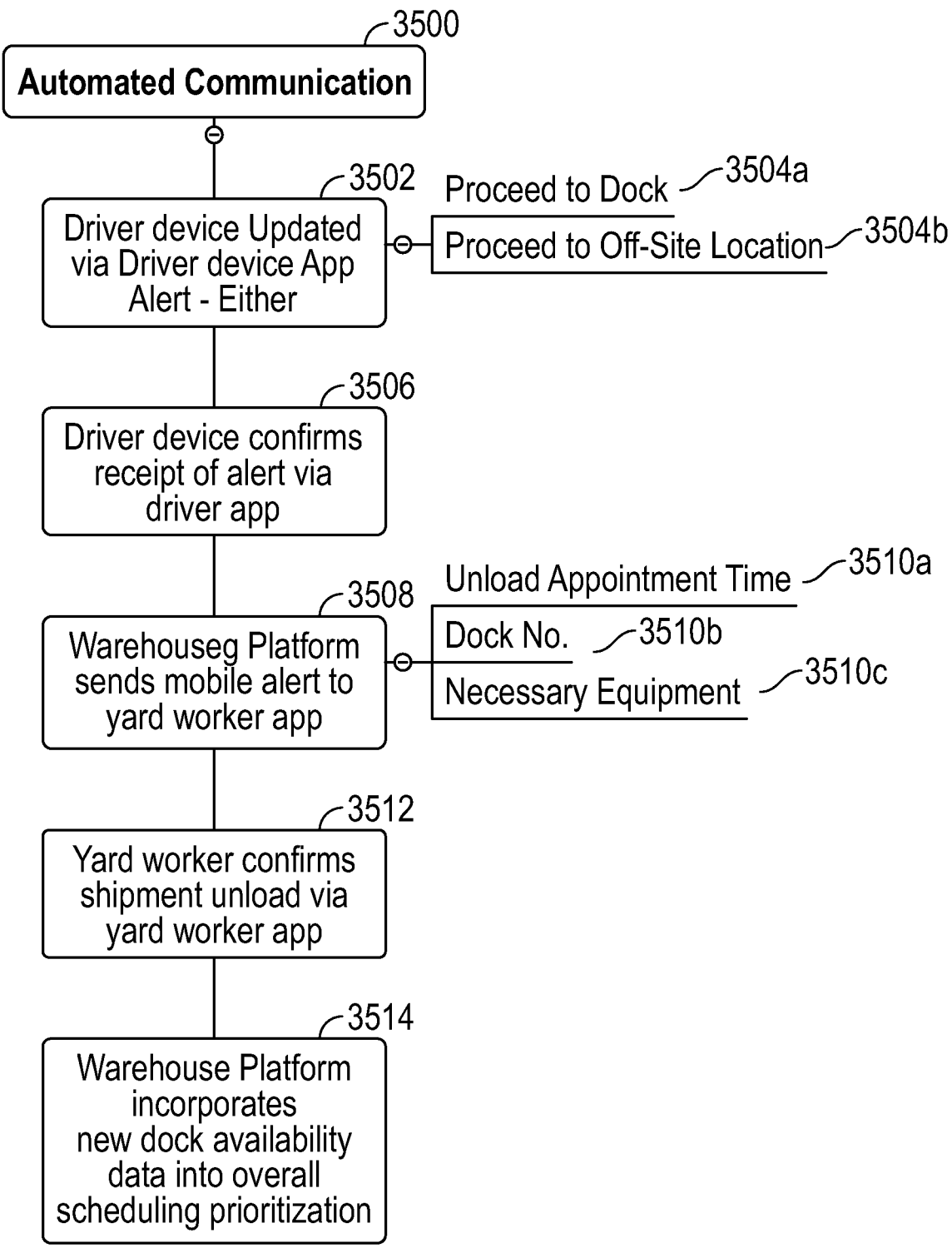
FIG. 35 is a flow chart illustrating interrelated processes of automated communications of various system components, according to one or more embodiments of the present disclosure.

FIG. 35 is a flow chart illustrating interrelated processes of automated communications 3500 of various system components, according to one or more embodiments of the present disclosure. In this example, the driver device and yard/dock worker device communicate with a warehouse platform, as described above with reference to FIGS. 32A, 32B, and 32C. In this regard, a driver device may receive 3502 periodic updates from the warehouse platform. For example, the driver device may receive a message instructing the driver to proceed 3504a to an assigned dock. Alternatively, the driver device may receive a message instructing the driver to proceed 3504b to an off-site location. The driver may acknowledge 3506 the receipt of the message using the driver device. The acknowledgement may be sent from the driver device to the warehouse platform.

The warehouse platform may then further communicate 3508 with a dock/yard work app by sending a message informing the dock worker of a load/unload appointment time 3510a, of a dock number 3510b, of necessary equipment 3510c, etc. The dock/yard worker may then confirm receipt 3512 of the message from the scheduling platform. The warehouse platform may then incorporate 3514 information regarding dock availability and labor availability into overall scheduling prioritization.

FIG. 36 presents a block diagram of an example of a computational environment 3600 for the management of vehicular traffic at a facility, in accordance with one or more embodiments of the disclosure. The example computational environment 3600 is illustrative and is not intended to suggest or otherwise convey any limitation as to the scope of use or functionality of the computational environment's architecture. In addition, the exemplified computational environment 3600 depicted in FIG. 36 should not be interpreted as having any dependency or requirement relating to any one or combination of components illustrated in the example operational environments of the disclosure. The example computational environment 3600 or portions thereof can embody or can constitute the operational environments described hereinbefore.

As such, the computing device 3610 can embody or can constitute, for example, any of the communication devices or platform devices described herein. In one example, the computing device 3610 can be embodied in a portable personal computer or a handheld computing device, such as a mobile tablet computer, an electronic-book reader, a mobile telephone (e.g., a smartphone), a navigation device, and the like. In another example, the computing device 3610 can be embodied in a wearable computing device, such as a watch, a wristband, goggles or head-mounted visors, and the like. In yet another example, the computing device 3610 can be embodied in portable consumer electronics equipment, such as a camera, a portable television set, a smart television (TV), a gaming console, a voice-over-internet-protocol (VoIP) telephone, a media playback device, or the like.

The computational environment 3600 represents an example implementation of various aspects or features of the disclosure in which the processing or execution of operations described in connection with the management of vehicular traffic in accordance with aspects disclosed herein can be performed in response to execution of one or more software components at the computing device 3610. It should be appreciated that the one or more software components can render the computing device 3610, or any other computing devices that include such components, a particular machine for the management of vehicular traffic in accordance with aspects described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method presented in FIG. 36.

For instance, to embody one such method, at least the portion of the computer-accessible instructions can be retained (e.g., stored, made available, or stored and made available) in a computer storage non-transitory medium and executed by one or more processors. The one or more computer-accessible instructions that embody a software component can be assembled into one or more program modules, for example, that can be compiled, linked, and/or executed at the computing device 3610 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 3610 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the management of unknown callers in accordance with aspects described herein can comprise personal computers; server computers; laptop devices; handheld computing devices, such as mobile tablets or e-readers; wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As is illustrated in FIG. 36, the computing device 3610 can comprise one or more processors 3614, one or more input/output (I/O) interfaces 3616, a memory 3630, and a bus architecture 3632 (also termed bus 3632) that functionally couples various functional elements of the computing device 3610. In some embodiments, the computing device 3610 can include, optionally, a radio unit 3612. The radio unit 3612 can include one or more antennas and a communication processing unit that can permit or otherwise facilitate wireless communication between the computing device 3610 and another device, such as one of the remote computing device(s) 3670. In some embodiments, the radio unit 3612 can permit or otherwise facilitate wireless communication according to numerous standardized protocols or custom protocols.

The bus 3632 can include at least one of a system bus, a memory bus, an address bus, or a message bus, and can permit or otherwise facilitate the exchange of information (data, metadata, and/or signaling) between the processor(s) 3614, the I/O interface(s) 3616, and/or the memory 3630, or respective functional elements therein. In certain scenarios, the bus 3632 in conjunction with one or more internal programming interfaces 3650 (such as application programming interfaces (APIs); also referred to as interface(s) 3650) can permit such exchange of information. In scenarios in which the processor(s) 3614 include multiple processors, the computing device 3610 can utilize parallel computing.

The I/O interface(s) 3616 can permit or otherwise facilitate communication of information between the computing device and an external device, such as another computing device, e.g., a network element or an end-user device. Such communication can include direct communication or indirect communication, such as the exchange of information between the computing device 3610 and the external device via a network or elements thereof. As illustrated, the I/O interface(s) 3616 can comprise one or more of network adapter(s) 3618, peripheral adapter(s) 3622, and display unit(s) 3626. Such adapter(s) can permit or otherwise facilitate connectivity between the external device and one or more of the processor(s) 3614 and/or the memory 3630. For example, the peripheral adapter(s) 3622 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), FireWire or IEEE-1394.

In one aspect, at least one of the network adapter(s) 3618 can functionally couple the computing device 3610 to one or more remote computing devices 3670 via one or more traffic and signaling pipes 3660. The traffic and signaling pipe(s) 3660 can permit or otherwise facilitate the exchange of traffic 3662 and signaling 3664 between the computing device 3610 and the one or more remote computing devices 3670. Such network coupling provided at least in part by the at least one of the network adapter(s) 3618 can be implemented in a wired environment, a wireless environment, or both. The information that is communicated by the at least one of the network adapter(s) 3618 can result from the implementation of one or more operations of a process in accordance with aspects of this disclosure. In some embodiments, each of the remote computing device(s) 3670 can have substantially the same architecture as the computing device 3610.

The one or more display units 3626 can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit or otherwise facilitate control of the operation of the computing device 3610, or can permit or otherwise facilitate conveying or revealing the operational conditions of the computing device 3610.

The bus 3632 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like.

The bus 3632, and all bus architectures described herein can be implemented over a wired or wireless network connection and each of the subsystems, including the processor(s) 3614, the memory 3630 and memory elements therein, and the I/O interface(s) 3616 can be contained within one or more remote computing devices 3670 at physically separate locations, connected through buses of this form, in effect implementing a distributed computing system.

In certain embodiments, such a distributed system can implement the functionality described herein in a client-server configuration (which also can be referred as a client-host configuration). In such a configuration, the dynamic scheduling component(s) 3636 or the scheduling information 3640, or both, can be distributed between the computing device 3610 and one or more of the remote computing device(s) 3670, and the computing device 3610 and the one or more of the remote computing device(s) 3670 can execute such components and/or utilize such information to provide the scheduling functionality of this disclosure.

It is noted that, in an embodiment in which the computing device 3610 embodies or constitutes a communication device (e.g., a driver device or a yard worker device), the call response control component(s) 3636 can be different from those in an embodiment in which the computing device 3610 embodies or constitutes a scheduling server device within a scheduling platform in accordance with aspects of this disclosure.

The computing device 3610 also can include a variety of computer-readable storage media. Computer-readable storage media can be any available media (transitory and non-transitory) that can be accessed by a computing device. In one aspect, computer-readable storage media can comprise computer non-transitory storage media (or computer-readable non-transitory storage media) and communications media. Example computer-readable non-transitory storage media can be embodied in any available media that can be accessed by the computing device 3610, and can include, for example, both volatile media and non-volatile media, and removable media and/or non-removable media. In one aspect, the memory 3630 can include computer-readable media in the form of volatile memory, such as random access memory (RAM), and/or non-volatile memory, such as read-only memory (ROM).

As is illustrated in FIG. 36, the memory 3630 can include functionality instructions storage 3634 and functionality information storage 3638. The functionality instructions storage 3634 can include computer-accessible instructions that, in response to execution (by at least one of the processor(s) 3614, for example), can implement at least some of the scheduling functionality of the disclosure. The computer-accessible instructions can embody or can comprise one or more software components illustrated as dynamic scheduling component(s) 3636. In one scenario, execution of at least one component of the dynamic scheduling component(s) 3636 can implement one or more of the processes described herein. For instance, such execution can cause a processor (e.g., one of the processor(s) 3614) that executes the at least one component to carry out a disclosed example method or workflow process.

It is noted that, in one aspect, a processor of the processor(s) 3614 that executes at least one of the dynamic scheduling component(s) 3636 can retrieve information from or retain information in one or more memory elements 3640 in the functionality information storage 3638 in order to operate in accordance with the functionality programmed or otherwise configured by the dynamic scheduling component(s) 3636. The one or more memory elements 3640 can be referred to as scheduling information 3640. Such information can include at least one of code instructions, information structures, or the like. For example, at least a portion of such information structures can be indicative or otherwise representative of delivery addresses, offsite parking addresses, docking information, docking rules, shipment tracking information, weather information, and the like, in accordance with aspects described herein.

At least one of the one or more interfaces 3650 (e.g., application programming interface(s)) can permit or otherwise facilitate communication of information between two or more components within the functionality instructions storage 3634. The information that is communicated by the at least one interface can result from implementation of one or more operations in a process of the disclosure. In some embodiments, one or more of the functionality instructions storage 3634 or the functionality information storage 3638 can be embodied in or can include removable/non-removable, and/or volatile/non-volatile computer storage media.

At least a portion of at least one of the dynamic scheduling component(s) 3636 or the scheduling information 3640 can program or otherwise configure one or more of the processor(s) 3614 to operate at least according to the scheduling functionality of this disclosure. One or more of the processor(s) 3614 can execute at least one of the dynamic scheduling component(s) 3636 and leverage at least a portion of the information in the functionality information storage 3638 in order to provide management of vehicular traffic at a facility, in accordance with one or more aspects of this disclosure.

In some scenarios, the functionality instructions storage 3634 can embody or can include a computer-readable non-transitory storage medium having computer-accessible instructions that, in response to execution, cause at least one processor (e.g., one or more of the processor(s) 3614) to perform or otherwise facilitate a group of operations comprising the operations or blocks described in connection with the disclosed processes.

In addition, the memory 3630 can include computer-accessible instructions and information (e.g., data, metadata, and/or programming code instructions) that permit or otherwise facilitate the operation and/or administration (e.g., upgrades, software installation, any other configuration, or the like) of the computing device 3610. Accordingly, as illustrated, the memory 3630 can comprise a memory element 3642 (labeled operating system (OS) instruction(s) 3642) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 3610 can dictate a suitable OS. The memory 3630 also comprises a system information storage 3646 having data, metadata, and/or programming code that permits or otherwise facilitates the operation and/or administration of the computing device 3610. Elements of the OS instruction(s) 3642 and the system information storage 3646 can be accessible or can be operated on by at least one of the processor(s) 3614.

While the functionality instructions storage 3634 and other executable program components, such as the OS instruction(s) 3642, are illustrated herein as discrete blocks, such software components can reside at various times in different memory components of the computing device 3610, and can be executed by at least one of the processor(s) 3614. In certain scenarios, an implementation of the dynamic scheduling component(s) 3636 can be retained on or transmitted across some form of computer-readable media.

The computing device 3610 and/or one of the remote computing device(s) 3670 can include a power supply (not shown), which can power up (or energize) components or functional elements within such devices. The power supply can be a rechargeable power supply, e.g., a rechargeable battery, and it can include one or more transformers to achieve a power level suitable for the operation of the computing device 3610 and/or one of the remote computing device(s) 3670, and components, functional elements, and related circuitry therein. In some embodiments, the power supply can be attached to a conventional power grid to recharge and ensure that such devices can be operational. In one aspect, the power supply can include an I/O interface (e.g., one of the network adapter(s) 3618) to connect operationally to the conventional power grid. In addition or in another aspect, the power supply can include an energy conversion component, such as a solar panel, to provide additional or alternative power resources or autonomy for the computing device 3610 and/or one of the remote computing device(s) 3670.

The computing device 3610 can operate in a networked environment by utilizing connections to one or more of the remote computing device(s) 3670. As an illustration, a remote computing device can be a personal computer, a portable computer, a server, a router, a network computer, a peer device or other common network node, and so on. As described herein, connections (physical and/or logical) between the computing device 3610 and a computing device of the remote computing device(s) 3670 can be made via one or more traffic and signaling pipes 3660, which can comprise wired link(s) and/or wireless link(s) and several network elements (such as routers or switches, concentrators, servers, and the like) that form a local area network (LAN), a metropolitan area network (MAN), a wide area network (WAN), and/or other networks (wireless or wired) having different footprints. Some of such networking environments can be conventional and commonplace in dwellings, offices, enterprise-wide computer networks, intranets, local area networks, and wide area networks.

In one or more embodiments, as mentioned, one or more of the disclosed methods can be practiced in distributed computing environments, such as grid-based environments, where tasks can be performed by remote processing devices (e.g., remote computing device(s) 3670) that are functionally coupled (e.g., communicatively linked or otherwise coupled) through a network having traffic and signaling pipes and related network elements. In a distributed computing environment, in one aspect, one or more software components (such as program modules embodying the dynamic scheduling component(s) 3636) can be located in both a local computing device and at least one remote computing device.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium.

Instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices.

As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application.

As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components. The terms "component," "environment," "system," "architecture," "interface," "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory.

In addition, the memory components or memories can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and processes that can provide management of vehicular traffic at a facility. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:
1. A system, comprising:
a processor circuit that is configured to automatically perform dynamical scheduling of a plurality of conveyances performing shipping operations, the processor performing operations comprising:
generating schedules for a plurality of shipments;
receiving, from a location data source in communication with one or more remote location sensors, location tracking information regarding one or more positions of the conveyances;
receiving, through an application programming interface, information regarding real-time facility labor and equipment availability at a loading/unloading facility;
updating, at least partially in response to the information regarding real-time facility labor and equipment availability, one or more schedules; and
sending, based at least in part on the updating the one or more schedules, a message to a conveyance operator instructing the conveyance operator:
to proceed to an off-site location remote from the loading/unloading facility to wait for further instructions when a loading dock is not available; and to proceed to an assigned loading dock at the loading/unloading facility when the loading dock is available.

2. The system of claim 1, wherein the processor circuit is further configured to perform operations comprising:
sending a message to a facility worker providing instructions to proceed to an assigned dock and to begin loading or unloading a shipment.

3. The system of claim 1, wherein the processor circuit is further configured to perform operations comprising:
sending alerts to conveyance operators providing instructions regarding shipments; and
sending alerts to facility workers providing instructions regarding shipments.

4. The system of claim 3, wherein the processor circuit is further configured to perform operations comprising:
sending a message to a conveyance operator instructing the conveyance operator that an updated appointment has been scheduled.

5. The system of claim 1, wherein the processor circuit is further configured to perform operations comprising:
receiving, by the processor, information regarding current weather and traffic conditions; and
generating an updated schedule based on the received information regarding traffic and weather conditions.

6. The system of claim 1, wherein the one or more remote location sensors comprise:
a global positioning system (GPS) that is configured:
to generate tracking information regarding a dynamical location of the conveyance; and
to transmit the dynamical location of the conveyance to the processor circuit that automatically performs dynamical scheduling of a plurality of conveyances performing shipping operations.

* * * * *